(12) United States Patent
Trippel et al.

(10) Patent No.: US 11,705,741 B2
(45) Date of Patent: *Jul. 18, 2023

(54) MODE-BASED DISABLING OF COMMUNICATION BUS OF A BATTERY MANAGEMENT SYSTEM

(71) Applicant: Inventus Power, Inc., Woodridge, IL (US)

(72) Inventors: Patrick James Trippel, Naperville, IL (US); William Tenorio, Glenview, IL (US); Ilyas Ayub, Naperville, IL (US); Tom Nguyen, Lombard, IL (US)

(73) Assignee: Inventus Power, Inc., Woodridge, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/570,785

(22) Filed: Jan. 7, 2022

(65) Prior Publication Data

US 2022/0131391 A1 Apr. 28, 2022

Related U.S. Application Data

(63) Continuation of application No. 17/466,800, filed on Sep. 3, 2021, now Pat. No. 11,245,268, which is a
(Continued)

(51) Int. Cl.
*H02J 7/00* (2006.01)
*H02J 9/06* (2006.01)

(52) U.S. Cl.
CPC .......... *H02J 7/0014* (2013.01); *H02J 7/0042* (2013.01); *H02J 7/00045* (2020.01);
(Continued)

(58) Field of Classification Search
CPC .................................................. H02J 7/0014
(Continued)

(56) References Cited

U.S. PATENT DOCUMENTS 3,534,241 A 10/1970 Trenkler
5,504,415 A 4/1996 Podrazhansky et al.
(Continued)

FOREIGN PATENT DOCUMENTS

CN 102104176 A 6/2011
CN 202474131 U 10/2012
(Continued)

OTHER PUBLICATIONS

Andrea Reindl, et al., Software Update of a Decentralized, Intelligent Battery Management System Based on Multi-Microcomputers, Proceedings of the 2nd Symposium Electronics and System Integration ESI 2020: "Intelligent Systems and their Components: Research and Industrial Application", 2020, pp. 8-19 [retrieved from <https://opus4.kobv.de/opus4-haw-landshut/frontdoor/index/index/docId/207>].

(Continued)

*Primary Examiner* — Yalkew Fantu
(74) *Attorney, Agent, or Firm* — Banner & Witcoff, Ltd.

(57) ABSTRACT

Described herein is a battery system that allows a battery pack to operate in different modes at different times. Each of the different modes may provide its own set of functionality that affects how the battery pack operates and/or reacts to external input signals. A mode may change how the battery pack discharges power by, for example, altering whether terminals are enabled or disabled. A mode may change how the battery pack's hardware operates by, for example, disabling or enabling portions of the battery pack's hardware. A mode may change what battery-related services are provided by the battery pack and available to an end user by, for example, enabling or disabling the sending of battery status information from the battery pack.

20 Claims, 38 Drawing Sheets

Related U.S. Application Data continuation-in-part of application No. 17/395,987, filed on Aug. 6, 2021, which is a continuation of application No. 17/183,422, filed on Feb. 24, 2021, now Pat. No. 11,095,140, which is a continuation of application No. 16/937,931, filed on Jul. 24, 2020, now Pat. No. 10,944,278, and a continuation of application No. 16/937,979, filed on Jul. 24, 2020, now Pat. No. 10,944,279, and a continuation of application No. 16/938,008, filed on Jul. 24, 2020, now Pat. No. 10,938,221.

(52) U.S. Cl.
CPC .......... *H02J 7/0047* (2013.01); *H02J 7/0063* (2013.01); *H02J 9/061* (2013.01)

(58) Field of Classification Search
USPC ....................................................... 320/112
See application file for complete search history.

(56) References Cited

U.S. PATENT DOCUMENTS

| | | |
|---|---|---|
| 6,288,521 B1 | 9/2001 | Meador |
| 6,586,909 B1 | 7/2003 | Trepka |
| 6,771,491 B2 | 8/2004 | Tojo et al. |
| 6,919,707 B2 | 7/2005 | Kawai et al. |
| 6,931,481 B2 | 8/2005 | Montero |
| 7,453,236 B2 | 11/2008 | Eguchi et al. |
| 7,463,008 B2 | 12/2008 | Takahashi |
| 7,525,285 B2 | 4/2009 | Plett |
| 7,617,027 B2 | 11/2009 | Jeong |
| 7,646,167 B2 | 1/2010 | Feng et al. |
| 7,663,341 B2 | 2/2010 | Lee et al. |
| 7,759,904 B2 | 7/2010 | Yasuhito et al. |
| 7,772,799 B2 | 8/2010 | Wu |
| 7,834,595 B2 | 11/2010 | Yasuhito et al. |
| 8,004,238 B2 | 8/2011 | Kim et al. |
| 8,018,205 B2 | 9/2011 | Yasuhito et al. |
| 8,264,201 B2 | 9/2012 | Tae et al. |
| 8,307,223 B2 | 11/2012 | Tae et al. |
| 8,344,687 B2 | 1/2013 | Nishikawa et al. |
| 8,350,529 B2 | 1/2013 | Loncarevic |
| 8,432,132 B2 | 4/2013 | Nakanishi |
| 8,502,503 B2 | 8/2013 | Densham |
| 8,519,670 B2 | 8/2013 | Castelaz et al. |
| 8,547,065 B2 | 10/2013 | Trigiani |
| 8,723,482 B2 | 5/2014 | Dao et al. |
| 8,766,597 B2 | 7/2014 | Nork et al. |
| 8,766,602 B1 | 7/2014 | Kimes |
| 8,816,640 B2 | 8/2014 | Yokoura et al. |
| 8,860,372 B2 | 10/2014 | Guang et al. |
| 8,874,298 B2 | 10/2014 | Houchin-Miller et al. |
| 8,898,341 B2 | 11/2014 | Kim et al. |
| 8,912,758 B2 | 12/2014 | Kang et al. |
| 8,963,507 B2 | 2/2015 | Kim et al. |
| 9,000,935 B2 | 4/2015 | Dao et al. |
| 9,002,537 B2 | 4/2015 | Duncan et al. |
| 9,005,788 B2 | 4/2015 | Zhu |
| 9,048,513 B2 | 6/2015 | Butzmann et al. |
| 9,071,049 B2 | 6/2015 | Densham |
| 9,088,052 B2 | 7/2015 | Sim et al. |
| 9,118,192 B2 | 8/2015 | Zhu et al. |
| 9,136,714 B2 | 9/2015 | Tsai |
| 9,219,366 B2 | 12/2015 | Kim |
| 9,236,735 B2 | 1/2016 | Yoo |
| 9,252,464 B2 | 2/2016 | Boehm et al. |
| 9,293,935 B2 | 3/2016 | Lee et al. |
| 9,296,306 B2 | 3/2016 | Schygge et al. |
| 9,300,016 B2 | 3/2016 | Yun |
| 9,302,595 B2 | 4/2016 | Tabatowski-Bush et al. |
| 9,306,409 B2 | 4/2016 | Yoo |
| 9,337,668 B2 | 5/2016 | Yip |
| 9,431,684 B2 | 8/2016 | Wang et al. |
| 9,436,261 B2 | 9/2016 | Yun |
| 9,438,061 B2 | 9/2016 | Takeyama |
| 9,479,004 B2 | 10/2016 | Mao |
| 9,496,730 B2 | 11/2016 | Gallegos et al. |
| 9,537,328 B2 | 1/2017 | Kim |
| 9,559,389 B2 | 1/2017 | Greef et al. |
| 9,606,187 B2 | 3/2017 | Choi |
| 9,641,002 B2 | 5/2017 | Lavender |
| 9,641,013 B2 | 5/2017 | Lee et al. |
| 9,667,074 B2 | 5/2017 | Farhi et al. |
| 9,692,242 B2 | 6/2017 | Butzmann |
| 9,768,629 B2 | 9/2017 | Jestin et al. |
| 9,772,666 B1 * | 9/2017 | Kam ..................... G06F 1/263 |
| 9,787,108 B2 | 10/2017 | Huggins |
| 9,817,467 B2 | 11/2017 | Lee et al. |
| 9,859,712 B2 | 1/2018 | Nishibayashi et al. |
| 9,876,367 B2 | 1/2018 | Trigiani |
| 9,882,401 B2 * | 1/2018 | Beaston ................ H02J 7/0068 |
| 9,912,017 B1 | 3/2018 | Kuo et al. |
| 9,923,247 B2 | 3/2018 | Beaston et al. |
| 10,003,214 B2 | 6/2018 | Nasir et al. |
| 10,007,507 B2 | 6/2018 | Huang |
| 10,012,699 B2 | 7/2018 | Muto |
| 10,044,211 B2 | 8/2018 | Seo et al. |
| 10,097,013 B2 | 10/2018 | Norton |
| 10,122,186 B2 | 11/2018 | Nystrom et al. |
| 10,131,042 B2 | 11/2018 | Mergener et al. |
| 10,131,246 B2 | 11/2018 | Demont |
| 10,144,304 B2 | 12/2018 | Dai |
| 10,186,878 B2 | 1/2019 | Pognant-Gros et al. |
| 10,243,923 B2 | 3/2019 | Jo |
| 10,259,336 B2 | 4/2019 | McQuillen et al. |
| 10,270,262 B2 | 4/2019 | Kim et al. |
| 10,270,266 B2 | 4/2019 | Beaston |
| 10,347,952 B2 | 7/2019 | Choi et al. |
| 10,361,571 B2 | 7/2019 | Kim |
| 10,361,573 B2 | 7/2019 | Do et al. |
| 10,396,570 B2 | 8/2019 | Loncarevic |
| 10,414,285 B2 | 9/2019 | Park et al. |
| 10,439,176 B2 | 10/2019 | Choi et al. |
| 10,439,430 B2 | 10/2019 | Chan et al. |
| 10,442,306 B2 | 10/2019 | Sufrin-Disler et al. |
| 10,491,007 B2 | 11/2019 | Kim |
| 10,491,012 B2 | 11/2019 | Kang |
| 10,505,374 B2 | 12/2019 | Kain et al. |
| 10,505,377 B2 | 12/2019 | Jeon |
| 10,532,665 B2 | 1/2020 | Brochhaus |
| 10,536,007 B2 | 1/2020 | Beaston et al. |
| 10,571,523 B2 | 2/2020 | Kim et al. |
| 10,594,142 B2 | 3/2020 | Long et al. |
| 10,608,444 B2 | 3/2020 | Kaneko |
| 10,627,448 B2 | 4/2020 | Koo et al. |
| 10,794,957 B2 | 10/2020 | Yoon et al. |
| 10,879,717 B2 | 12/2020 | Yang et al. |
| 10,938,221 B1 * | 3/2021 | Tenorio ................ H02J 7/0029 |
| 10,944,278 B1 * | 3/2021 | Kang .................... H02J 7/0063 |
| 10,998,751 B2 | 5/2021 | Wan et al. |
| 11,245,268 B1 * | 2/2022 | Trippel ................. H02J 7/0063 |
| 2009/0052109 A1 | 2/2009 | Stockman |
| 2009/0134840 A1 | 5/2009 | Yamamoto et al. |
| 2009/0167244 A1 | 7/2009 | Kurose et al. |
| 2010/0090652 A1 | 4/2010 | Takeda et al. |
| 2010/0244770 A1 | 9/2010 | Yasuhito et al. |
| 2011/0001456 A1 | 1/2011 | Wang |
| 2011/0156640 A1 | 6/2011 | Moshfeghi |
| 2012/0194139 A1 | 8/2012 | Sasaki et al. |
| 2012/0223722 A1 | 9/2012 | Ueda et al. |
| 2013/0033793 A1 | 2/2013 | Takeda |
| 2013/0320772 A1 | 12/2013 | Qiao et al. |
| 2015/0221993 A1 | 8/2015 | Wang et al. |
| 2015/0222132 A1 | 8/2015 | Shikatani et al. |
| 2016/0172901 A1 | 6/2016 | Hsieh et al. |
| 2016/0359329 A1 | 12/2016 | Kim et al. |
| 2017/0170671 A1 | 6/2017 | Mergener et al. |
| 2017/0194673 A1 | 7/2017 | Jeon |
| 2017/0214256 A1 | 7/2017 | Hardy |
| 2017/0288422 A1 | 10/2017 | Yang et al. |
| 2017/0345101 A1 | 11/2017 | Beaston |
| 2018/0198291 A1 | 7/2018 | Kuo et al. |

(56) References Cited

U.S. PATENT DOCUMENTS

| | | |
|---|---|---|
| 2018/0233928 A1 | 8/2018 | Li |
| 2018/0278066 A1 | 9/2018 | Kurahashi et al. |
| 2018/0323623 A1 | 11/2018 | Nysen |
| 2018/0342772 A1 | 11/2018 | Wei |
| 2019/0042228 A1 | 2/2019 | Nolan et al. |
| 2019/0052109 A1 | 2/2019 | Sturnfield |
| 2019/0067755 A1 | 2/2019 | Kim et al. |
| 2019/0115769 A1 | 4/2019 | Chen et al. |
| 2019/0129369 A1 | 5/2019 | Song et al. |
| 2019/0152342 A1 | 5/2019 | Shen et al. |
| 2019/0160972 A1 | 5/2019 | Zeiler et al. |
| 2019/0227863 A1 | 7/2019 | Cho et al. |
| 2019/0229376 A1 | 7/2019 | Petrakivskyi et al. |
| 2019/0229377 A1 | 7/2019 | Kim |
| 2019/0237816 A1 | 8/2019 | Kim et al. |
| 2019/0252735 A1 | 8/2019 | Sung et al. |
| 2019/0267815 A1 | 8/2019 | Hidaka et al. |
| 2019/0273293 A1 | 9/2019 | Kim et al. |
| 2019/0285699 A1 | 9/2019 | Weidner et al. |
| 2019/0356025 A1 | 11/2019 | Sung et al. |
| 2019/0356140 A1 | 11/2019 | Sung |
| 2019/0361075 A1 | 11/2019 | Lee et al. |
| 2019/0363552 A1 | 11/2019 | Choi |
| 2019/0379214 A1 | 12/2019 | Loncarevic |
| 2020/0036194 A1 | 1/2020 | Park et al. |
| 2020/0052503 A1 | 2/2020 | Statman |
| 2020/0059106 A1 | 2/2020 | Karlsson et al. |
| 2020/0067323 A1 | 2/2020 | Jeon et al. |
| 2020/0076007 A1 | 3/2020 | Jeon et al. |
| 2020/0083720 A1 | 3/2020 | Kain et al. |
| 2020/0119564 A1 | 4/2020 | Lee |
| 2020/0136197 A1 | 4/2020 | Bossi |
| 2020/0144679 A1 | 5/2020 | Kam et al. |
| 2020/0144871 A1 | 5/2020 | Wan |
| 2020/0227925 A1 | 7/2020 | Park |
| 2020/0244075 A1 | 7/2020 | Park et al. |
| 2020/0366103 A1 | 11/2020 | Zhou et al. |
| 2021/0006076 A1 | 1/2021 | Rentel et al. |

FOREIGN PATENT DOCUMENTS

| | | |
|---|---|---|
| CN | 103199579 A | 7/2013 |
| CN | 103390921 A | 11/2013 |
| CN | 103647258 A | 3/2014 |
| CN | 104201749 A | 12/2014 |
| CN | 105336994 A | 2/2016 |
| CN | 105656107 A | 6/2016 |
| CN | 106143366 A | 11/2016 |
| CN | 106253363 A | 12/2016 |
| CN | 206820541 U | 12/2017 |
| CN | 109193050 A | 1/2019 |
| CN | 109818393 A | 5/2019 |
| CN | 107275692 B | 12/2019 |
| CN | 111114380 A | 5/2020 |
| CN | 111162576 A | 5/2020 |
| CN | 111488160 A | 8/2020 |
| CN | 211508677 U | 9/2020 |
| CN | 112104053 A | 12/2020 |
| CN | 112271791 A | 1/2021 |
| CN | 112737022 A | 4/2021 |
| CN | 113325316 A | 8/2021 |
| DE | 10 2015 004 834 A1 | 10/2016 |
| EP | 3576241 B1 | 7/2020 |
| EP | 3783766 A1 | 2/2021 |
| GB | 2346596 A | 8/2000 |
| GB | 2545698 A | 6/2017 |
| JP | 2005253154 A | 9/2005 |
| KR | 20070064447 A | 6/2007 |
| KR | 10-2015-0066222 A | 6/2015 |
| KR | 101561885 B1 | 10/2015 |
| KR | 101562015 B1 | 10/2015 |
| KR | 20170022162 A | 3/2017 |
| KR | 20170062757 A | 6/2017 |
| KR | 101788513 B1 | 10/2017 |
| NO | 2019/138425 A1 | 7/2019 |
| NO | 2019/205138 A1 | 10/2019 |
| WO | 2013125850 A1 | 8/2013 |
| WO | 2018075793 A1 | 4/2018 |
| WO | 2018225921 A1 | 12/2018 |
| WO | 201912128 A1 | 1/2019 |
| WO | 2019009531 A1 | 1/2019 |
| WO | 2019009535 A1 | 1/2019 |
| WO | 2019020531 A1 | 1/2019 |
| WO | 2019022377 A1 | 1/2019 |
| WO | 2019027190 A1 | 2/2019 |
| WO | 2019066214 A1 | 4/2019 |
| WO | 2019074217 A1 | 4/2019 |
| WO | 2019212128 A1 | 11/2019 |
| WO | 2019216532 A1 | 11/2019 |
| WO | 2020076127 A1 | 4/2020 |
| WO | 2020104277 A1 | 5/2020 |
| WO | 2020249099 A1 | 12/2020 |
| WO | 2021006859 A1 | 1/2021 |
| WO | 2021/071655 A1 | 4/2021 |
| WO | 2021243550 A1 | 12/2021 |

OTHER PUBLICATIONS

SUAS News, The Market, BatMon: Smartify your drone battery, Jan. 22, 2020, 8 pages, [retrieved from <https://www.suasnews.com/2020/01/batmon-smarlily-your-drone-battery/>].

Phytools, PEAK System, Webpage, printed Aug. 18, 2021, 9 pages [retrieved from <https://phytools.com/collections/peak-system-technik>].

Tracxn Technologies, Webpage, Top Battery Management System Startups, Updated Apr. 13, 2021, 6 pages [retrieved from <https://tracxn.com/d/trending-themes/Startups-in-Battery-Management-System>].

Ng, MF., Zhao, J., Yan, Q. et al. Predicting the state of charge and health of batteries using data-driven machine learning Nat Mach Intell 2, 161-170 (2020) Abstract only, [<https://doi.org/10.1038/s42256-020-0156-7>].

Sep. 9, 2020—U.S. Non-Final Office Action—U.S. Appl. No. 16/937,931.

Sep. 15, 2020—U.S. Non-Final Office Action—U.S. Appl. No. 16/937,979.

Sep. 16, 2020—(US) Ex Parte Quayle Action—U.S. Appl. No. 16/937,008.

Jan. 27, 2021—(WO) International Search Report & Written Opinion—App. No. PCT/CN2020/093886.

Jul. 7, 2021—U.S. Notice of Allowance—U.S. Appl. No. 17/183,422.

Aug. 2, 2021—U.S. Notice of Allowance—U.S. Appl. No. 17/270,885.

Jun. 23, 2022—U.S. Notice of Allowance—U.S. Appl. No. 17/549,398.

Jun. 10, 2022—U.S. Notice of Allowance—U.S. Appl. No. 17/708,564.

Jun. 20, 2022—U.S. Notice of Allowance—U.S. Appl. No. 17/708,725.

Jul. 20, 2022—U.S. Non-Final Office Action—U.S. Appl. No. 17/830,009.

Aug. 1, 2022—(US) Ex Parte Quayle—U.S. Appl. No. 17/830,140.

Aug. 17, 2022—(WO) International Search Report & Written Opinion—App. No. PCT/CN2021/131937.

Aug. 2, 2022—U.S. Notice of Allowance—U.S. Appl. No. 17/829,775.

Mar. 23, 2022—U.S. Notice of Allowance—U.S. Appl. No. 17/563,916.

Mar. 18, 2022—U.S. Notice of Allowance—U.S. Appl. No. 17/563,856.

Datasheet, "TPS2640 42-V, 2-A eFuse with Integrated Reverse Input Polarity Protection" Texas Instruments, TPS2604 Jun. 2021. pp. 1-54.

Nov. 2, 2022—(WO) International Search Report and Written Opinion—App PCT/US2022/074099.

Nov. 2, 2022—(WO) International Search Report and Written Opinion—App PCT/CN2022/076500.

Dec. 27, 2022—(WO) International Search Report and Written Opinion—App PCT/US2022/075877.

* cited by examiner 2400 (Battery Pack Side View)

(Battery Pack Top View) 2401

MODE-BASED DISABLING OF COMMUNICATION BUS OF A BATTERY MANAGEMENT SYSTEM

CROSS REFERENCE TO RELATED APPLICATIONS

This application is a continuation of U.S. Ser. No. 17/466,800, filed Sep. 3, 2021, which is a continuation-in-part of U.S. Ser. No. 17/395,987, filed Aug. 6, 2021, which is a continuation of U.S. Ser. No. 17/183,422, filed Feb. 24, 2021 (now U.S. patent Ser. No. 11/095,140, issued Aug. 17, 2021). Moreover, U.S. Ser. No. 17/183,422 is a continuation of U.S. Ser. No. 16/937,931, filed Jul. 24, 2020 (now U.S. patent Ser. No. 10/944,278, issued Mar. 9, 2021), is also a continuation of U.S. Ser. No. 16/937,979, filed Jul. 24, 2020 (now U.S. patent Ser. No. 10/944,279, issued Mar. 9, 2021), and is also a continuation of U.S. Ser. No. 16/938,008, filed Jul. 24, 2020 (now U.S. patent Ser. No. 10/938,221, issued Mar. 2, 2021). Each of the above-mentioned applications is incorporated herein by reference in its entirety.

TECHNICAL FIELD

A battery system comprises one or more battery packs. Each of the one or more battery pack includes a battery management system that may configure the battery pack to operate in different modes at different times. Each of the different modes may provide its own set of functionality that affects how the battery pack operates and/or reacts to external input signals.

The battery management systems and methods described herein may be implemented in industrial and commercial vehicle applications, such as off-road utility vehicles, hybrid electric vehicles, battery-electric powered vehicles, burden carrier/tow tractors, forklift/pallet jacks, lawn and garden/outdoor power equipment, large mining equipment, automated guided vehicles, aerial work platforms, and other such applications. In addition, the systems and methods described herein may be implemented in other applications including, but not limited to cordless power tools (e.g., drills, saws, grinders, nail drivers, welders, and the like), aerospace/defense applications, appliances, and other such applications. Furthermore, the systems and methods described herein may be implemented in other applications including, but not limited to grid energy storage, solar-generated power storage systems, sustainably generated power storage systems, smart grid systems, telecom and data communication backup systems, uniform power supply (UPS) systems, server applications, and other such applications.

For example, in some industrial and commercial vehicle applications, a battery management system such as disclosed herein may desired to output a wide range of current—e.g., a high current when initially turning on an engine of the vehicle, however, less current during normal operation of the vehicle. The battery management system and methods may also, in some embodiments, include a limp home state feature, as disclosed herein, to accommodate a failed battery in a large-format battery pack, such as in an industrial or commercial vehicle application. The battery management systems, including various battery pack configurations and one or more buses (e.g., a CAN bus), may integrated into the industrial and commercial vehicle application.

In another example, in some telecom and/or data communication backup systems and/or computer server applications, a battery management system such as disclosed herein may provide an alternative to lead acid battery installations that previously dominated these applications because of their low cost, straightforward scalability, accessible recycling infrastructure, and accessible manufacturers. In some embodiments, the battery management systems and methods disclosed herein provide high energy density, high rate of discharge capabilities, and low self-discharge characteristics that make for desirable integration into telecom and/or data communication backup systems, uniform power supply (UPS) systems, and/or computer server applications. For example, the aforementioned applications desire longer operational time frames that are made possible by the battery management system such as disclosed herein, which extend the usable life of batteries in the battery pack by implementing smart algorithms for charge, discharge, and balancing—e.g., smart converter balancing, start direct balancing, start staggered balancing, and others. In addition, the battery management systems and methods disclosed herein may be used in cooperation with, in some examples, technologies such as fuel cells, ultracapacitors, flywheels, and other electrochemical batteries for use in telecom/data communications backup applications.

In yet another example, in some grid energy storage systems, solar-generated power storage systems, sustainably generated power storage systems, smart grid systems, and/or uniform power supply (UPS) systems, a battery management system such as disclosed herein may optimize electricity grids and enable sustainable energy sources, such as wind and solar power, to be more economical. In one example, the system may be used to store solar energy received from photovoltaic panels and a bi-directional three-phase inverter system may be managed, in some embodiments, using the battery management system disclosed herein. The renewable energy storage system may include a plurality of batteries in a battery pack integrated into a rack mount chassis and enclosure. Solar integrators may use the disclosed battery management systems and methods with large-format battery chemistries to fill the needs of growing renewable energy storage requirements. While lead-acid, ultracapacitors, sodium sulfur, vanadium redox, flywheels, compressed air, fuel cells and pumped hydro have been used in solar energy storage applications, with the disclosed battery management systems and methods, solar integrators may conveniently use Lithium ion for large-format applications. In addition, solar integrators may desire ancillary services for the power markets that uses micro-pulses of energy to maintain the proper frequency of the current on the grid—e.g., frequency regulation, and advanced smart grid functionality such as micro grid operation, demand response, time shifting, and power dispatch. Lithium chemistry over previous battery technologies include weight reduction, volume/footprint reduction, longer cycle-life, ability to use a greater percent of capacity of lithium battery without shortening rated cycle life, faster charge times, and lower effective capacity loss at high rates of discharge. In some examples, an inverter and gateway interoperability may be coupled to the disclosed battery management systems to manage, distribute, and store energy within a smart grid. In some examples, the smart grid system may be housed in a mobile shipping container that is expandable.

In addition to grid energy storage systems, the battery management systems and methods disclosed herein may be integrated with off-grid power products suitable in consumer, recreational, automotive, maritime and/or industrial applications. In the automotive sector, auxiliary power units (APU) may be used for transportation, construction, and/or maintaining vital infrastructure. Battery APUs provides commercial vehicles with a rugged and dependable off-grid power source. Other off-grid power applications include maritime power, remote location power, traffic regulation, security surveillance and emergency power generators. Moreover, Battery APUs may be used for short and long-haul trucks, construction equipment, off-road transport (e.g., logging trucks), and buses. For example, commercial trucks may rely on Battery APUs for overnight comfort (e.g., air conditioning/heat/accessory) loads. For several off-grid applications, reliability is a major concern as failure and/or downtime is exceedingly costly.

BACKGROUND

Battery technology has evolved from the nascent era of automation when vehicle batteries were typically large and heavy affairs using lead-acid technology. Battery technology has evolved to provide more electrical energy with less space. For example, Lithium-ion (Li-ion) batteries are quickly replacing regular zinc carbon and lead batteries because they are smaller and lighter than traditional batteries and can hold charge for up to three times longer than big, heavy traditional batteries. Consequently, Li-ion batteries are finding applications for powering tools, appliances, and vehicles including forklifts, cars, trucks, and so forth. Moreover, battery technology is not stagnant. For example, new solid-state batteries use a glass electrolyte and lithium or sodium metal electrodes, providing approximately three times as much energy density as Li-ion batteries. In general, however, new technology batteries may be damaged or degraded if the sensitive chemistry of the battery is disrupted. For example, Li-ion batteries are known to malfunction/degrade if overcharged or charged/overcharged/discharged in inappropriate ways.

A battery management system (BMS) is sometimes included with new technology batteries (for example, nickel metal hydride or Li-ion) to provide battery protection, provide improved efficiency, and provide a better user experience than previous battery technologies. The battery management system may sometimes be implemented to further one or more goals. For example, the BMS may be used to protect a user of the application being powered by the battery. As a further example, the BMS may be used to protect the battery pack itself from damage and abuse because the battery may often an expensive investment. Furthermore, since the battery may be an expensive investment, the BMS may be used to maximize the performance that can be squeezed out of the battery system. Even further, the BMS may be used to maximize the life of the constituent battery cells.

SUMMARY

A battery system may comprise one or more battery packs and each of the one or more battery packs may have the same or similar electrical and electronic components and/or chemistries. Each of the one or more battery packs may support battery cells (often Li-ion). Each of the one or more battery packs may be configured to provide a specific set of functionality and/or performance to an end user. A battery pack, however, need not require a specific configuration before the battery pack is installed in the battery system. The battery pack may assume a role of either a master (e.g., a primary) battery pack or a slave (e.g., a secondary) battery pack after the battery pack is inserted into the system and commences activity on the communication channel without user intervention. Further, a battery pack can be configured to provide different sets of functionality at different times. For example, a battery pack could be configured to provide a first set of functionality that does not communicate over a communication channel and later configured to provide a second set of functionality that does communicate over the communication channel. In this way and many others, the battery pack may operate in different modes at different times. Each of the different modes provides its own set of functionality that affects how the battery pack operates and/or reacts to external input signals.

With another aspect, the battery system need not utilize an external battery management system. Rather, each battery pack may include an internal battery management system that can manage a pack's battery cells and may coordinate via messaging with the other battery packs in the battery system via a communication channel. The battery pack may additionally send and receive messages with one or more other devices via the communication channel. These messages may cause the battery pack to switch between different modes and, thus, change operation of the battery pack.

With another aspect, a battery pack may, based on operating in different modes at different times, be able to disable and enable portions of the battery pack's hardware. For example, while the battery pack operates in certain modes, one or more portions of the battery pack's hardware could be prevented from receiving power. The same one or more portions could receive power while the battery pack operates in other modes.

With another aspect, a battery pack may, based on operating in different modes at different times, be able to change the manner in which battery cells are discharged. For example, a battery pack may include one or more terminals that are configured to discharge electric power from the battery pack. While the battery pack operates in certain modes, the battery pack may be capable of selectively enabling or disabling the one or more terminals. This selection may be based on receiving an appropriate signal via a signaling pin of the battery pack. When enabled, the one or more terminals may be capable of discharging electric power. When disabled, the one or more terminals may not be capable of discharging electric power. While the battery pack operates in other modes, the battery pack may always enable the one or more terminals. In this way, the one or more terminals may be always capable of discharging electric power and receipt of an appropriate signal via the signaling pin would not be needed.

With another aspect, the battery pack, based on operating in different modes at different times, may change battery-related services available to an end user. For example, while the battery pack operates in certain modes, the battery pack may gather battery status information and provide the battery status information to the end user. While the battery pack operates in other modes, the battery pack may not gather battery status information and, accordingly, may not provide the same to the end user. The services offered to an end user may also affect the battery's performance. For example, based on operating in different modes at different times, the battery pack may operate in such a way that simulates the operation of different battery types (e.g., operate in a way that simulates an always discharge-capable lead acid battery; operate to provide smart algorithms for charge, discharge, and balancing; and the like). By operating in such a way that simulates the operation of different battery types, battery packs that share a common hardware platform may each be configured to provide the functionality of different battery types.

With another aspect, based on operating in different modes at different times, the battery pack may provide for increased customization of performance and/or other benefits. For example, while operating in certain modes, a battery pack may provide the functionality of an always discharge-capable lead acid battery under normal operating conditions (e.g., when charging, discharging, etc.), but may modify the battery pack's functionality when a fault is detected (e.g., by making the battery pack discharge-incapable when a fault is detected). In this way, various aspects, such as battery safety, could be improved or otherwise customized to meet specialized needs.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

DETAILED DESCRIPTION

Figure 1:
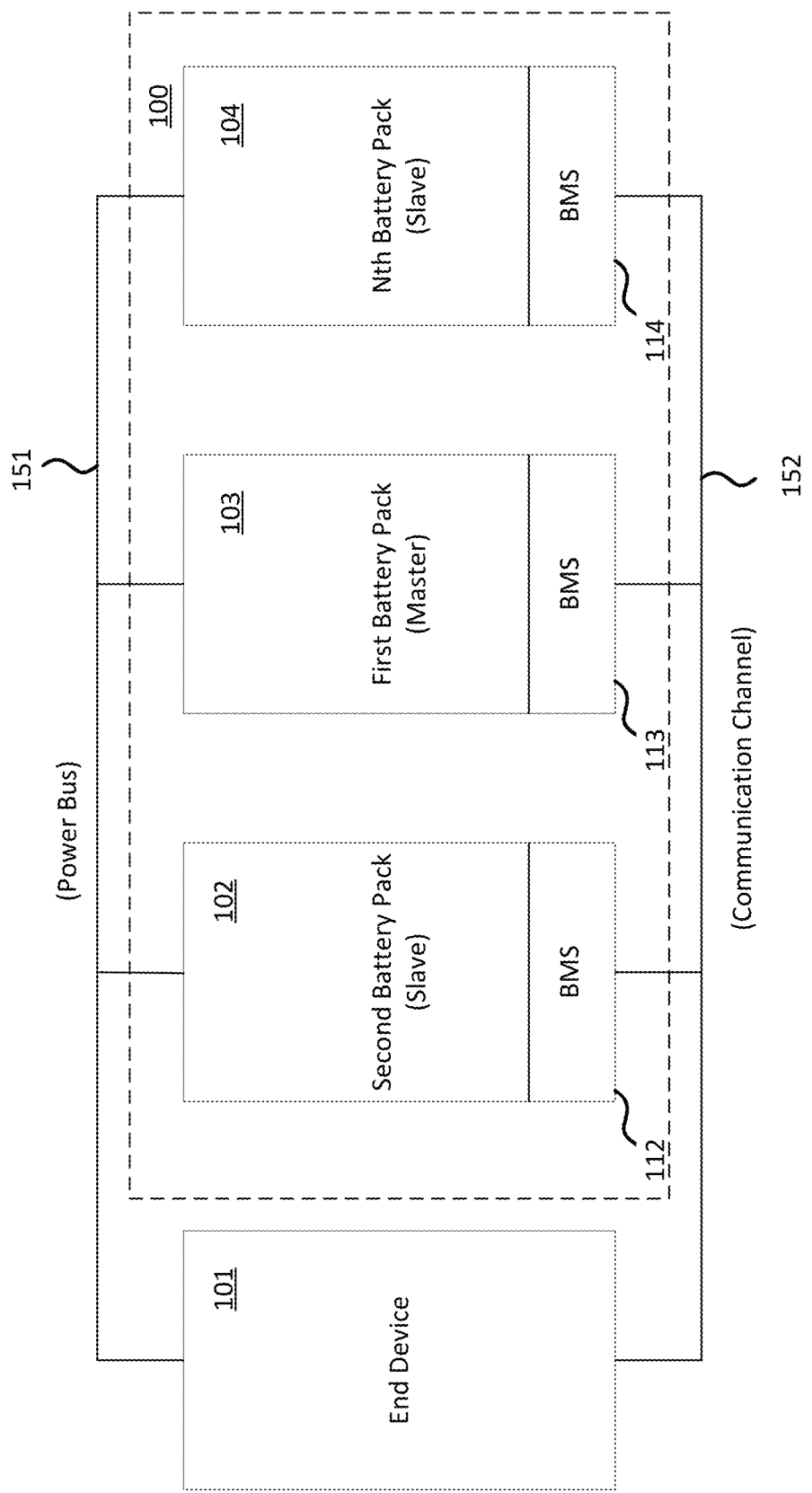
FIG. 1 shows an end device electrically powered by a plurality of battery packs in accordance with an embodiment.

According to an aspect of the embodiments, a battery system with a large-format battery (e.g., a Li-ion battery) powers attached equipment (an end device) by discharging battery cells distributed among a plurality of battery packs. The discharging of the battery cells is controlled in an efficient manner while preserving the expected life of the Li-ion battery cells.

According to another aspect of the embodiments, a battery system may support different advanced technology batteries of different chemistries and/or structures including, but not limited to, Li-ion batteries and solid state batteries.

Each battery pack internally supports a battery management system (BMS), thus circumventing the need of an external battery management in contrast to traditional approaches. Moreover, each of the battery packs may have identical electrical and electronics components, thus supporting an architecture that easily scales to higher power/energy output as needed by an end device. Battery packs may be individually added or removed, where one of the battery packs serves as a master battery pack and the remaining battery packs serve as slave battery packs. Moreover, configuration of the battery packs may be automatically performed without user interaction. When the master battery pack is removed, one of the slave battery packs is automatically reconfigured to become the master battery pack. Charging and discharging of the battery cells is coordinated by the master (e.g., primary) battery pack with the slave (e.g., secondary) battery packs over a communication channel such as a controller area controller (CAN) bus.

In addition, the battery system may be efficiently charged in order to restore charge to the battery cells while preserving the life expectancy of the battery cells.

Rechargeable medium-to-large format battery packs with battery management systems are providing power for small, portable devices and are also extending to larger mobile and stationary uses. Moreover, transportation applications spanning smaller uses such as scooters to larger ones such as full-size autos are contemplated with rechargeable batteries. Industrial applications are also contemplated as battery-based designs are replacing small internal combustion engines for lawn mowers and yard equipment in both commercial and consumer products. Enabling electrification has several advantages, including but not limited to, elimination of polluting emissions, reduced noise, and lower maintenance needs. Furthermore, self-contained backup power systems for residential and commercial sites are benefiting from battery-based designs which eliminate the issues associated with on-site hydrocarbon-based fuel storage.

Further, a battery pack can be configured to provide different sets of functionality at different times. For example, a battery pack could be configured to provide a first set of functionality that does not communicate over a communication channel and later configured to provide a second set of functionality that does communicate over the communication channel. In this way and many others, the battery pack may operate in different modes at different times. Each of the different modes provides its own set of functionality that affects how the battery pack operates and/or reacts to external input signals.

Accordingly, based on the following description and accompanying figures, a battery system is provided that includes one or more battery packs for electrically powering an end device. Each battery pack may include its own internal BMS. Each battery pack may be operated in different modes at different times. FIGS. 1-23B provide examples of a battery system with one or more battery packs where each battery pack includes its own internal BMS. FIGS. 24-26B provide examples of a battery system with one or more battery packs where each battery pack may be operated in different modes at different times. Any of the aspects described in connection with FIGS. 1-23B may be used as, or as part of, one or more modes described in connection with FIGS. 24-26B. Any of the aspects described in connection with FIGS. 24-26B could be implemented in a battery pack described in connection with FIGS. 1-23B.

FIG. 1 shows end device 101 electrically powered by a plurality of battery packs 100 (battery system) in accordance with an embodiment. Each battery pack 102, 103, and 104 includes its own internal battery management system (BMS) 112, 113, and 114, respectively. Battery packs 102, 103, and 104 are electrically connected to a direct current (DC) power bus 151 (comprising positive and negative connections) so that the voltage presented to end device 101 is essentially the same as the voltage provided by each battery pack 102, 103, and 104 while the electrical current supplied to end device 101 is the sum of individual electrical currents provided by each battery pack. Battery packs 100 may be housed within end device 101, mounted to end device 101, or externally situated with respect to end device 101.

End device 101 may assume different types of devices including, but not limited to, power tools, lawn mowers, garden tools, appliances, and vehicles including forklifts, cars, trucks, and so forth.

Figure 16:
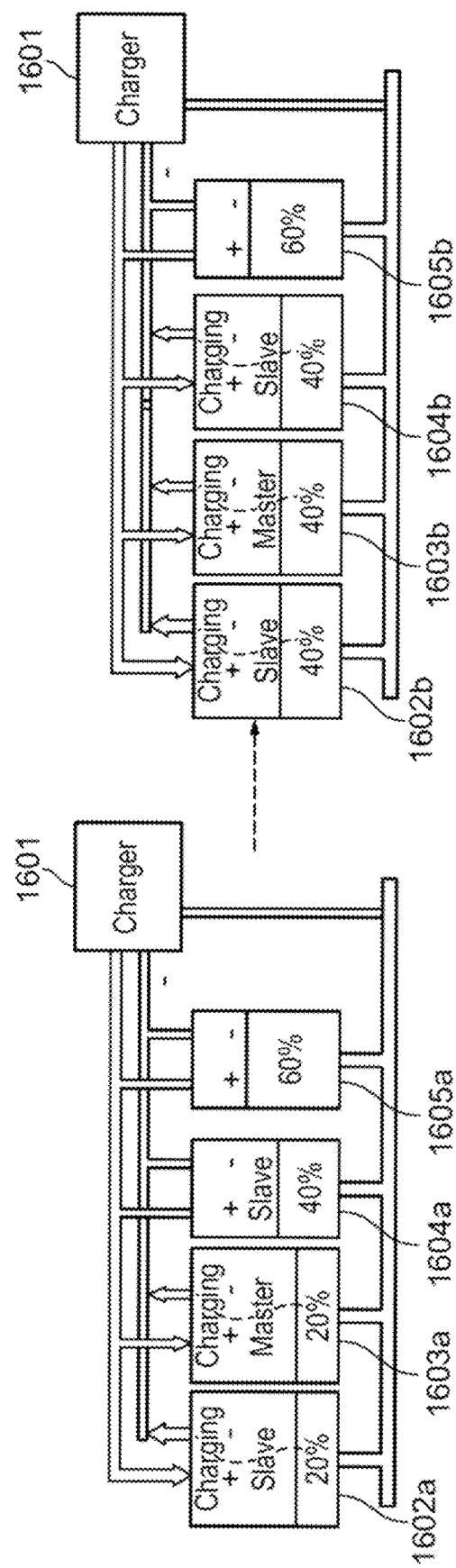
FIG. 16 shows an example of charging a plurality of battery packs in accordance with an embodiment.

Battery management systems 112, 113, and 114 communicate with all of the battery packs as well as end device 101 and/or charger 1601 (as shown in FIG. 16) over communication channel 152. For example, communication channel 152 may comprise a serial communication channel (e.g., a controller area network (CAN) bus) or a parallel communication bus. However, embodiments may support other types of communication channels such as Ethernet, Industrial Ethernet, I²C, Microwire, or Bluetooth Low Energy (BLE). In some cases, the communication channel may support synchronous communication (e.g., CAN) or asynchronous communication (e.g., RS-232, RS-422, RS-485, etc.)

The CAN and Ethernet protocols support the lower two layers of the OSI model while the BLE protocol spans the lower layers as well as the higher layers including the application layer. Consequently, embodiments utilizing protocols such as CAN and Ethernet must support the equivalent higher layers by software applications built on top of the two lower layers.

Embodiments may support different messaging protocols. For example, a protocol may support node to node communication by supporting both a source address and a destination address. The destination address may specify a particular node address or may be a global address so that a message may be broadcast to more than one node. In some cases, a protocol (such as the CAN protocol, the Modbus protocol, etc.) may support only a single source address (e.g., a master address) so that all nodes may process a message broadcast over a communication channel.

Battery packs 102, 103, and 104 may each connect to communication channel 152 in a parallel fashion. However, embodiments may support different arrangements such as pack-to-pack communication on separate busses or a daisy chain connection through each battery pack.

Battery packs 102, 103, and 104 may have similar or identical electrical and electronic components. After being inserted into a battery system, one of the battery packs 102, 103, or 104 may be configured as a master battery pack or a slave battery pack. Moreover, if a battery pack initially serves as a slave battery pack, it may subsequently serve as a new master battery pack if the current master battery pack is removed.

Figure 2A:
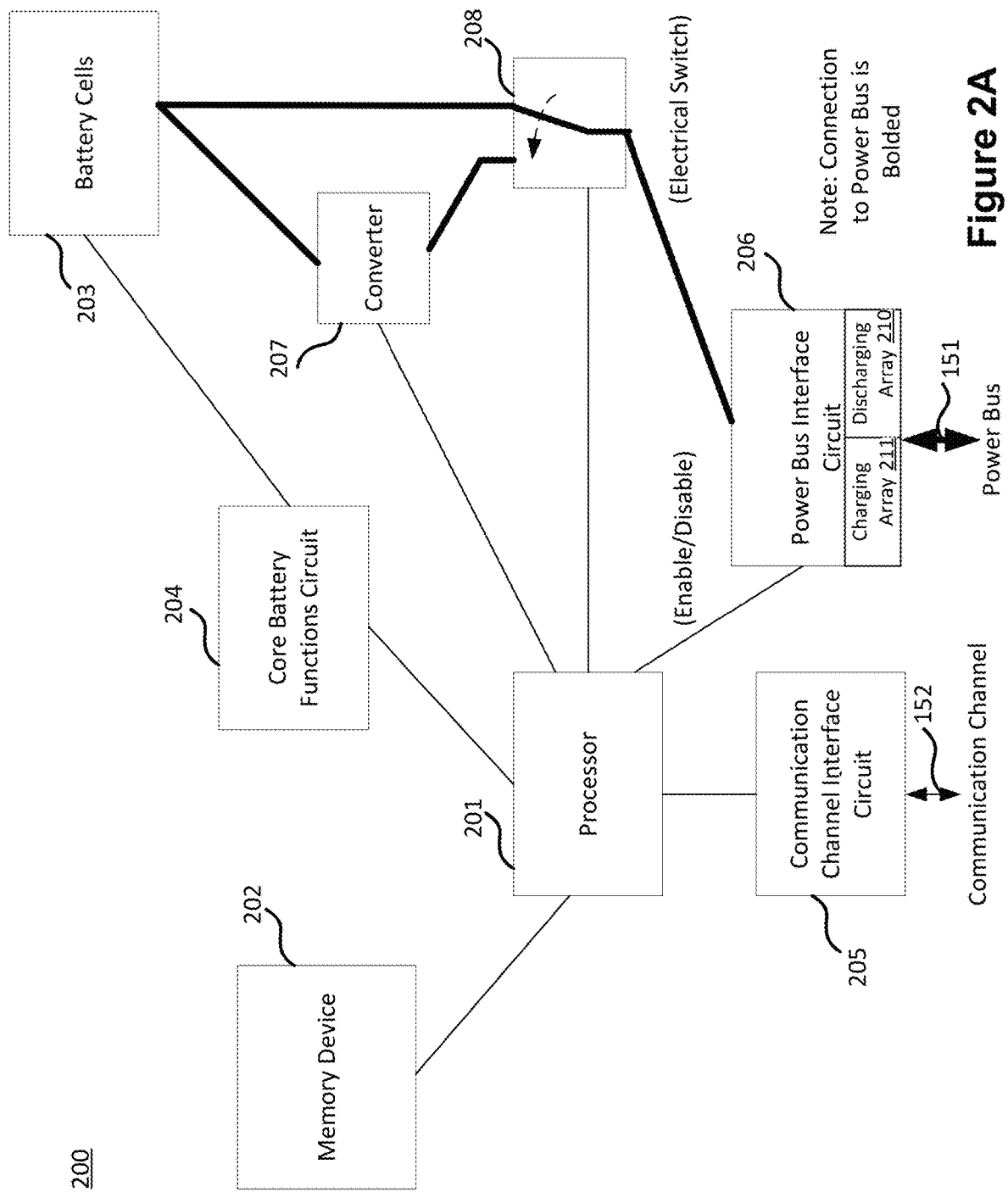
FIG. 2A shows a battery pack with an internal battery management system (BMS) in accordance with an embodiment.

FIG. 2A shows battery pack 200 with an internal battery management system (BMS) in accordance with an embodiment. The battery management system may be implemented by processor 201, which may comprise one or more microprocessors, controllers, microcontrollers, computing devices, and/or the like, executing computer-executable instructions stored at memory device 202.

As will be discussed, battery pack 200 may be configured as either a master battery pack or a slave battery pack without any change to the electrical or electronic components.

The power circuitry (including battery cells 203) of battery pack 200 interacts with power bus 151 through power bus interface circuit 206 when battery pack 200 is discharging, charging, and/or being balanced with respect to the other battery packs as will be discussed.

Battery pack 200 also interacts with communication channel 152 via communication channel interface circuit 205. For example, battery pack 200 may support messaging with other configured battery packs, with the end device being powered by the battery packs, or with a charger charging battery cells 203. Exemplary message flows are shown in FIGS. 6A-B, 8, 10, 12, 14-15, 18A-B, 21, and 23A-B as will be discussed in further detail.

Battery pack 200 supports core battery monitoring and/or management functionality via core battery functions circuit 204. For example, core battery functions may include battery cell status, battery cell balancing, short circuit protection, high temperature cut-off, over-current cut-off, and over-charge protection.

Referring to FIG. 2A, battery cells 203 may include a plurality of battery cells that are connected in series to obtain a desired voltage level. For example, with Li-ion technology, each battery cell may have a nominal voltage of approximately 3.6 volts. With four battery cells connected in series, the total nominal voltage provided by battery pack 200 is approximately 14.4 volts. When battery cells 203 comprises a plurality of battery cells, core battery functions circuit 204 may internally balance the charge among the different battery cells. In addition, battery pack 200 may be charge balanced with respect to the other battery packs in a battery system. The battery packs are often configured in a parallel fashion so that the resultant electrical current offered to an end device is the sum of electrical currents of the battery packs at an approximate voltage level of an individual battery pack.

Status information (also interchangeably referred herein as battery status information) may include the state of charge (SoC) information, state of health (SoH) information, temperature information, charging time information, discharge time information, and/or capacity information of the battery cells and/or of the battery pack.

As one with skill in the art would appreciate, the SoC is understood to be the level of charge of an electric battery relative to its capacity. The units of SoC are typically percentage points (0%=empty; 100%=full).

The SoH typically does not correspond to a particular physical quality since generally there is no consensus in the industry on how SoH should be determined. However, the SoH is indicative of internal resistance, battery storage capacity, battery output voltage, number of charge-discharge cycles, temperature of the battery cells during previous uses, total energy charged or discharged, and/or age of the battery cells to derive a value of the SoH. Knowing the SoH of the battery cells of battery pack 200 and the SoH threshold of a given end device (application) may provide a determination whether the present battery conditions are suitable for an application and an estimate about the battery pack's useful lifetime for that application.

When performing processes associated with battery management, battery pack 200 may receive or send values of at least the SoC and/or SoH from/to other battery packs as will discussed in further detail.

Power bus interface circuit 206 may comprise a switch circuit such as a semiconductor array 210 (for example, a MOSFET array or other power semiconductor switch device, such as an insulated gate bipolar transistor (IGBT) array, a thyristor array, etc.) that allows electrical current flow from battery pack 200 when battery pack 200 is discharging and semiconductor array 211 that allows electrical current flow to battery pack 200 when battery pack 200 is charging. Arrays 210, 211 are appropriately enabled by processor 201 in response to messaging from the master battery pack controller. (In a situation when battery pack is the master battery pack, messaging is internal to battery pack 200 rather via communication channel 152.) The power MOSFET arrays (e.g., N-Channel MOSFETs) may be used as switches to control power flow to and from the battery cells. The gates of the MOSFET arrays may be controlled by signals generated by a microcontroller and/or a battery management IC.

Power bus interface circuit 206 may be configured to prevent battery pack 200 from being charged or discharged through power bus 206 based on the status of battery cells 203 (for example, SoC, SoH, and/or voltage). Typically, arrays 210 and 211 are disabled when a battery pack is inserted into a battery system so that the battery pack does not charge or discharge until instructed and/or controlled by the master battery pack.

Battery pack 200 interacts with power bus 151 via electrical switch 208 (which may comprise one or more semiconductor devices). As shown in FIG. 2, direct exposure to power bus 151 bypasses converter 207. However, if battery cells are charged when the battery cells have a small SoC, the battery cells may incur an electrical current in-rush, often resulting in damage or degradation. Consequently, when the battery management system detects such a condition, electrical switch 208 may be configured so that charging of the battery pack 200 is controlled to minimize inrush current from the power bus 151 via the converter 207.

Figure 9:
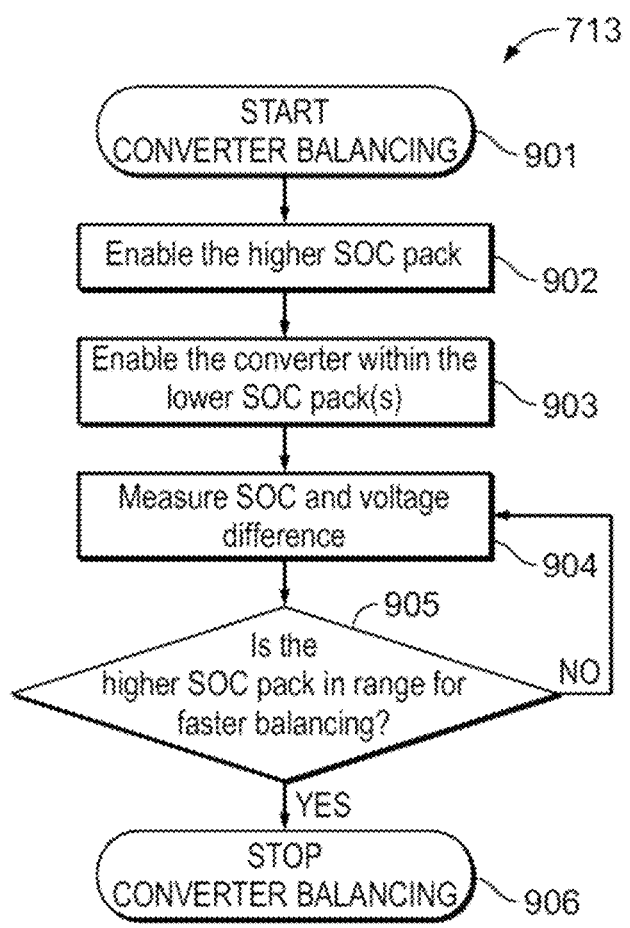
FIG. 9 shows a flowchart for converter balancing with a plurality of battery packs in accordance with an embodiment.
Figure 11:
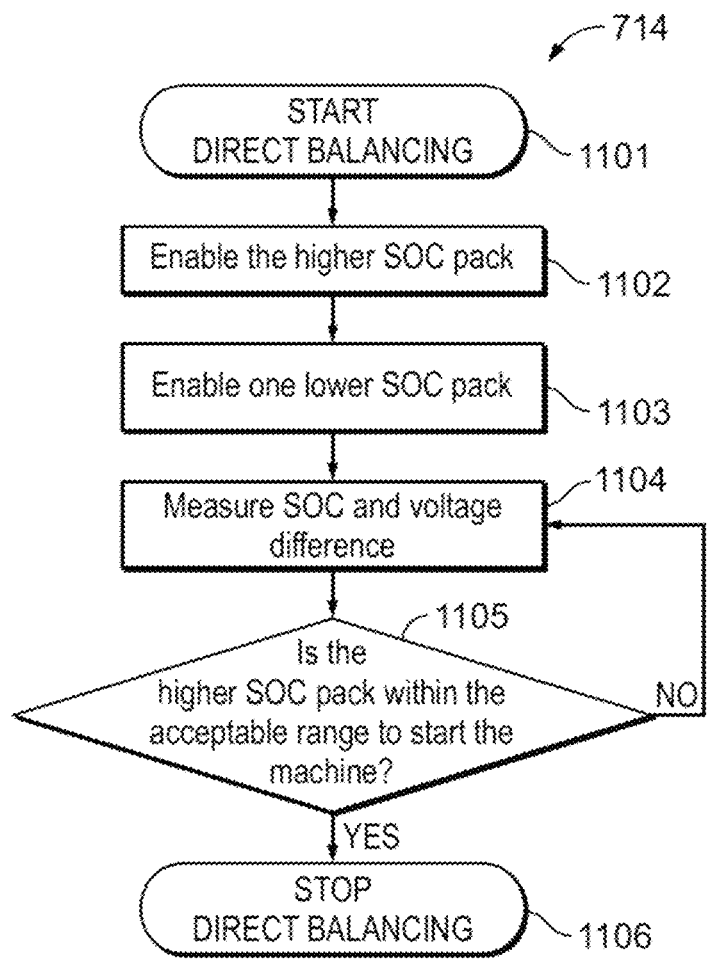
FIG. 11 shows a flowchart for direct balancing with a plurality of battery packs in accordance with an embodiment.

Converter 207 may assume different forms capable of controlling power transfer between the power bus and the cells of the battery pack such as by providing a stepped-down output voltage with respect to the input voltage (e.g., a buck converter, a auk converter, a buck-boost converter, a single-ended primary-inductor converter (SEPIC) converter, etc.) to protect battery cells 203 from an electrical current in-rush and enable battery cells 203 to slowly charge (for example, corresponding to converter balancing flowchart 713 as shown in FIG. 9). However, when converter 207 is bypassed, battery cells 203 may charge at a quicker rate (for example, corresponding to direct balancing flowchart 714 as shown in FIG. 11).

Processor 201 may support battery management processes (for example, processes 500, 700, 713, 714, 715, 1700, 2000, and 2200 as shown in FIGS. 5, 7A, 9, 11, 13, 17, 20, and 22, respectively) discussed herein. Processor 201 may control the overall operation of battery pack 200 and its associated components. Processor 201 may access and execute computer readable instructions from memory device 202, which may assume a variety of computer readable media. For example, computer readable media may be any available media that may be accessed by processor 201 and may include both volatile and nonvolatile media and removable and non-removable media. By way of example, and not limitation, computer readable media may comprise a combination of computer storage media and communication media.

Computer storage media may include volatile and non-volatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

While processor 201 and communication channel interface circuit 205 may be powered by battery cells 203, embodiments may have a separate power source for processor 201 and interface circuit 205. Consequently, battery pack 200 may continue to interact with the other battery packs over the communication channel regardless of the status of battery cells 203.

Figure 2B:
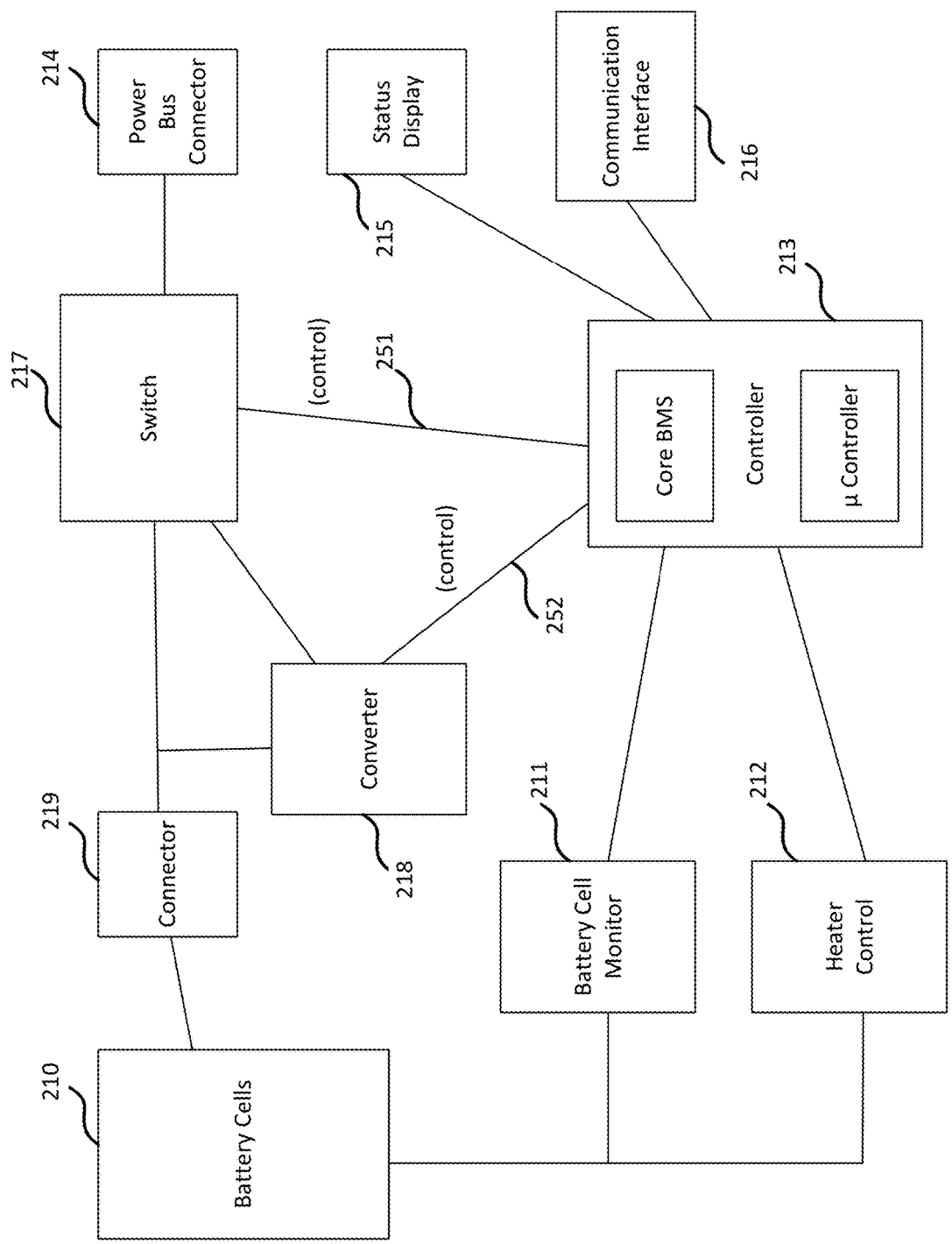
FIG. 2B shows a battery pack with an internal battery management system (BMS) in accordance with an embodiment.

FIG. 2B shows a variation of battery pack 200 shown in FIG. 2A. Battery cells 210 interact with the power bus through power bus connector 214, switch 217, converter 218, and connector 219. Switch 217 may include two sets (arrays) of semiconductor devices (for example, MOSFET's, insulated-gate bipolar transistors (GBTs), thyristors, and so forth) for allowing electrical current flow in either direction (into the battery pack for charging and out of the battery pack for discharging). Both arrays may be disabled to isolate the battery pack from the power bus, Typically, both arrays are disabled when a battery pack is inserted into a battery system. In addition, enabled converter 218 may be used to reduce an input voltage level to control charging of the battery cells to prevent an electrical current in-rush that may occur in some situations as will be discussed.

Controller 213 executes computer-executable instructions to perform processes discussed herein. For example, controller 213 obtains status information (for example, the SoC value) from battery cells 210 via battery monitor 211, provides battery pack status information via status display 215, and interacts with a communication channel (for example, a controller area network (CAN) bus) via communication bus interface 216.

In addition, a heater control circuit 212 may be used to ensure that the temperature of battery cells 210 does not drop below a minimum value so that battery cells 210 can properly operate as expected.

Figure 3:
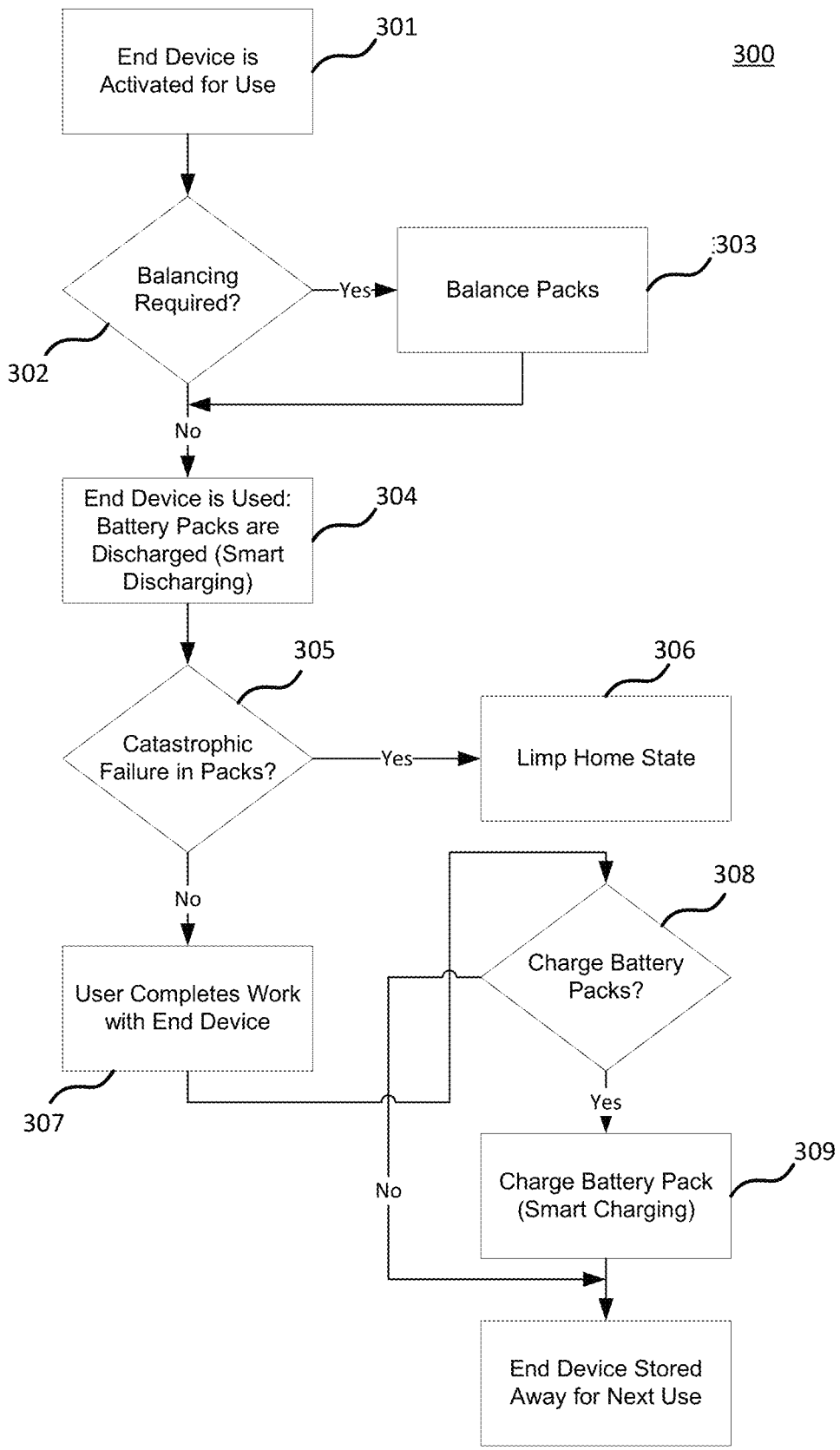
FIG. 3 shows a flowchart for an overall process of electrically powering an end device by a plurality of battery packs in accordance with an embodiment.

FIG. 3 shows flowchart 300 for an overall process of electrically powering an end device (for example, end device 101 as shown in FIG. 1) by a plurality of battery packs (for example, battery packs 100) in accordance with an embodiment.

At block 301, end device 101 is activated. For example, a user may close a battery compartment of end device 101, turn a key, and/or flip a switch to generate an interlock signal.

At block 302, the battery management system of the master battery pack determines whether to balance the battery packs when the battery compartment has more than two battery packs. If so, the difference of charge of the battery packs may be reduced by one or more battery packs discharging to charge one or more of the other battery packs at block 303 as will be discussed in further detail.

After balancing (if needed), the end device is powered by discharging one or more of the battery packs at block 304. For example, based on the power requirements of the end device and the SoC values of the battery packs, the battery management system of the master battery pack may enable the appropriate battery packs.

If a catastrophic failure is detected at block 305 for one of the enabled battery packs while powering the end device, limp home state operation at block 306 may be initiated in order to continue powering the end device as will be discussed in further detail.

When the user completes using the end device at block 307, block 308 determines whether charging is needed. If so, a charger may be connected to the battery system to restore the battery cells, where charging may be initiated at block 309.

While not explicitly shown, balancing of the battery packs may be performed before charging the battery packs at block 308 when the SoC values of the battery packs are sufficiently different.

With the embodiments, all of the plurality of battery packs may have the same electrical and electronic components. No configuration is typically needed to a battery pack when the battery pack is installed in the battery system. Rather, the battery pack assumes the role of either a master battery pack or a slave battery pack based on processes discussed herein after the battery pack is inserted into the system and the battery pack commences activity on the communication channel. As will be discussed in further detail, a configuration list may be conveyed over the communication channel, where the configuration includes entries for each of the master and slave battery packs.

The processes discussed herein are shown from the perspective of the master battery pack and are typically executed by the master battery pack in the battery system. The other installed battery packs in the battery system serve as slave battery packs. However, the slave battery packs interact with the master battery pack over the communication channel. For example, a slave battery pack provides its battery cell status information and activates/deactivates power switches to interact with the power bus (for example, allowing electrical current (charge) to flow into or from the battery pack) responsive to messaging from the master battery pack. Consequently, while not explicitly shown, there are corresponding processes executed by each of the slave battery packs.

Figure 4:
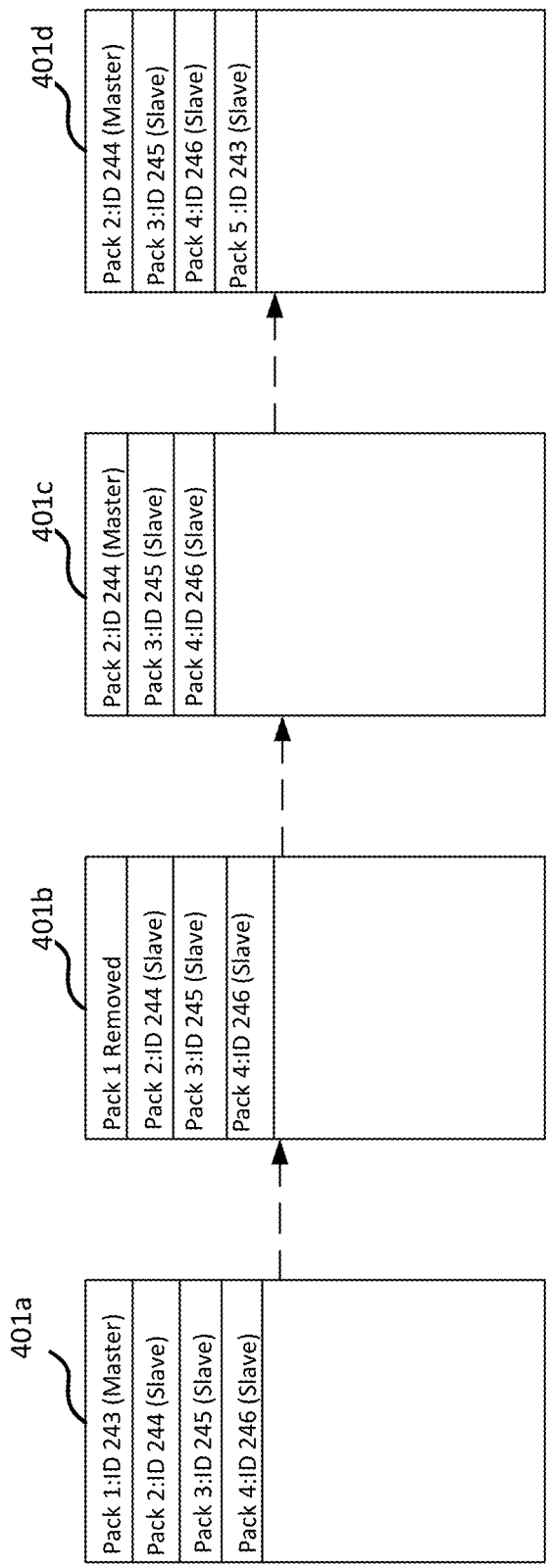
FIG. 4 shows an updating of a configuration list of a plurality of battery packs in accordance with an embodiment.

FIG. 4 shows an updating of configuration list 401a,401b, 401c,401d of a plurality of battery packs as different battery packs are inserted into and removed from the battery system. Each battery pack is assigned an identification (ID) in accordance with a standardized process, such as the SAE J1939 Address Claim Procedure and/or the like. For example, configuration list 401a contains four entries: pack 1 (which is configured as the master battery pack) and three slave battery packs (packs 2-4).

As will be discussed in greater detail, the master battery pack gather status information about the other battery packs (the slave battery packs) and consequently instructs the slave battery packs, as well as itself, to discharge or charge in response to the operation situation.

With the embodiment shown in FIG. 4, the first (top) member of configuration list 401a,401b,401c,401d is configured as the master battery pack. When a battery pack is added to the battery system, an entry is created at the bottom of the configuration list for that battery pack. Consequently, the oldest member of configuration list 401a,401b,401c, 401d is configured as the master battery pack.

Selecting the oldest (top) member of configuration list 401c may be advantageous to traditional approaches. For example, the number of changes of the master battery packs may be reduced with respect to determining the master battery pack based on the ID value. With the latter approach, a second change would occur from configuration list 401d, where pack 5 would become the master battery pack.

In the installation scenario shown in FIG. 4, pack 1 (which serves as the master battery pack) is removed as shown in configuration list 401b. Consequently, pack 2 (the oldest slave battery pack) becomes the new master battery pack as shown in configuration list 401c. In order to complete the transition, pack 2 may request pack information from the other battery packs to be able to properly instruct the other battery packs.

Subsequently, pack 5 is inserted into the battery system resulting in a new entry being added to configuration list 401d, where ID 243 is the same ID for previously removed pack 1. With embodiment shown in FIG. 4, pack 5 may be old master pack that is reinserted or a new battery pack that is inserted into the battery system.

With some embodiments, when a battery pack is removed from a battery system, battery pack information may be lost. When the battery pack is reinserted, the reinserted battery pack may obtain battery information from the configured battery packs. However, some embodiments may support memory persistence (e.g., flash memory) so that battery pack information is retained at the battery pack even when the battery pack is removed and reinserted.

Figure 5:
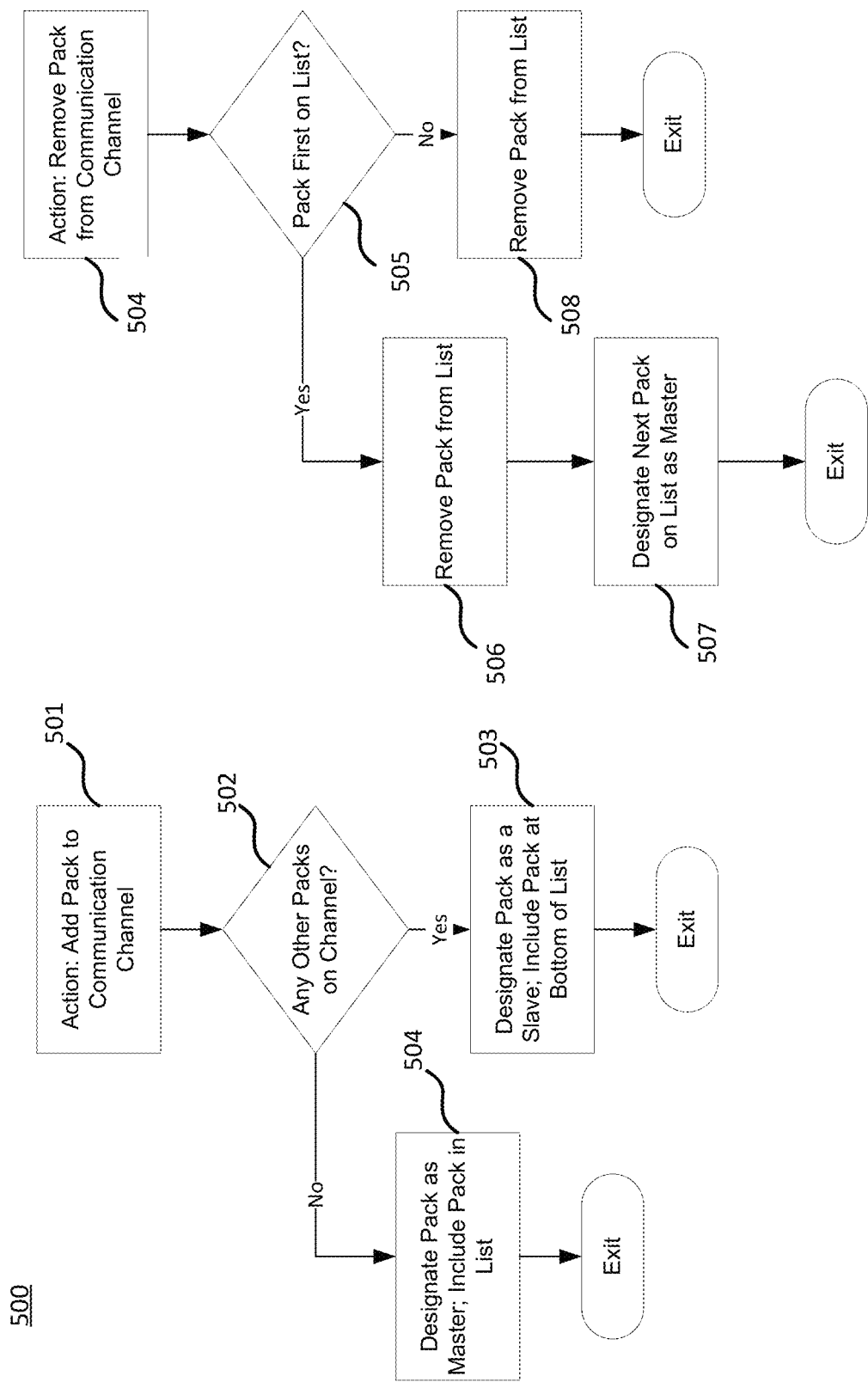
FIG. 5 shows a flowchart for configuring a plurality of battery packs in accordance with an embodiment.

FIG. 5 shows flowchart 500 for configuring a plurality of battery packs in accordance with an embodiment. At block 501, a battery pack is added to the battery system. If no other battery packs are connected to the communication channel, as determined at block 502, an entry is added to the top of the configuration list, and the battery pack becomes the master battery pack at block 504. Otherwise, the added battery pack is added to the bottom of the configuration list and becomes a slave battery pack at block 503.

At block 504, a battery pack is removed from the battery system. If the battery pack is the first member of the configuration list, as determined at block 505, the entry is removed at block 506 and the battery pack corresponding to the next entry is designated as the master battery pack at block 507. Otherwise, the entry for the removed battery pack is deleted at block 508.

Figure 6A:
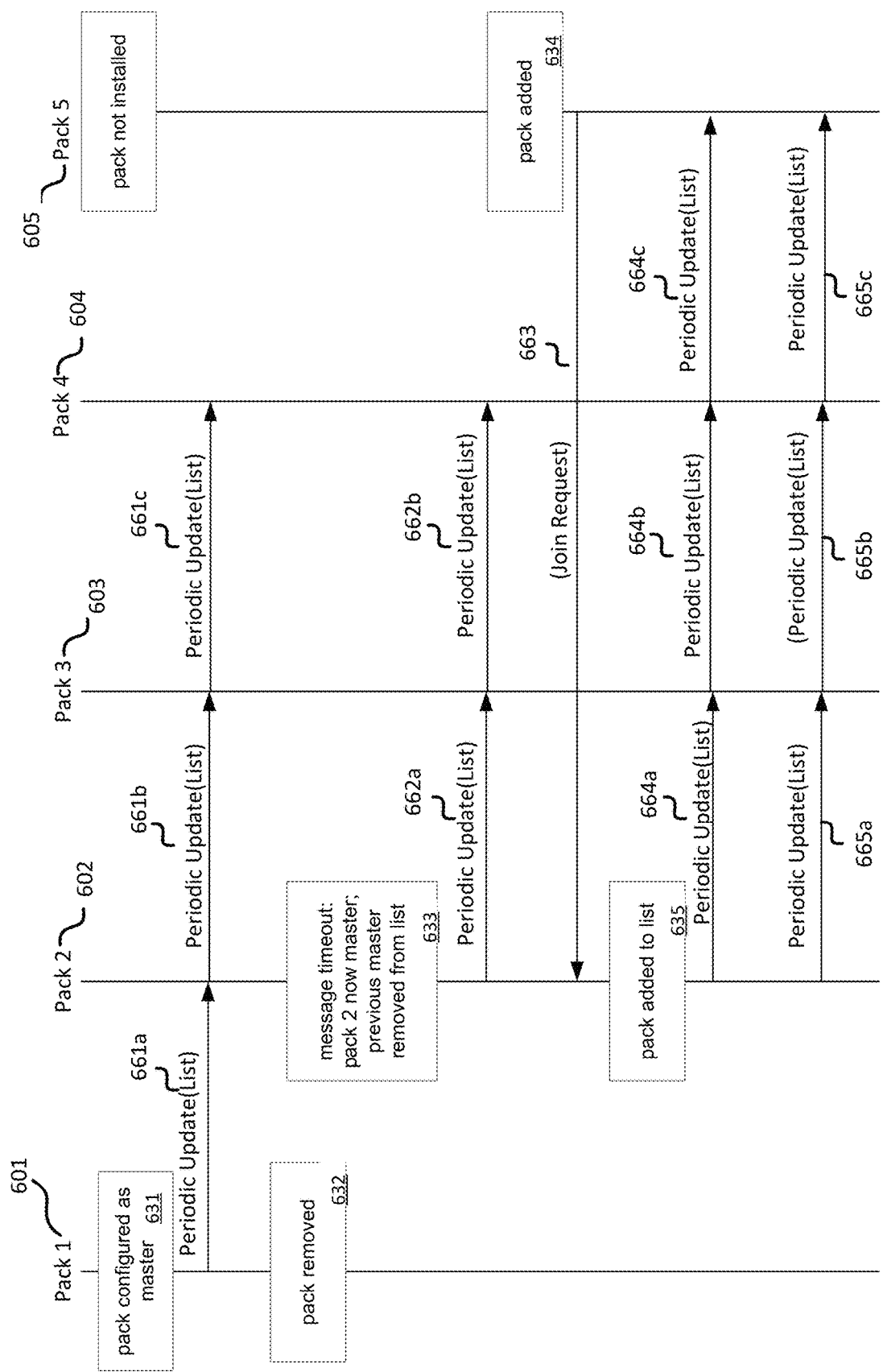
FIG. 6A shows a generic message flow scenario for configuring a plurality of battery packs in accordance with an embodiment.

FIG. 6A shows a generic message flow scenario for configuring a plurality of battery packs in accordance with flowchart as shown in FIG. 5. The generic messages represent messages supported by different communication channels, for example via a controller area network (CAN) bus, Ethernet, Industrial Ethernet, MODBUS, or Bluetooth Low Energy (BLE) and/or the like.

The message flow in FIG. 6A is based on a centralized approach, in which the master battery pack maintains the configuration list and repetitively sends it (for example, periodically) to the other battery packs over a communication channel. However, embodiments (for example, as shown in FIG. 6D) may support a distributed approach, in which each battery pack locally maintains its own configuration list and repetitively broadcasts it over the communication channel. Since a battery pack receives all broadcasts from the other battery packs, the battery pack is able to modify its own configuration list to be consistent with the configuration lists broadcast by the other battery packs.

When pack 601 (pack 1) becomes the master battery pack at event 631, pack 601 sends periodic update messages 661a,661b,661c to packs 602, 603, and 604, respectively. If the message protocol supports a single broadcast message (for example, with a global destination address) that is received and processed by all battery packs connected to the communication channel, then only one message is sent by pack 601. Otherwise, pack 601 sends separate messages to packs 602, 603, and 604 (which are configured as slave battery packs).

With some embodiments, messages 661a, 661b, 661c may be sent repetitively but not periodically.

Periodic update message 661a, 661b, 661c may contain configuration information (for example configuration list 401a, 401b, 401c, 401d as shown in FIG. 4). With some embodiments, pack 601 sends broadcast messages periodically. However, if pack 601 were removed (for example, corresponding to event 632), periodic transmission of the update messages would be disrupted.

When the disruption is detected by the oldest slave battery pack (pack 602) at event 633, pack 602 assumes the role of the master battery pack. Consequently, pack 602 removes the top entry of the configuration list (corresponding to pack 601) and periodically sends the revised configuration list via update message 662a,662b.

When pack 605 (pack 5) is added at event 634, pack 605 sends join request 663 in accordance with the SAE J1939 address claim procedure. Consequently, pack 605 is added by pack 602 (currently the master battery pack) at event 635, and pack 602 periodically sends update messages 664a, 664b, 664c and 665a, 665b, 665c.

Figure 6B:
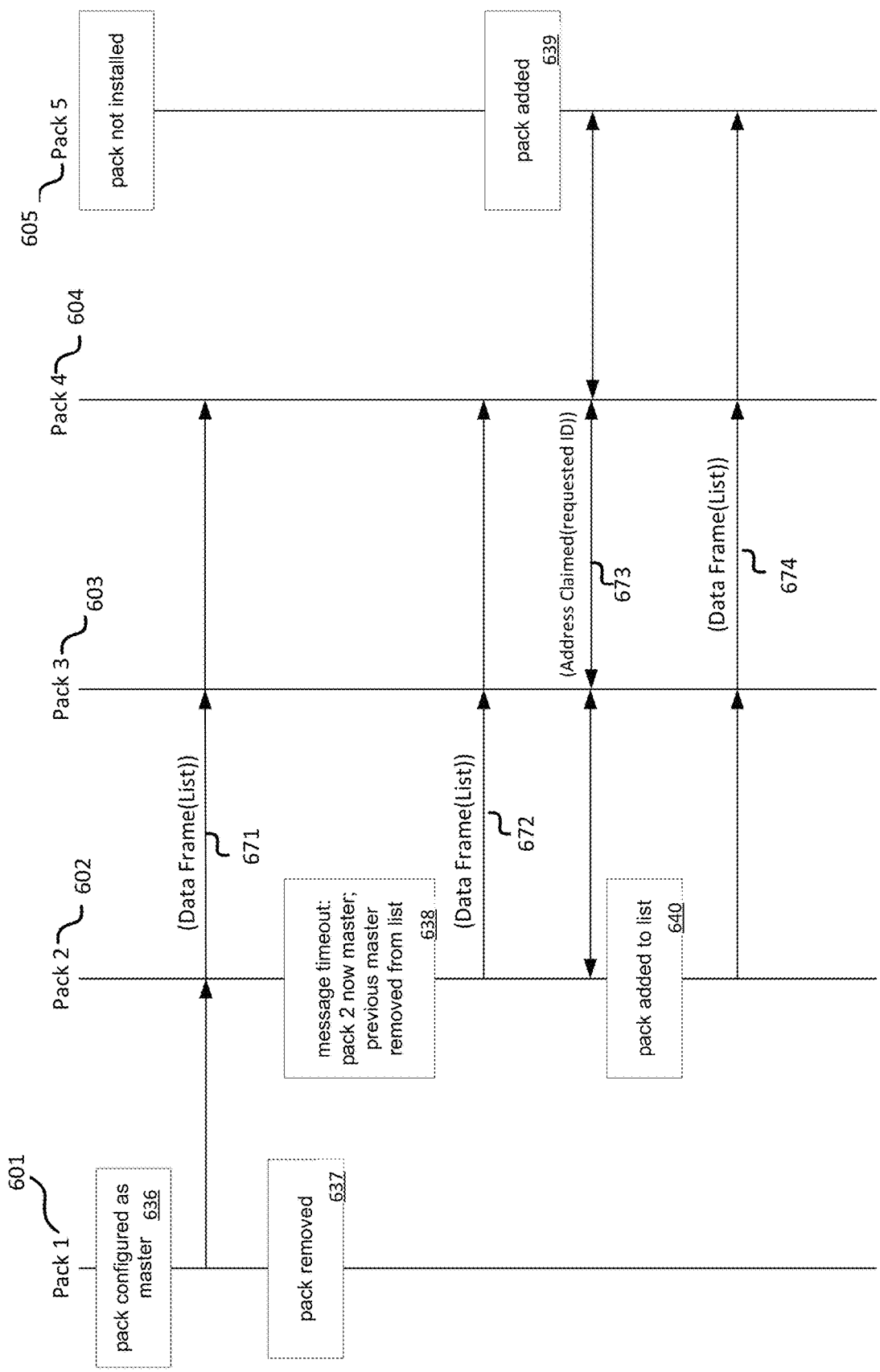
FIG. 6B shows a message flow scenario over a controller area network (CAN) bus for configuring a plurality of battery packs in accordance with an embodiment.

FIG. 6B shows a message flow scenario over a CAN bus for configuring a plurality of battery packs in accordance with an embodiment.

The CAN communications protocol (ISO-11898: 2003) describes how information is passed between devices on a network and conforms to the Open Systems Interconnection (OSI) model that is defined in terms of layers. Actual communication between devices connected by the physical medium is defined by the physical layer of the model. The ISO 11898 architecture defines the lowest two layers of the seven-layer OSI/ISO model referred as the data-link layer and physical layer.

The CAN communication protocol supports both a standard version (11-bit identifier field) and an extended version (29-bit identifier field). However, embodiments typically use the standard version because the supported identifier space is typically more than enough.

The CAN bus is often referred to as a broadcast type of bus, where each message contains a source address (for example, a device ID) but not a destination address. Consequently, all battery packs (corresponding to nodes) can "hear" all transmissions. A battery pack may selectively ignore a message or may process the message by providing local filtering so that each battery pack may respond to pertinent messages.

Embodiments may use the data frame message specified in the CAN protocol. This message type carries a 0-8 byte payload, where the data field is interpreted at a higher protocol layer (typically by a software application executing at the battery packs). For example, the data field may convey SoC and/or SoH information when a slave battery pack sends status information back to the master battery pack.

In order to assign an identification value (address) to a battery pack, end device, or charger, embodiments may utilize an industry standard, such as the SAE J1939 address claim procedure. The SAE J1939 protocol is a higher protocol layer built on top the CAN data-link and physical layers.

Referring to FIG. 6B, when pack 601 (pack 1) becomes the master battery pack at event 636, pack 601 sends periodic data frame message 671 to packs 602, 603, and 604, respectively. (Because the CAN protocol supports only a source address, all battery packs may receive and process a single broadcast message sent via the CAN bus.) Data frame message 671 corresponds to periodic update message 661a, 661b, 661c shown in FIG. 6A. Data frame message 671 contains at least the configuration list in the payload.

When pack 601 is removed (for example, corresponding to event 637), periodic transmission of the periodic data frame messages is disrupted.

When the disruption is detected by the oldest slave battery pack (pack 602) at event 638, pack 602 assumes the role of the master battery pack. Consequently, pack 602 removes the top entry of the configuration list (corresponding to pack 601) and periodically sends the revised configuration list via data frame message 672.

When pack 605 (pack 5) is added at event 639, pack 605 initiates the address claimed procedure 673 claiming its identification (ID) value. When successfully completed, an entry with the identification of pack 605 is added to the bottom of the configuration list by master battery pack 602 at event 640.

Subsequently, pack 602 (now the master battery pack) periodically sends broadcast data frame message 674.

Figure 6C:
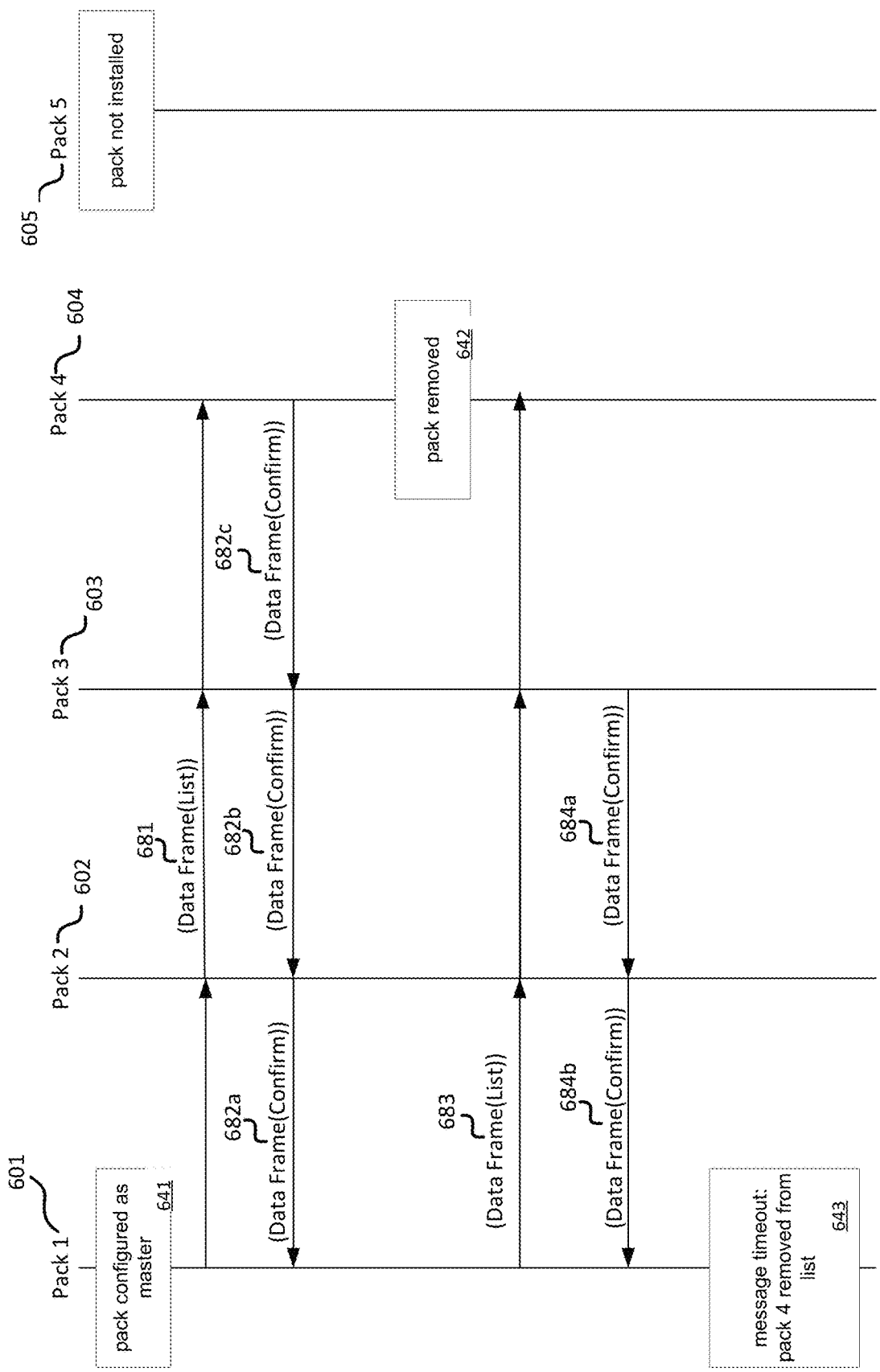
FIG. 6C shows another message flow scenario over a controller area network (CAN) bus for configuring a plurality of battery packs in accordance with an embodiment.
Figure 6D:
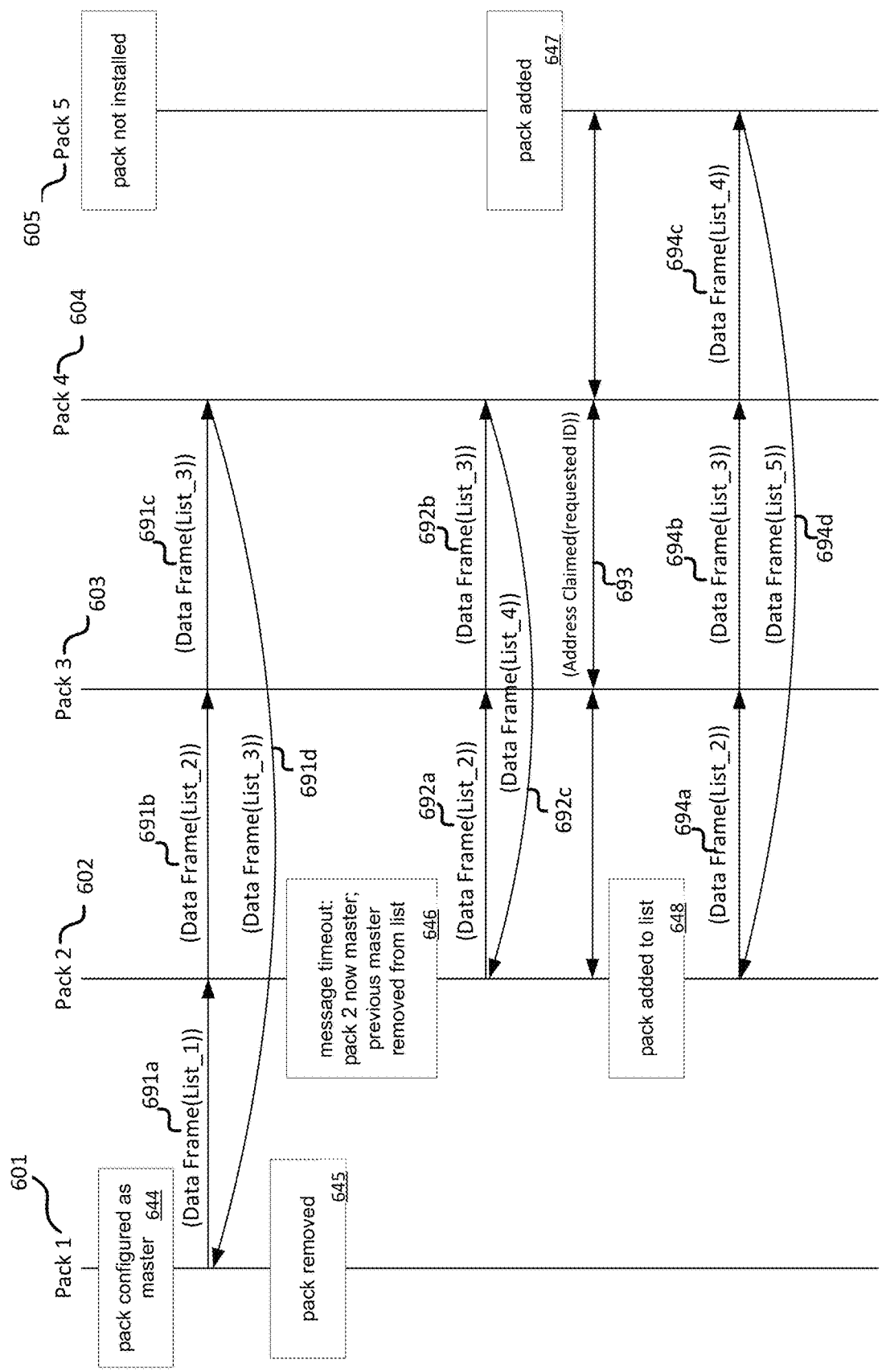
FIG. 6D shows another message flow scenario over a controller area network (CAN) bus for configuring a plurality of battery packs in accordance with an embodiment.

FIG. 6C shows a variation of the message flow scenario shown in FIG. 6B for configuring a plurality of battery packs in accordance with an embodiment. As with FIG. 6B, pack 601 (designated as the master battery pack at event 641) periodically sends the configuration list via message 681. However, slave battery packs 602, 603, and 604 return confirmation messages 682a-c to confirm reception.

At event 642, battery pack 604 is removed from the battery system. When battery pack 601 periodically sends message 683, only messages 684a-b are returned. Consequently, a message timeout occurs at event 643, and master battery pack 601 detects that battery pack 604 has been removed and removes the entry for battery pack 604 from the configuration list. The modified configuration list is included in the next periodic broadcast.

FIG. 6D shows a variation of the message flow scenario shown in FIG. 6B, where the configuration list is maintained in a distributed rather than a centralized fashion.

Battery pack 601 is distributed as the master battery pack at event 644. Rather than the master battery pack maintaining and sending the configuration list to the other battery packs, each of the active battery packs 601-604 maintains its own configuration list and broadcasts it via messages 691a-d to the other battery packs via the CAN bus, where list_1, list_2, list_3, and list_4 correspond to the configuration messages maintained at battery packs 601-604, respectively. As necessary, battery packs 601-604 may modify its own configuration list to be consistent with the configuration lists broadcast by the other battery packs. For example, a battery pack may have been recently inserted into a battery system and may need to revise its configuration list to be consistent with the current configuration.

When pack 601 is removed (for example, corresponding to event 645), periodic transmission of the periodic data frame messages from battery pack 601 terminates.

When the termination is detected by battery packs 602-604 at event 646, pack 602 assumes the role of the master battery pack. Consequently, packs 602-604 remove the top entry of the configuration list (corresponding to pack 601) that is locally maintained at the battery packs 602-604 and periodically send the revised configuration list via data frame messages 692a-c.

When pack 605 (pack 5) is added at event 647, pack 605 initiates the address claimed procedure 693 claiming its identification (ID) value. When successfully completed, battery packs 602-604 adds pack 5 to the bottom of the local copy of the configuration list. 605 at event 648, and subsequently the revised configuration list is broadcast via data frame messages 694a-d. With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

As previously discussed, some embodiments order a configuration list based on the time that battery packs are connected to the communication channel (for example, CAN bus). With this approach, the oldest battery pack is designated as the master battery pack. However, other embodiments may use different approaches. For example, the members of the configuration list may be ordered from top to bottom by decreasing values of the open circuit voltages of the battery packs. The open circuit voltage of a battery pack may be measured when the battery pack's discharging array is disabled (in other words, the battery pack is not discharging onto the power bus of the battery system).

Each battery pack can share its measured open circuit voltage with the other battery packs that are connected to the communication channel. Based on the measured open circuit voltages, a configuration list is maintained, where entries for each battery pack are listed by decreasing order. The battery pack corresponding to the top entry has the largest open circuit voltage and serves as the master battery pack for battery system. With an exemplary embodiment, a battery system comprises first, second, and third battery packs having open circuit voltages $V_{open1}$, $V_{open2}$, and $V_{open3}$, respectively, where $V_{open2} > V_{open3} > V_{open1}$. The top entry of the configuration list is associated with the second battery pack (the master battery pack) followed by an entry for the third battery pack followed by an entry for the first battery pack. Consequently, if the second battery were to fail, the third battery pack would assume the role of the master battery pack.

With some embodiments, the battery packs in a battery system are assigned an ID and at the same time the open circuit voltage may be measured and stored in the configuration list. In the infrequent situation where the open circuit voltages of two battery packs are equal, one battery pack may be chosen randomly or may be chosen by the highest number ID.

The configuration list may be updated as battery packs are installed into the battery system. For example, a battery pack that is installed after discharging begins would initially enter in a standby state (where the discharging array is disabled) so that an open circuit voltage can be measured by the battery pack. The newly installed battery pack could than share the measured open circuit voltage with the other battery packs via the communication channel. With some embodiments, the configuration list can then be updated with an entry for the newly installed battery pack based on the measured open circuit voltage. However, with some embodiments, the current configuration list may remain unchanged until the battery packs being discharged are disconnected from the battery system.

With some embodiments, the configuration list may be centrally maintained by the master battery pack. However, with some embodiments, each battery pack in the battery system may maintain its own copy of the configuration list based on information shared via the communication channel.

With an aspect of the embodiments related to balancing, as will be discussed, the in-rush of electrical current among multiple Li-ion battery packs in a large-format battery pack system is an undesirable phenomenon arising with Li-ion battery cells since a large in-rush electrical current may reduce the life of Li-ion battery cells. This phenomenon may occur due to a large variation of SoC values among the battery packs in the battery system. For example, when a brand new Li-ion battery pack is added to a battery pack system, its capacity (e.g., energy level) at the beginning of its new life may be notably different than capacities of the battery cells of older battery packs already present in the battery pack system. This energy level differential between the cells of the new battery pack and the cells of the older battery packs can potentially damage the other Li-ion battery cells in the battery pack system. The aspect involves a balancing technique that leverages the internal (not external) battery management system and the master-slave topology.

With an aspect of the embodiment, different balance techniques for Li-ion battery cells may be supported in a large-format battery pack system. For example, the aspect includes three balancing techniques: "smart converter balancing," "start direct balancing," and "start staggered balancing" that may be used in a medium-large battery pack implementation to ensure the safe use and longevity of the Li-ion battery cells. The aspect may utilize a converter (with a cell pre-charge circuit) for charge balancing each battery pack to prevent and/or limit in-rush electrical current, over-current faults, and/or short-circuit faults.

Figure 7A:
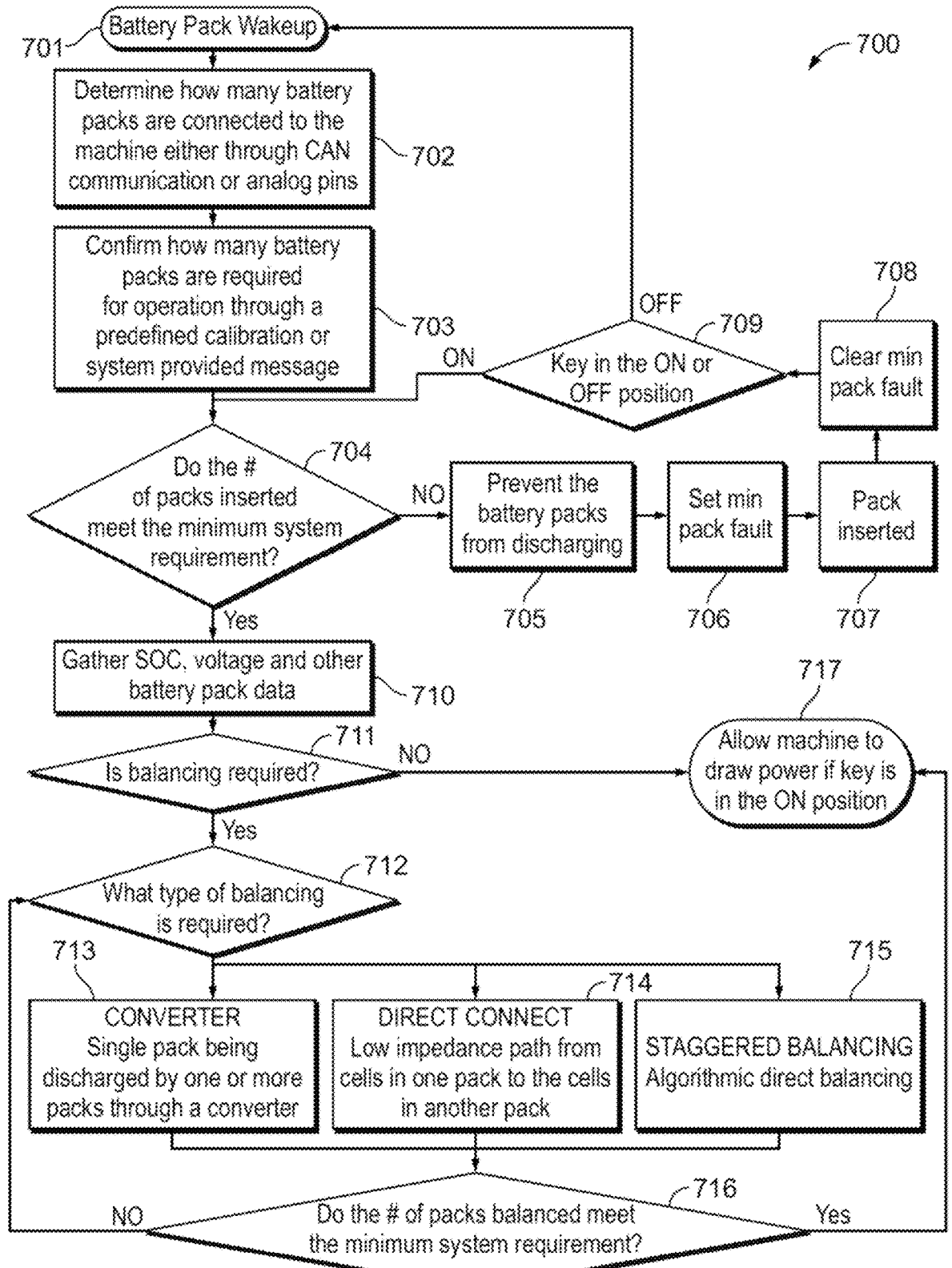
FIG. 7A shows a flowchart for determining a balancing type for a plurality of battery packs in accordance with an embodiment.

FIG. 7A shows flowchart 700 for determining a balancing type for a plurality of battery packs in accordance with an embodiment.

At block 701, the master battery pack transitions from a sleep state. For example, when an end device is not being used, the master battery pack may periodically wake up to determine whether there is a change in the operational state.

At block 702, the master battery pack determines the number of battery packs that are installed in the battery system. For example, the master pack may verify that all battery packs on the confirmation list are active on the communications channel.

At block 704, the master battery pack determines whether a minimum number of battery packs (including itself) are installed based on power requirements of a device (for example, obtained from the end device via the communication channel).

If there are not a minimum number of battery packs available to properly power the end device, then the configured battery packs are prevented from discharging at block 705 by the master battery pack instructing the slave battery packs (as well as itself) to open corresponding discharge arrays. A fault indicator is activated at block 706 that is indicative that not enough battery packs are installed to power the end device. If an additional battery pack is installed at block 707, the fault indicator is cleared at block 708. If the end device is activated or otherwise enabled at block 709 (for example, the key is in the "on" position), process 700 returns to block 704. Otherwise, process 700 returns to block 701.

Returning back to block 704, when the master battery pack determines that there are a sufficient number of battery packs, the master battery pack gathers battery pack information (for example, SoC, SoH, and voltage information) from each of the slave battery packs as well as for itself at block 710. For example, as will be discussed in further detail, the master battery pack may send a "Request for Pack Info" message to each of the configured slave battery packs and receive a "Pack Info" message from each slave battery pack in response with the requested information.

From the gathered SoC data, the master battery pack determines whether balancing is required at block 711. For example, some of the battery packs may have a high SoC while some may have a low SoC. By balancing the battery packs, a sufficient number of battery packs may be available to properly discharge in order to power the end device.

If balancing is not required, the battery system may discharge to power the end device at block 717.

If balancing is required, the type of balancing is determined at block 712. As will discussed in greater detail, embodiments may support three different types of balancing: converter balancing (block 713), direct balancing (block 714), and staggered balancing (block 715).

Tables 1 and 2 present examples of balancing in accordance with embodiments.

TABLE 1

Example of Balancing

| Time | Pack 1 | Pack 2 | Pack 3 | Pack 4 | Type |
|---|---|---|---|---|---|
| T0 | 100% | 15% | 15% | 15% | Converter |
| T1 | 85% | 20% | 20% | 20% | Converter |
| T2 | 65% | 32%* | 32% | 32% | Staggered |
| T3 | 60% | 38% | 33%* | 33% | Staggered |
| T4 | 54% | 39% | 39% | 34%* | Staggered |
| T5 | 49% | 40%* | 40% | 40% | Staggered |
| T6 | 45% | 43% | 41%* | 41% | Staggered |

Continue staggered balancing until completed
Note:
*denotes that the battery pack is being direct charged by Pack 1

TABLE 2

Example of Balancing

| Time | Pack 1 | Pack 2 | Type |
|---|---|---|---|
| T0 | 100% | 15% | Converter |
| T1 | 85% | 20% | Converter |
| T2 | 65% | 32% | Direct |
| T3 | 60% | 37% | Direct |

TABLE 2-continued

Example of Balancing

| Time | Pack 1 | Pack 2 | Type |
|------|--------|--------|------|
| T4 | 55% | 42% | Direct |
| T5 | 48% | 48% | (Balancing Completed) |

The above to examples illustrate that the type of balancing may change while the battery packs are being balanced. For example, with Table 1 the balancing type changes from converter balancing to staggered balancing while with Table 2 the balancing type changes from converter balancing to direct balancing.

After balancing, if the number of battery packs are available for discharging, as determined at block 716, the end device may be powered at block 717. Otherwise, the battery packs may be rebalanced based on the revised SoC values obtained from the previous balancing.

When rebalancing occurs, as determined at block 716, the rebalancing may utilize a different type of balancing than previously used. For example, converter balancing may be first applied while subsequent rebalancing may utilize staggered balancing.

Figure 7B:
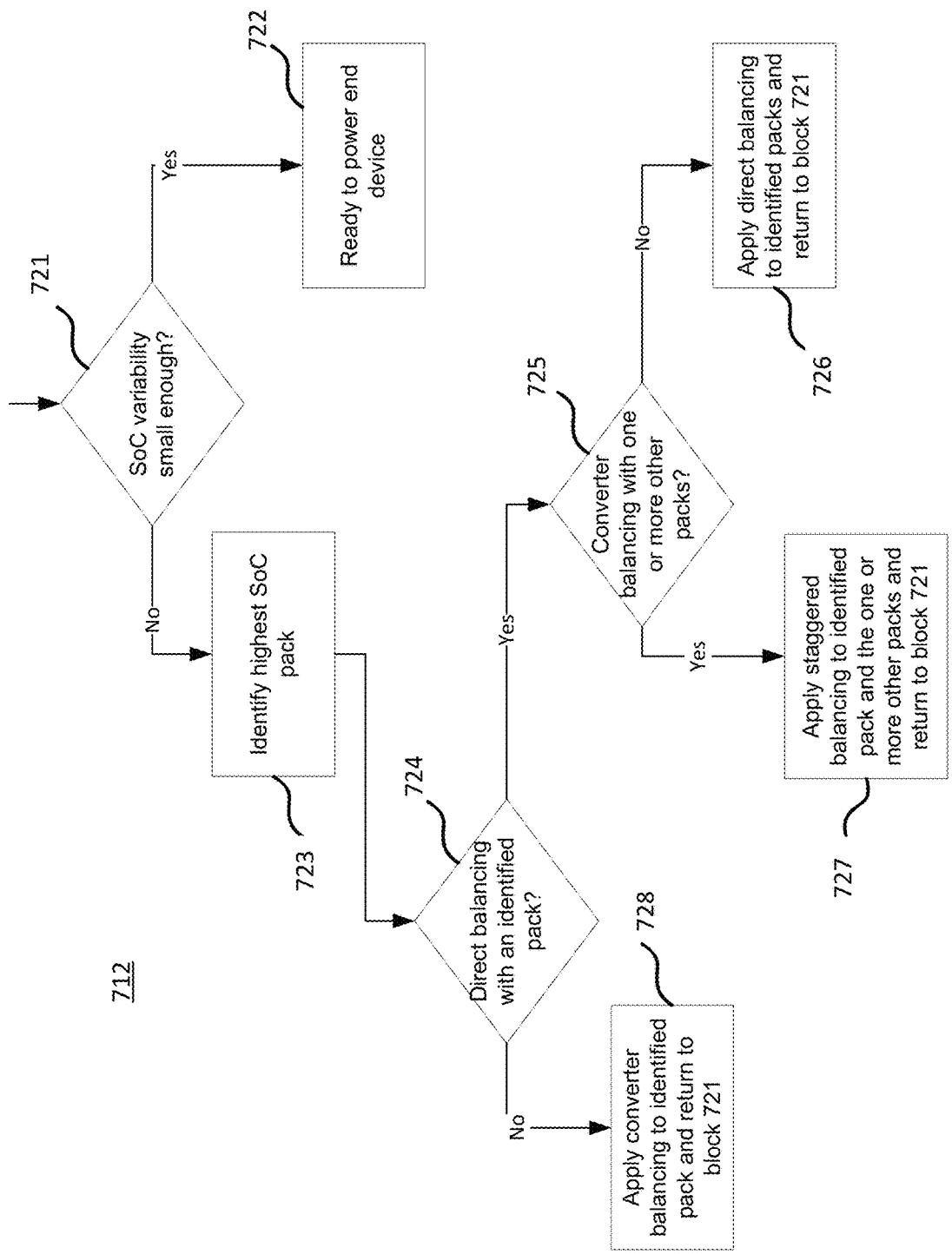
FIG. 7B shows a flowchart for selecting one of three balancing types for a plurality of battery packs in accordance with an embodiment.

FIG. 7B expands on block 712 shown in FIG. 7A for determining the type of charge balancing. For example, an embodiment may support a plurality of balancing types such as direct balancing, converter balancing, and staggered balancing as previously discussed.

At block 721, if the variability of the SoC values among the battery packs is sufficiently small, the battery system is able to power the end device at block 722. (For example, the SoC differences between all pairs of battery packs is less than a predetermined threshold.) Otherwise, process 712 proceeds with balancing the battery packs.

Block 723 identifies the battery pack with the highest SoC value so that the identified battery pack can discharge, thus providing charge to the other battery packs during balancing.

At block 724 process 712 determines whether direct balancing cannot be applied (for example, when the SoC difference between the highest SoC pack and an identified battery pack is above a predetermined SoC threshold). If so, converter balancing is applied to the identified battery pack (where the highest SoC battery pack discharges onto the power bus and the identified battery pack charges through the power bus via its converter) at block 728. When converter balancing is completed, process 712 may revert back to block 721 and determine whether balancing can be applied to a different combination of battery packs, where the balancing type may be the same or may be different (for example, direct balancing or staggered balancing).

Referring back to block 724, if direct balancing can be applied (for example, when the SoC difference between the highest SoC pack and the identified battery pack is below the predetermined SoC threshold), process 712 determines whether converter balancing can be applied to one or more other battery packs at block 725. If so, staggered balancing is applied with the highest SoC pack, the identified pack, and the one or more other packs at block 727. Otherwise, direct balancing is applied between the highest SoC pack and the identified battery pack at block 726.

Figure 7C:
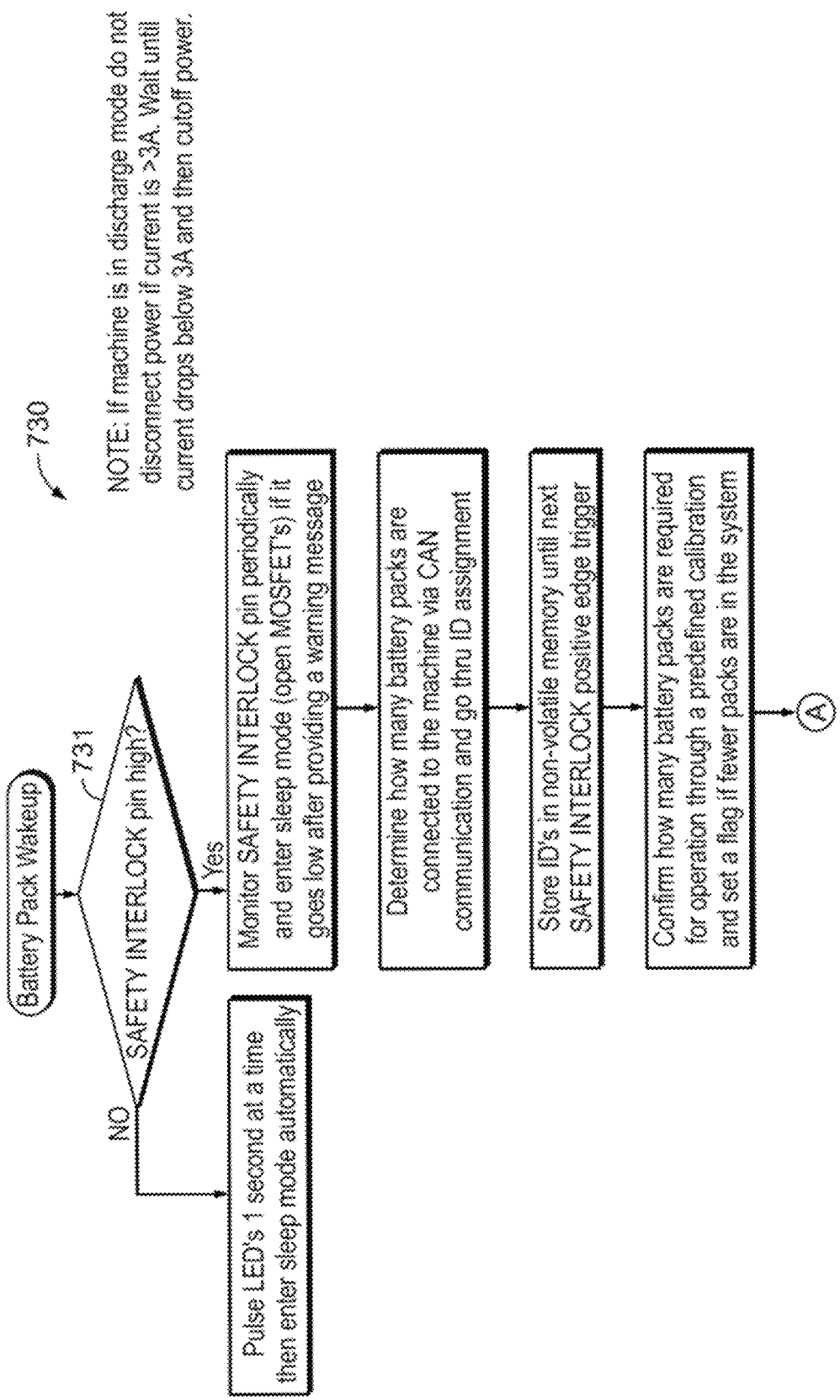
FIG. 7C shows a flowchart for determining a balancing type for a plurality of battery packs in accordance with an embodiment.
Figure 7C:
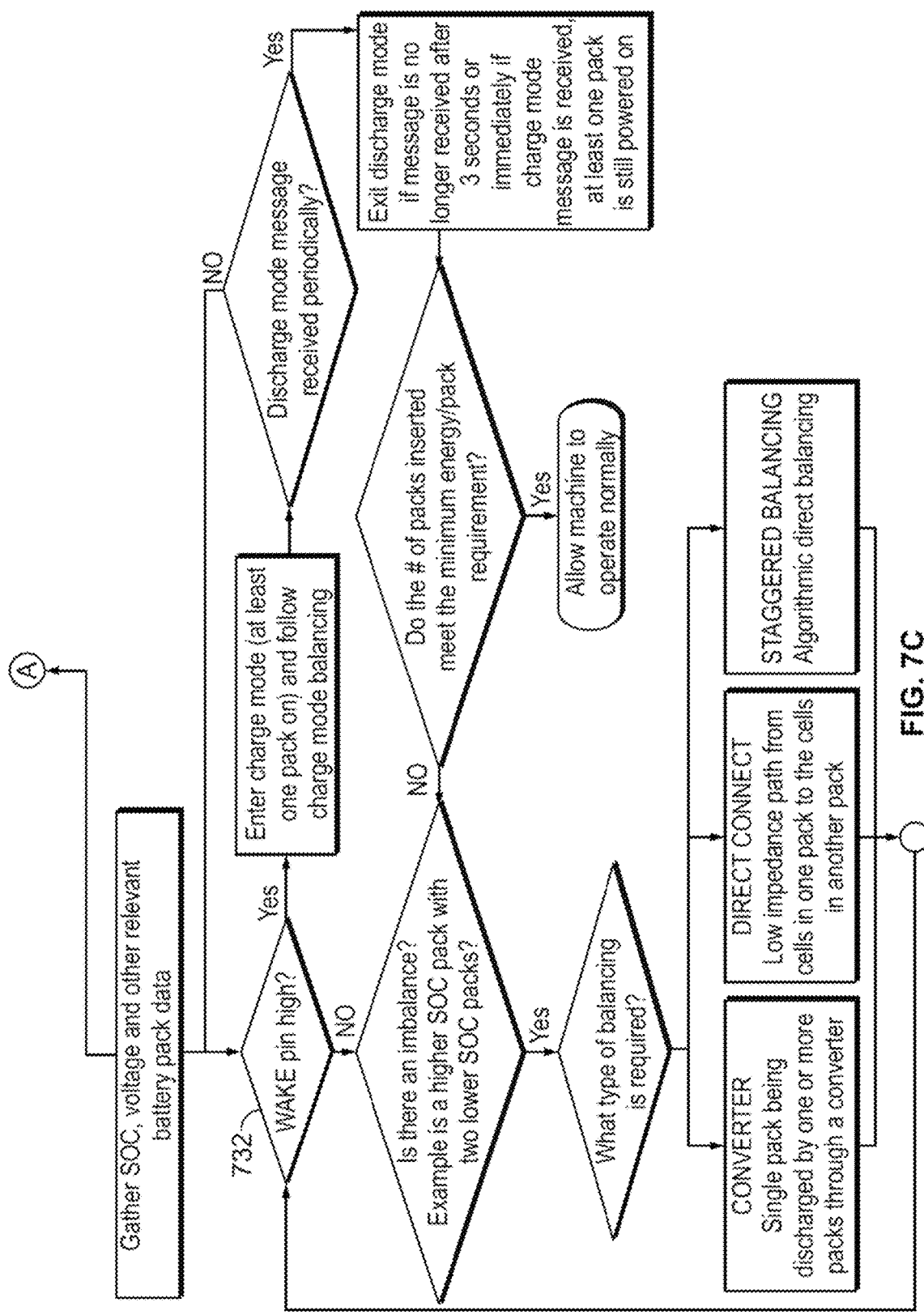

FIG. 7C shows flowchart 700 for determining a balancing type for a plurality of battery packs in accordance with an embodiment.

Table 3 shows a relationship between an operational state of a battery system and a safety interlock lock pin (indicator) and a wake pin (indicator). For example, the safety interlock pin is "On" when the battery packs are properly inserted into the battery system (as sensed by an interlocking connection through the battery pack connectors), and the wake pin is "On" when a user turns a key to activate a powered appliance (end device).

TABLE 3

State of Operation

| Wake Pin | Safety Interlock Pin | State |
|----------|---------------------|-------|
| Off | Off | Off (Sleep) |
| Off | On | Balancing |
| On | On | Charging/Discharging |
| On | Off | Off (Sleep) |

When in the off (sleep) state, the discharging and charging arrays of the battery packs are disabled, and the battery packs consume only enough electrical power so that the battery pack may transition to another state (for example, balancing state) when the battery pack detects an appropriate signal (for example, a wake indicator).

With some of the embodiments, as shown in Table 3, a battery system may support a plurality of operational states: Off (Sleep), Balancing, and Charging/Discharging. While a single state is shown for charging/discharging, charging and discharging are separate operations based on the interaction of the battery system with its external environment. For example, when the wake and safety interlock indicators are on and if charger (typically external to the battery system) is sensed via a CAN bus, the battery system enters the charging state. However, if the battery system senses an end device (for example, an appliance), the battery system enters the discharging state. As will be discussed in further detail, a battery system may support "smart charging" when in the charging state and "smart discharging" when in the discharging state.

FIG. 7C is similar to 7A; however, process 730 includes an interaction with sleep, balancing, and charging/discharging states in accordance with the relationship shown in Table 3. At block 731, when the safety interlock indicator is not detected, the battery system enters the sleep state. Otherwise, the battery system (typically by the master battery pack) gathers configuration information (for example, SoC information about the different battery packs). At block 732, the battery system determines whether the wake indicator is detected. If not, the battery system enters the balancing state. Otherwise, the battery system enters the charging/discharging state.

Figure 8:
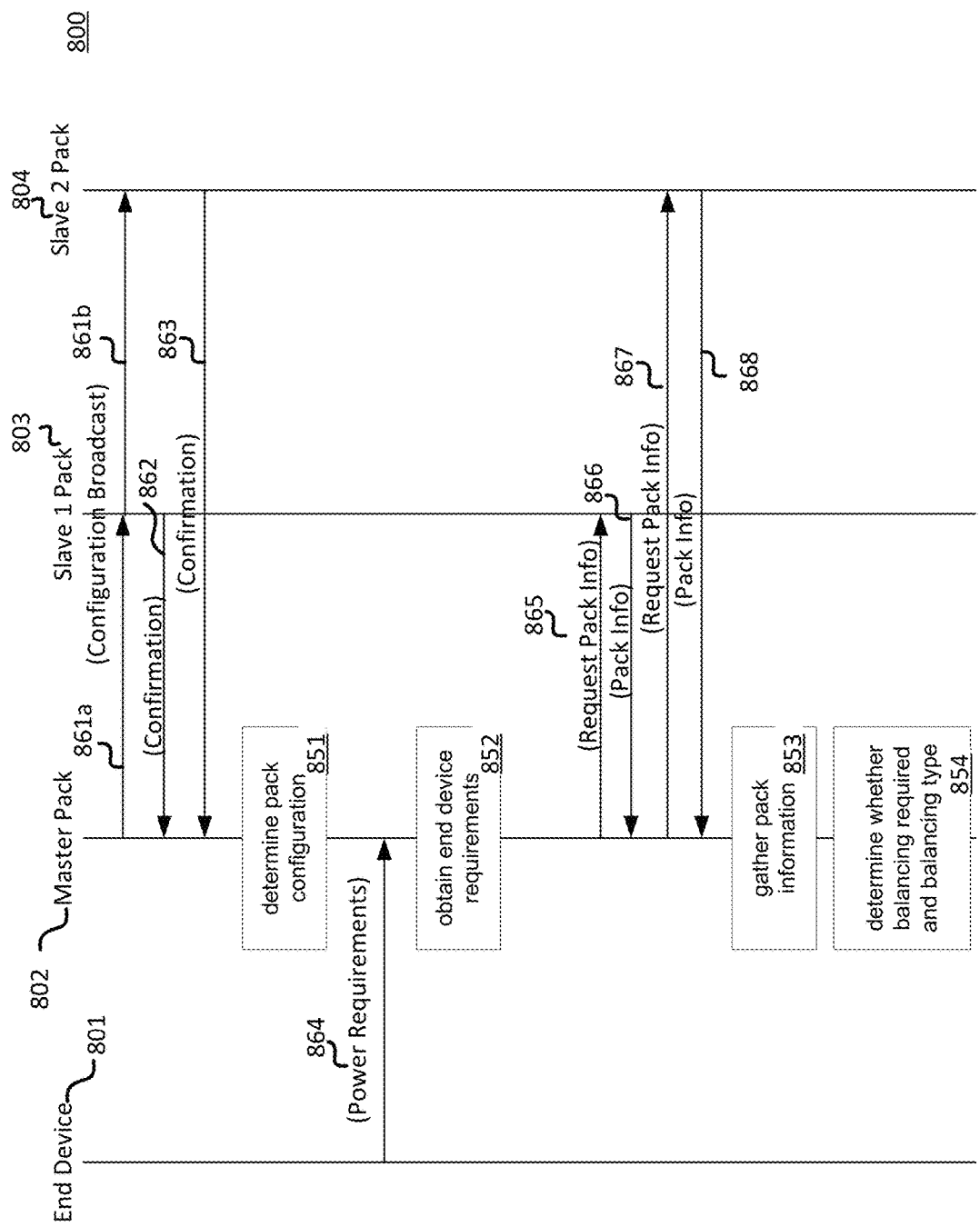
FIG. 8 shows a message flow scenario for determining a balancing type for plurality of battery packs in accordance with an embodiment.

FIG. 8 shows message flow scenario 800 for determining a balancing type for a plurality of battery packs based on flowchart 700 and in accordance with an embodiment. Master battery pack 802, based on the entries of the current confirmation list, confirms the availability of battery packs 803 and 804 at event 851 corresponding to messages 861a, 861b, 862, and 863. As previously discussed, embodiments may support different messaging protocols. For example, with the CAN protocol a data frame message may contain data in the data field that is indicative of a confirmation request or a confirmation response. As previously discussed, the interpretation of the data is in accordance with the application software executing at end device 801 and battery packs 802-804.

End device 801 provides its power requirements in message 886 so that master battery pack 801 can determine the number of battery packs needed for end device 801 at event 852.

At event 853, master battery pack 802 gathers SoC data about the other battery packs via messages 865-868. (Master battery pack 802 may use internal messaging within the battery pack to obtain SoC about itself.) For example, in accordance with the CAN protocol, data contained in Request Pack Info message 865 may be interpreted as a request from the destination battery pack while the data in Pack Info message 866 may be interpreted as the requested data (for example, SoC data) from the destination battery pack.

Figure 13:
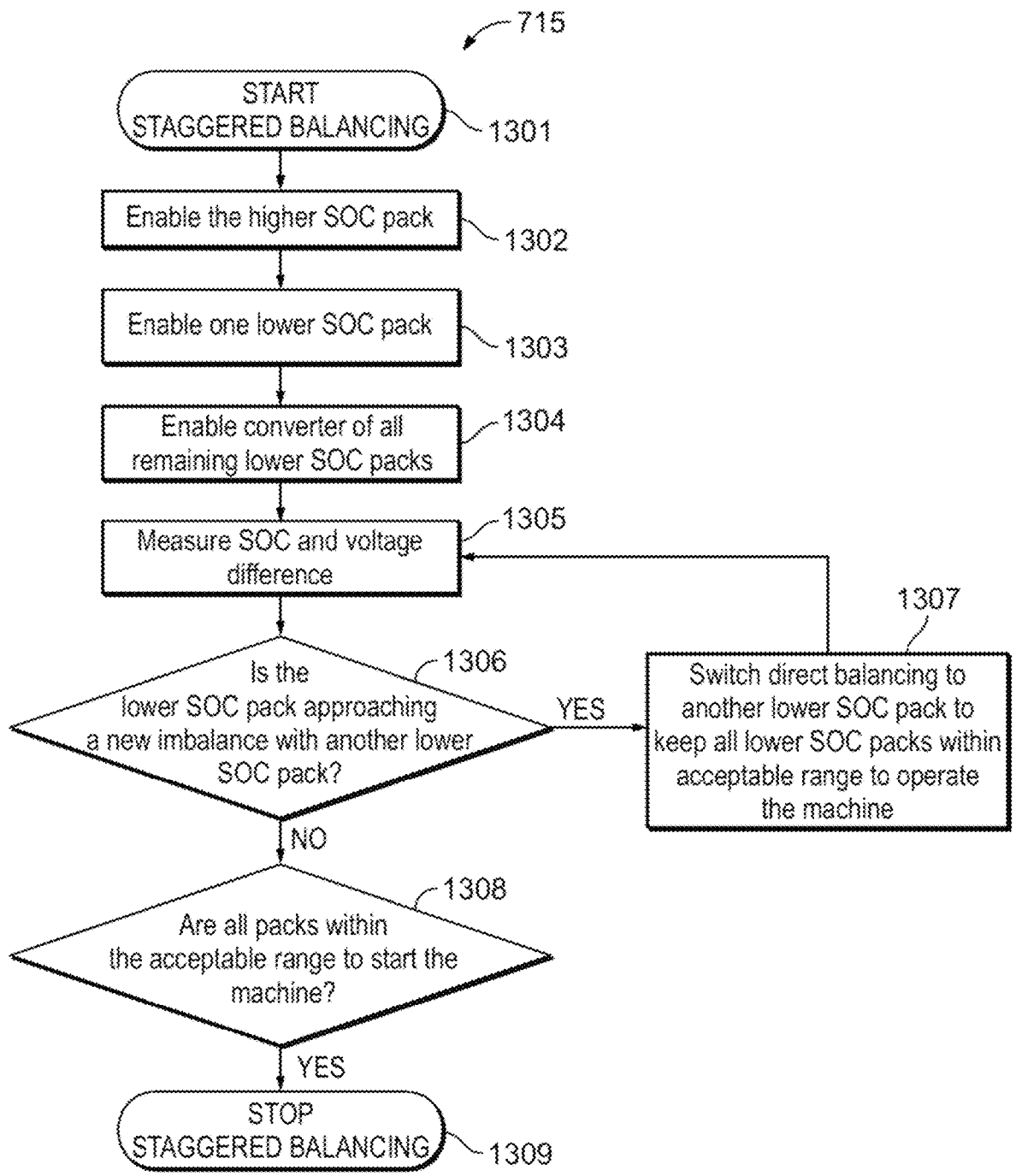
FIG. 13 shows a flowchart for staggered balancing with a plurality of battery packs in accordance with an embodiment.

Based on the gathered SoC data, master battery pack 801 determines the type of balancing required (if needed) and initiates the appropriate balancing process (for example, processes shown in FIGS. 9, 11, and 13).

As previously discussed, embodiments may support different types of balancing, for example): converter balancing, direct balancing, and staggered balancing. Converter balancing typically requires a longer time period than direct balancing, While the processes shown in FIGS. 9, 11, and 13 are typically performed at the master battery pack, the master battery need not be changing or discharging during balancing. This determination is based on the SoC values of battery cells 203 and 210 (shown in FIGS. 2A and 2B, respectively) and not on whether a battery pack is a master battery pack or a slave battery pack.

FIG. 9 shows flowchart 713 (referenced in FIG. 7A) for converter balancing with a plurality of battery packs in accordance with an embodiment. Block 901 starts converter balancing, where one of the battery packs (either the master battery pack or one of the slave master packs) charges one or more of the other battery packs.

With converter balancing, charge of a single battery pack is transferred to one or more battery packs via converters on each of the charged battery packs. Consequently, two or more battery packs are involved with this type of balancing.

While not explicitly shown, the master battery pack gathers SoC data about all of the battery packs, including itself. For example, the master battery pack may request battery status information from the other battery packs via the CAN bus and internally obtain its own SoC data.

At block 902, the master battery pack enables the battery pack with the highest SoC for discharging by enabling the discharging array. The master battery pack also enables one or more of the battery packs with the lowest SoC to accept the charge from the discharging battery pack by enabling the charging array and the on-board converter.

The master battery pack obtains SoC values from the above battery packs at block 904 and continues the balancing process at block 905 until a desired charge balance is obtained at block 905. If the charge balance is sufficient, the battery pack may be used to power the end device. However, a faster state of balancing (for example, direct balancing as will be discussed) may be subsequently applied.

Figure 10:
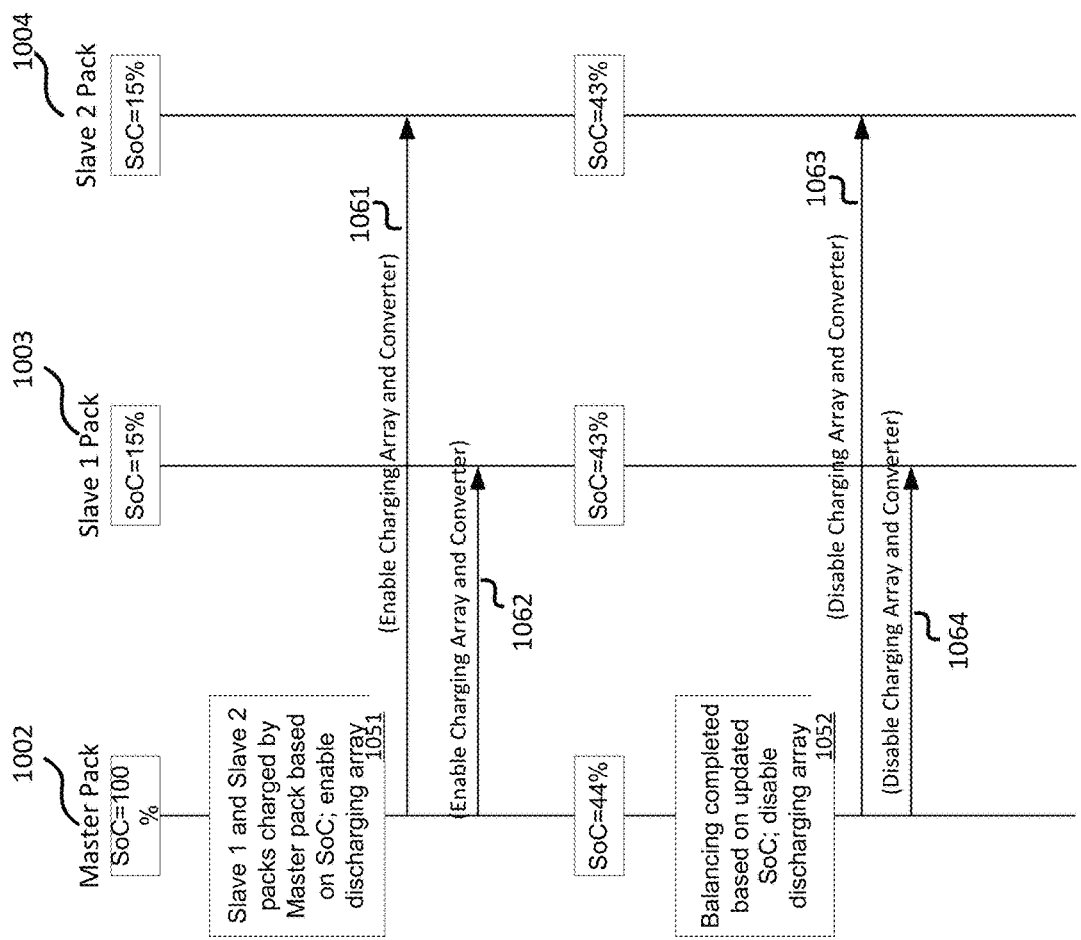
FIG. 10 shows a message flow scenario for converter balancing with a plurality of battery packs in accordance with an embodiment.

FIG. 10 shows a message flow scenario for converter balancing with a plurality of battery packs in accordance with an embodiment. Battery packs 1002, 1003, and 1004 initially have SoC values of 100%, 65%, and 65%, respectively. As previously discussed, master battery pack 1002 may obtain the SoC values by requesting battery status information and receiving the status information via data frame messages over a CAN bus.

At event 1051, master battery pack 1002 determines that packs 1003 and 1004 are to be charged by itself (pack 1002). To do so, master battery pack enables its own discharging array and enables the charging arrays and converters via messages 1061 and 1062. Balancing continues until a desired balancing charge obtained (80%, 75%, and 75%) at event 1052. At that time, the balancing ends so that master battery pack disables its charging array and disables the charging arrays and converters of battery packs 1003 and 1004 via messages 1063 and 1064.

FIG. 11 shows flowchart 714 for direct balancing with a plurality of battery packs in accordance with an embodiment. When process 700, as shown in FIG. 7A, determines that direct balancing should be performed, the master battery pack initiates direct balancing at block 1101.

With direct balancing, one of the battery packs is charging another battery pack through a low impedance electrical path. Consequently, only two battery packs are involved with type of balancing.

While not explicitly shown, the master battery pack obtains SoC values for all installed battery packs in the battery system. In order to do so, the master battery pack sends status requests to the slave battery packs and receives status information (for example, SoC values) from the slave battery packs via messaging on the communication channel. However, because the master battery knows about its own battery cell status, only internal messaging for the master battery is needed.

At block 1102 the master battery pack instructs the battery pack with the higher SoC to start discharging by enabling its discharging array and at block 1103 instructs one of the battery pack with the lower SoC to start charging by enabling its charging array.

At block 1104, the master battery pack gathers SoC data from the batter packs being charge balanced. When an acceptable SoC is reached at block 1105, direct balancing is terminated at block 1106.

Figure 12:
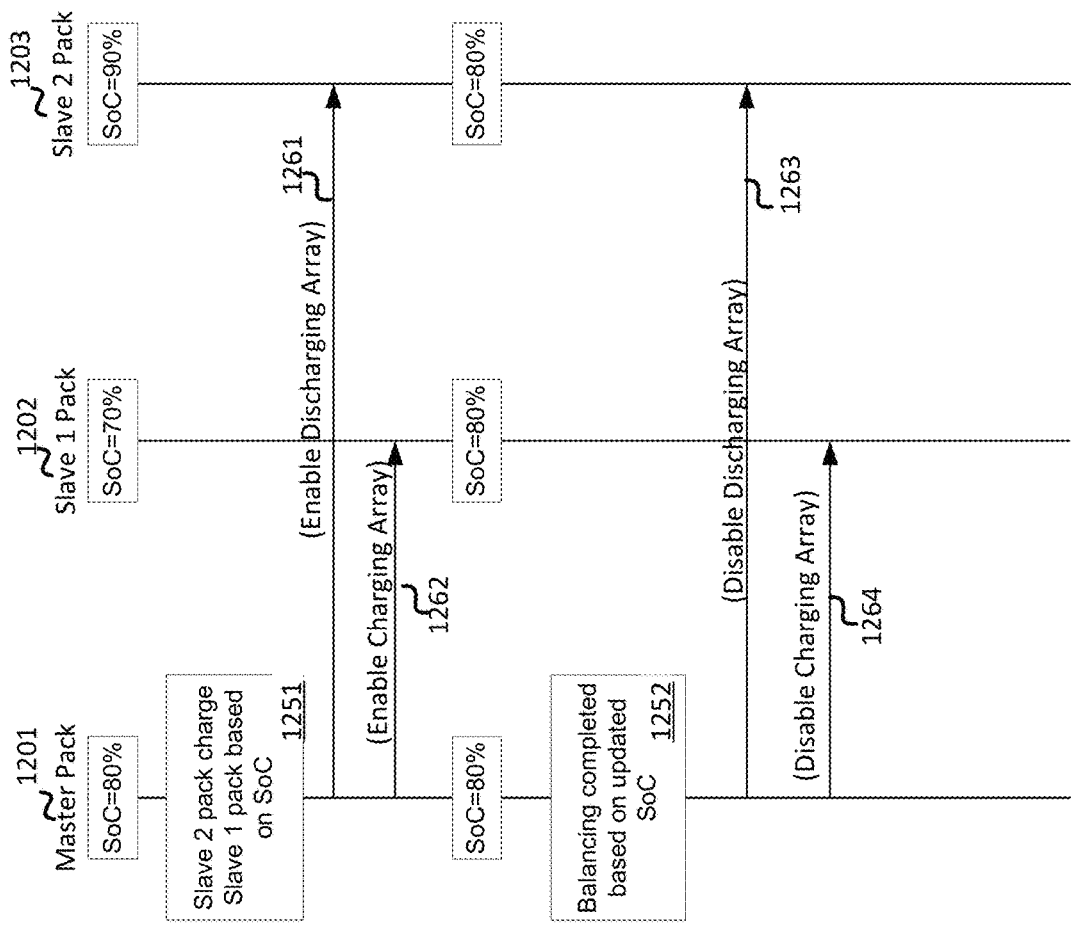
FIG. 12 shows a message flow scenario for direct balancing with a plurality of battery packs in accordance with an embodiment.

FIG. 12 shows a message flow scenario for direct balancing with a plurality of battery packs in accordance with an embodiment. The master battery pack (pack 1201) gathers initial SoC values 80%, 70%, and 90% for battery packs 1201, and 1202, and 1203, respectively.

Because pack 1202 has the lowest SoC and pack 1203 has the highest SoC, the master battery pack instructs battery pack 1202 to enable its charging array and battery pack 1203 to enable its discharging array via messages 1261 and 1262, respectively.

When the SoC values of battery packs 1202 and 1203 reach 80%, the master battery pack (pack 1202) determines that direct balancing is competed at event 1251 and consequently disables the charging array and the discharging array via messages 1263 and 1264, respectively.

FIG. 13 shows flowchart 714 for staggered balancing with a plurality of battery packs in accordance with an embodiment. When process 700, as shown in FIG. 7A, determines that staggered balancing should be performed, the master battery pack initiates staggered balancing at block 1301.

Staggered balancing utilizes algorithmic direct balancing. With staggered balancing, one of the battery packs (typically the highest SoC value) direct charges another battery pack with a lower SoC while charges one or more other lower SoC battery packs through converter balancing (where the converter located on the charged battery pack is enabled). In order to keep the other lower SoC battery packs within an acceptable range, direct balancing may switch to a different lower SoC battery pack while the previous lower SoC battery pack is now converter balanced.

At blocks 1301 and 1302, direct balancing is established with a battery pack with the highest SOC with another battery pack in the group with a low SoC similar to blocks 1101 and 1102 as shown in FIG. 11. However, converter balancing is established with some or all of the battery packs in the low SoC group at block 1304.

At block 1305, the master battery pack gathers the updated SoC values of the participating battery packs. When the battery pack being directed charge reaches a determined SoC threshold (for example, when an imbalance occurs one of the battery packs in the low SoC group), direct balancing is established with another battery pack in the low SoC group at block 1307.

When all of the battery packs are within an acceptable SoC range, as determined at block 1308, staggered balancing is terminated at block 1309.

Figure 14:
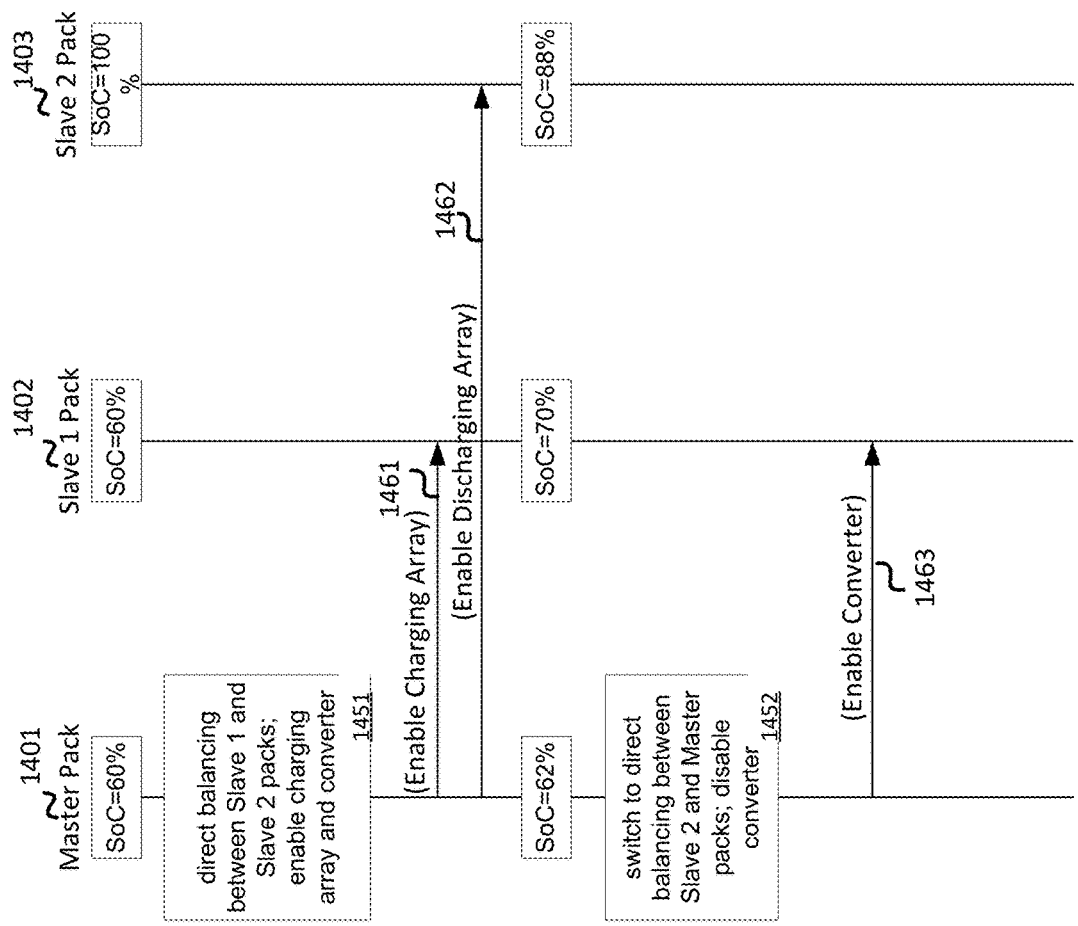
FIGS. 14-15 show a message flow scenario for staggered balancing with a plurality of battery packs in accordance with an embodiment.
Figure 15:
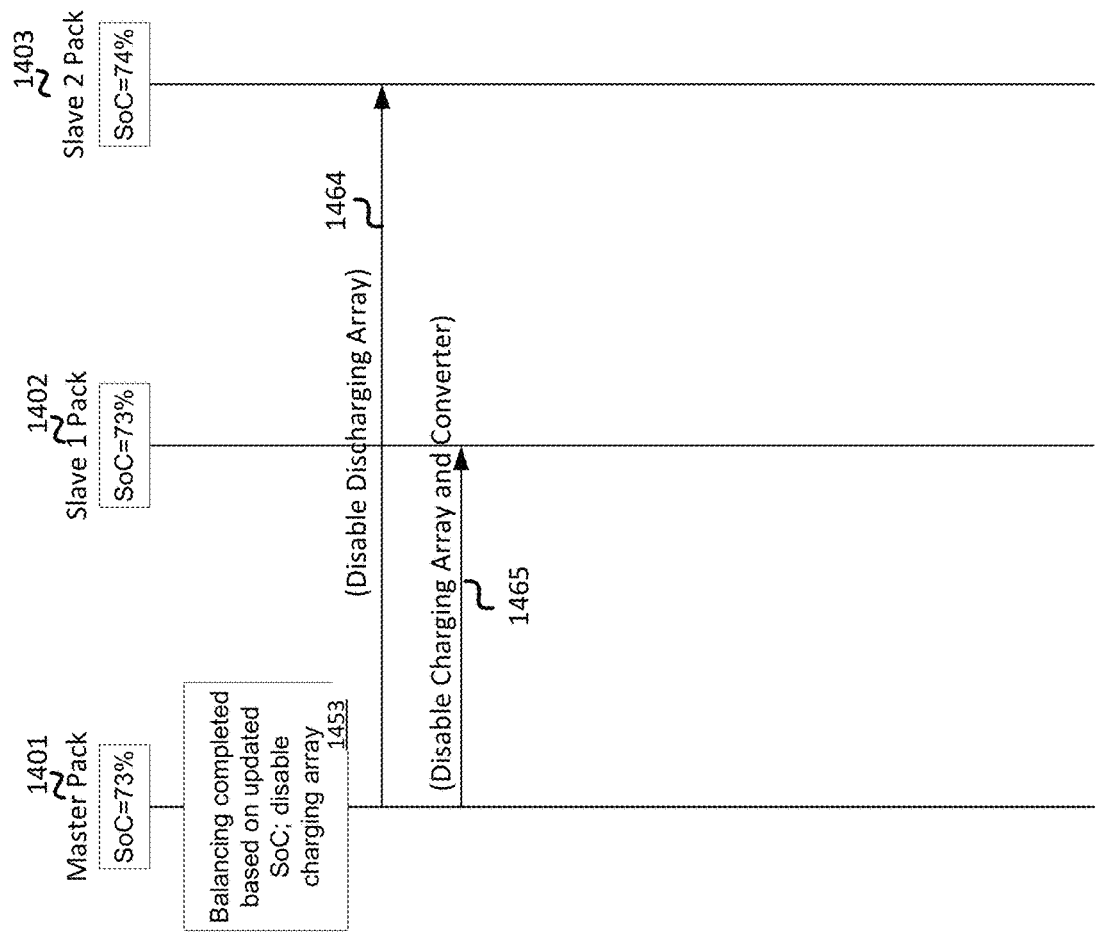

FIGS. 14-15 show a message flow scenario for staggered balancing with a plurality of battery packs in accordance with an embodiment. The master battery pack (pack 1401) gathers initial SoC values 60%, 60%, and 100% at battery packs 1401, and 1402, and 1403, respectively.

At event 1451, master battery pack 1401 initiates direct balancing between battery packs 1402 (in the low SoC group) and 1403 (the highest SoC) and to establish converter balancing between battery 1403 and itself (also in the low SoC group). Consequently, master battery pack 1401 sends messages 1461 and 1462, corresponding to battery packs 1461 and 1462, respectively, over the communication channel and to generate any internal messaging, as necessary, to enable its charging array and converter.

As a result of the balancing, the SoC values of battery packs 1401, 1402, and 1403 change to 62%, 70%, and 88%, respectively. Because of the charge imbalance between battery packs 1401 and 1402, master battery pack 1401 establishes direct balancing between battery pack 1403 and itself and establishes converter balancing for pack 1402. Consequently, at event 1452, master battery pack 1401 instructs battery pack 1402 to enable its converter (so that charging occurs now via the converter rather than directly) via message 1463 and to disable its own converter so that its battery cells are directly exposed to charging.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Referring to FIG. 15, as a result of the balancing, the SoC values of battery packs 1401, 1402, and 1403 change to 72%, 72%, and 76%, respectively. At event 1453, master battery pack 1401 determines that balancing has completed and terminates the staggered balancing by sending messages 1464 and 1465 to battery packs 1403 and 1402, respectively, and internally disables its charging array.

Figure 17:
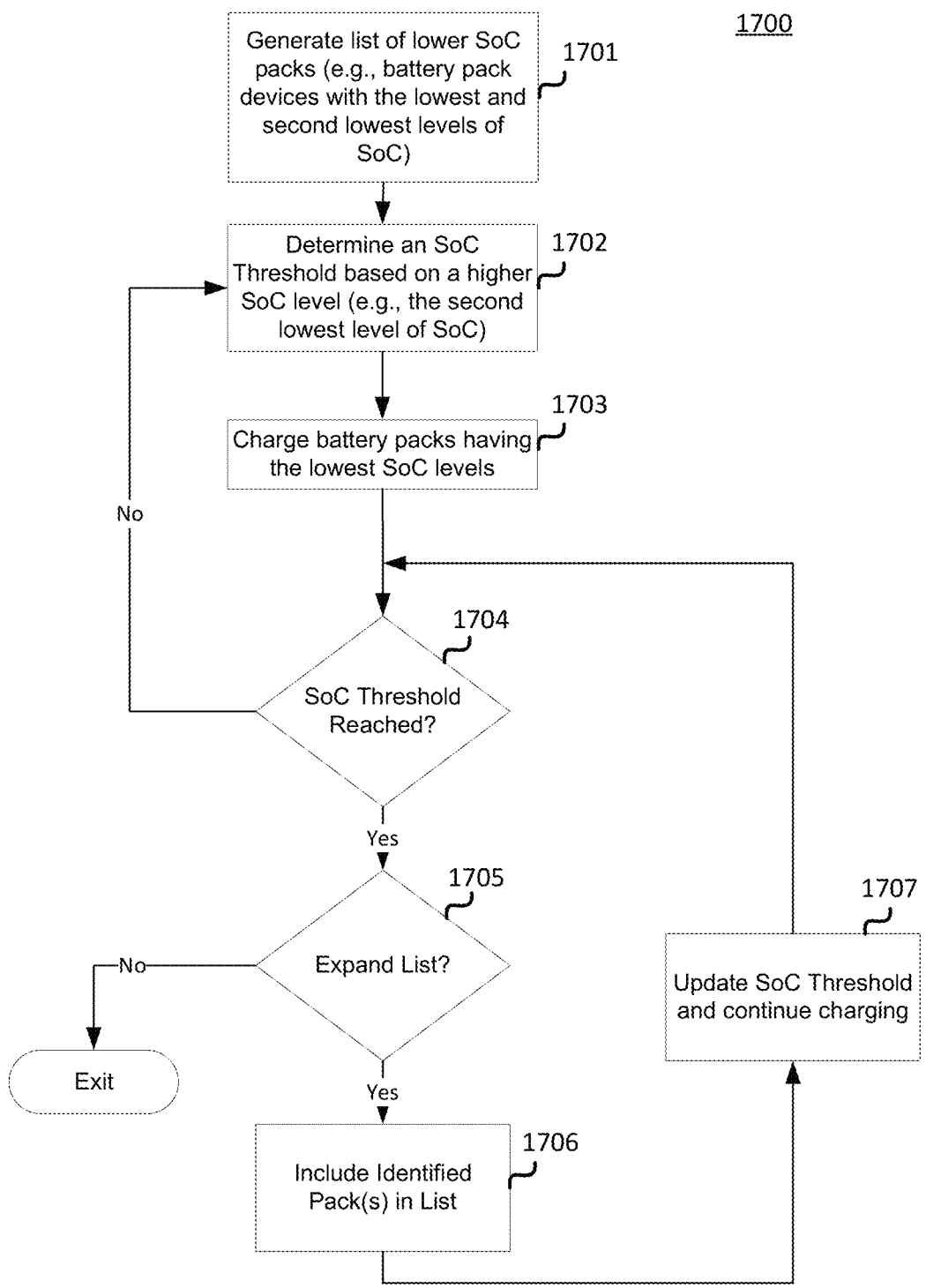
FIG. 17 shows a flowchart for charging a plurality of battery packs in accordance with an embodiment.

Intelligent systems and algorithmic methods (for example, process 1700 as shown in FIG. 17) may ensure that SoC's corresponding to the plurality of battery packs may become more balanced, e.g., to ensure that the plurality of battery packs can be charged together. In various embodiments, a battery pack may include one or more batteries and/or may comprise a device that may include one or more batteries. The one or more batteries of a battery pack may share various characteristics (e.g., a state of charge, a state of health, etc.). Furthermore, each battery pack can be enabled or disabled, e.g., in their ability to charge or discharge other battery packs or end devices.

Still referring to FIG. 16, battery packs that have a large SoC variation may not be immediately connected with charger 1601. For example, as shown in FIG. 16, battery packs 1602a and 1603a, which each have lower SoC's (e.g., 20% and 20%, respectively) than other battery packs, may be charged earlier (e.g., before the other battery packs) until a set threshold can be reached at which a batter pack with a higher SoC (e.g., battery pack 1604b) can be charged. Prioritizing the charging of battery packs with lower SoC's before the charging of battery packs with higher SoC's may be necessary, e.g., because otherwise, charging the higher battery pack with the higher SoC first may cause a fast in-rush electrical current to the lower SOC pack. In some aspects, systems and devices presented herein may cause the charging of the various battery packs by enabling the flow of electric discharge arrays between a charger and the respective battery packs.

As shown in FIG. 16, initially charging battery packs 1602a and 1603a causes their SoC's to increase from 20% to 40% (e.g., as shown in 1602b and 1603b). Charging may continue for battery packs 1602b-1604b until the SoC level of battery pack 1605b is reached. At that point, battery pack 1605b may be enabled so that charging can continue for battery packs 1602b-1605b.

FIG. 17 shows an example flowchart of a method 1700 for charging a plurality of battery packs in accordance with an embodiment. Method 1700 may be performed by a computing device having one or more processors, which may be communicatively linked to one or more of the plurality of battery packs and/or to the charger. Also or alternatively, the computing device performing method 1700 may comprise a battery pack (e.g., a "master battery pack" or a "master battery pack") that has a capability of managing one or more functions of other battery packs of the plurality of battery packs. After obtaining the SoC values of the battery packs in a battery system, a subset of the battery packs may be grouped into a lower SoC group at block 1701. For example, the obtained SoC values (e.g., SoC readings) may be sorted into various levels, e.g., based on predetermined ranges. Those battery packs having the lowest SoC values may be grouped into the lowest level. Battery packs within a specified level may have SoC values that are within a specified or predetermined range of one another. Those battery packs having the second lowest of SoC values (e.g., SoC values that are higher than those of the lowest level but lower than the rest of the battery packs) may be placed into the second lowest level. As used herein, a "Lower SoC Packs" may refer to the battery packs of a list comprising (1) the group of battery packs of the lowest level of SoC values and (2) the group of battery packs of the second lowest level of SoC values.

At block 1702, an SoC threshold may be determined. The SoC threshold may be approximately equal to the SoC value of the group of one or more battery packs having SoC values just above the group of battery packs with the lowest SoC values. For example, the SoC threshold may be based on the SoC values of the second lowest level (e.g., an average of the SoC values of the battery packs of the second lowest level).

The battery packs of the group with the lowest levels of SoC can be enabled for charging at block 1703, e.g., facilitating the charging of the battery packs having the lowest level of SoC. In some aspects, the charging may be enabled if one or both of the safety interlock pin or the wake pin is set to "on," as discussed previously.

When the SoC values of the charged battery packs reach the SoC threshold, as determined at block 1704, process 1700 may include determining whether to enlarge the list (e.g., the "Lower SoC Packs" list of step 1701) for subsequent charging at block 1705. The determination of whether to enlarge the list may be based on whether there is significant variability in to SoC of the battery packs (e.g., whether the SoC variability of the battery packs satisfies an SoC variability threshold), as will be described further in relation to FIG. 18C. If the list is to be enlarged, the SoC threshold may be updated (e.g., based on determining the second lowest level of SoC's in the updated list), the selected battery packs may be enabled, and charging may continue at blocks 1706 and 1707.

Figure 18A:
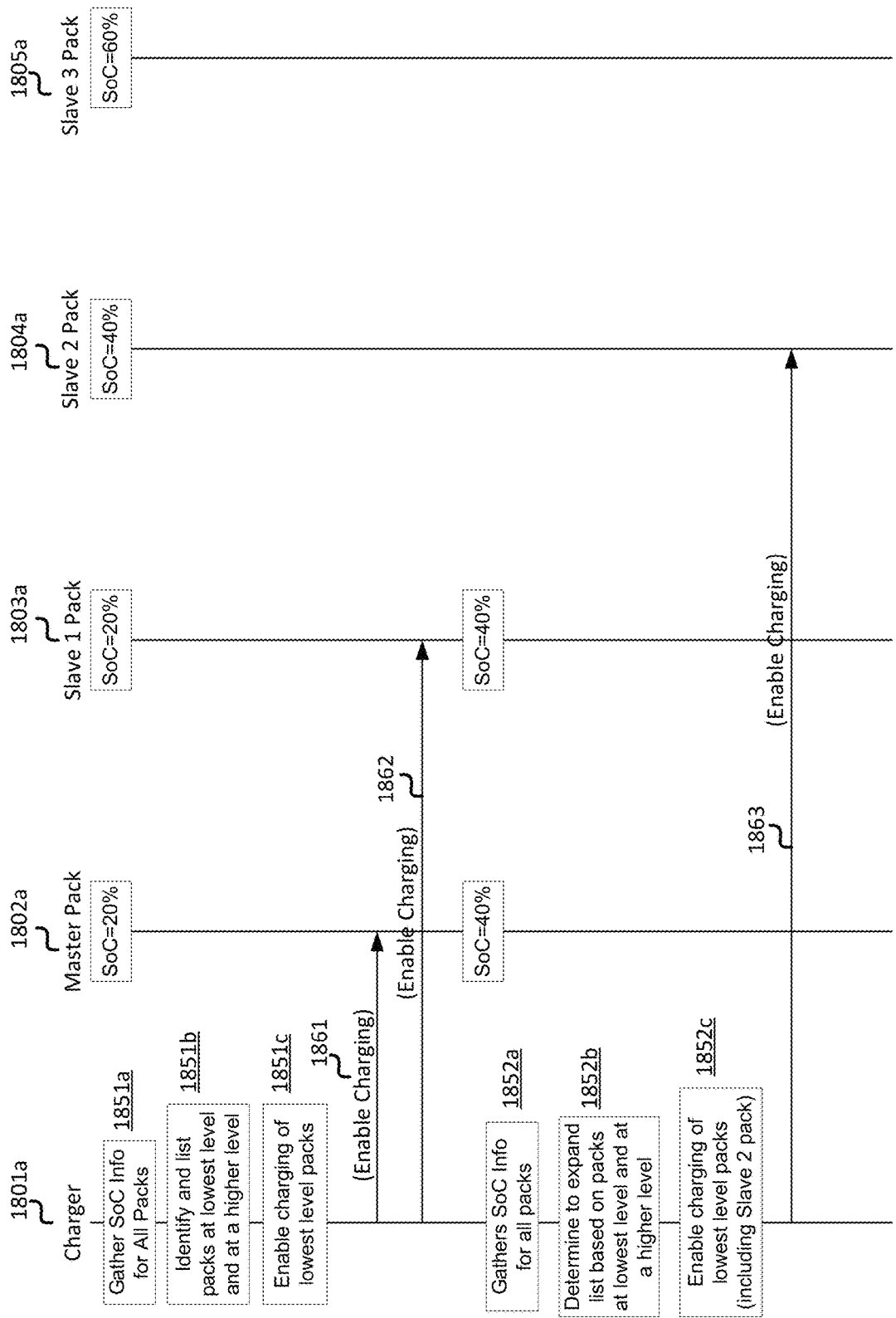
FIG. 18A shows a message flow scenario for charging a plurality of battery packs in accordance with an embodiment.

FIG. 18A shows a message flow scenario for charging a plurality of battery packs for the example shown in FIG. 16. In this scenario, charger 1801*a* may perform one or more iterations of gathering SoC data (e.g., receive SoC readings) from a plurality of battery packs (e.g., battery packs 1802*a*-1805*a*), identifying SoC levels to form lists based on the SoC levels, and enabling the charging of selected battery packs to SoC thresholds via the communication channel (for example, a CAN bus). For example, at event 1851*a*, charger 1801*a* may gather initial SoC values 20%, 20%, 40%, and 60% from battery packs 1802*a*, 1803*a*, 1804*a*, and 1805*a*, respectively.

At event 1851*b*, charger 1801*a* may determine that the group of battery packs with the lowest level of SoC values includes battery packs 1802*a* and 1803*a*, and that the group of battery packs with a higher (e.g., second lowest) level of SoC values includes battery pack 1804*a*. A list of battery packs may be formed and may include the battery packs at the lowest levels of SoC and the battery pack at the higher (e.g., second lowest level).

At event 1851*c*, the charger 1801*a* may enable the charging of group of the battery packs with the lowest level of SoC values (e.g., battery packs 1802*a* and 1803*a*) via messages 1861 and 1862. Charging may continue until the SoC values for these battery packs satisfy an SoC threshold based on a group of one or more battery packs having higher SoC values (e.g., the battery pack having the second lowest level of SoC values (e.g., battery pack 1804*a* at 40%)).

At event 1852*a*, the charger 1801*a* may gather SoC values for all packs. As shown in FIG. 18A, the SoC values for battery packs 1802*a* and 1803*a* will have increased to 40% as a result of the aforementioned charging at event 1851*c*. At event 1852*b*, charger 1801*a* may determine to expand the list of battery packs determined at event 1851*a*. For example, an SoC variability may be determined for battery packs 1802*a*-1805*a*, and the list may be expanded based on the SoC variability being significant enough to satisfy a SoC variability threshold. In the scenario depicted in FIG. 18A, battery pack 1806*a* has an SoC value of 60%, which is different from the updated SoC value if 40% for battery packs 1802*a*, 1803*a*, and 1804*a*. Thus, battery packs 1802*a*, 1803*a*, 1804*a*, and 1805*a* exhibit SoC variability, which may cause the charger 1801*a* to enlarge the list. The enlarged list may include an updated group of one or more battery packs with the lowest level of SoC values (e.g., battery packs 1802*a*, 1803*a*, 18004*a*) and an updated group of one or more battery packs with a higher level of SoC values (e.g., battery pack 1805*a*). The former group (e.g., the group of battery packs with the lowest level of SoC values) may thus include battery pack 1804*a*. At event 1852*c*, the charger 1852*c* may thus enable the charging of battery packs 1802*a*, 1803*a*, and 1804*a* via message 1863.

Figure 18B:
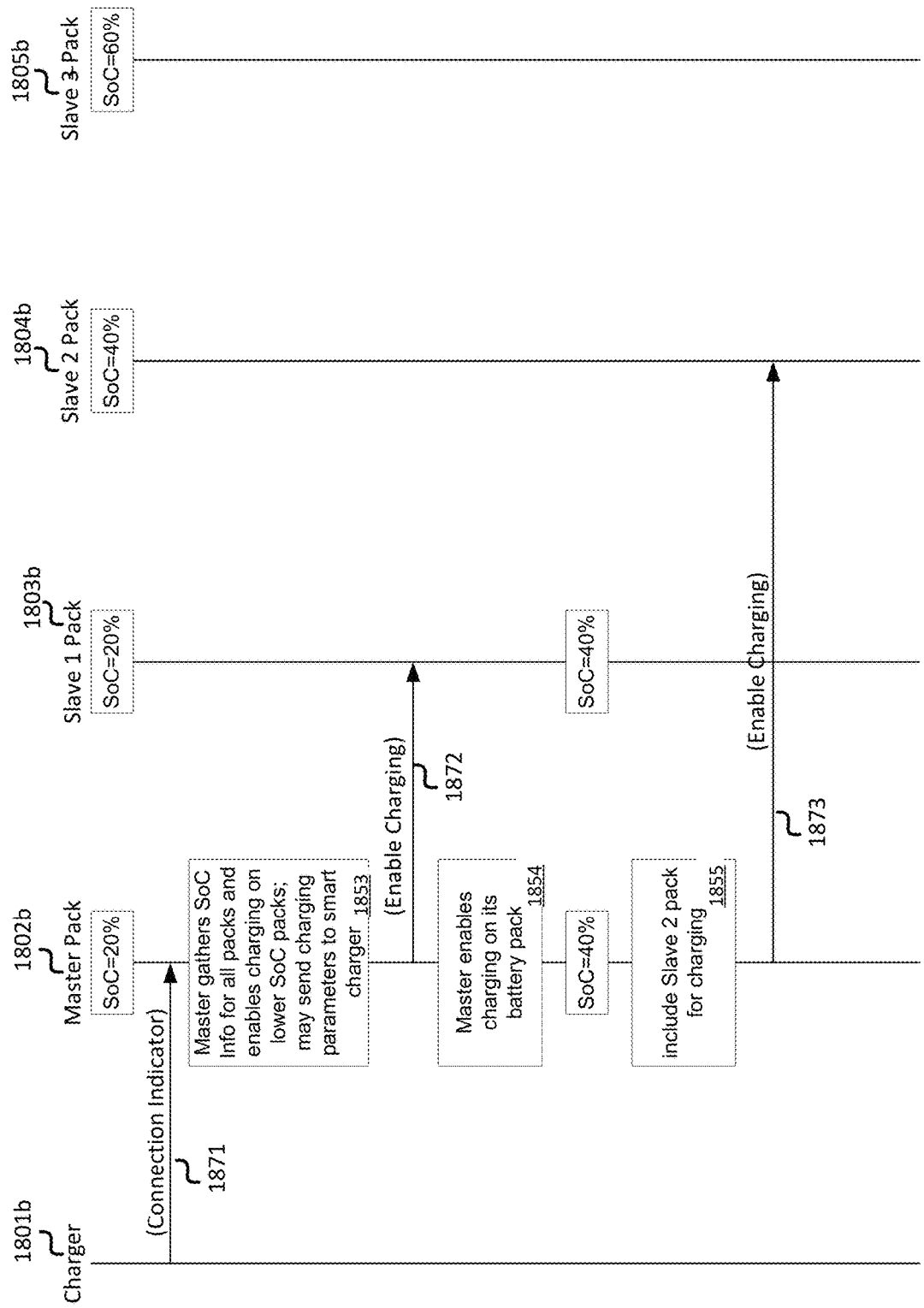
FIG. 18B shows a message flow scenario for charging a plurality of battery packs in accordance with an embodiment.

FIG. 18B shows an example message flow scenario for charging a plurality of battery packs for the example shown in FIG. 16. However, rather than charger 1801*b* gathering SoC data and enabling the battery packs, master battery pack 1802*b* does so when charger 1801*b* is detected via connection indicator 1871. Connection indicator 1871 may be obtained by different approaches, including messaging over a communication channel, a pin, and so forth.

Figure 18C:
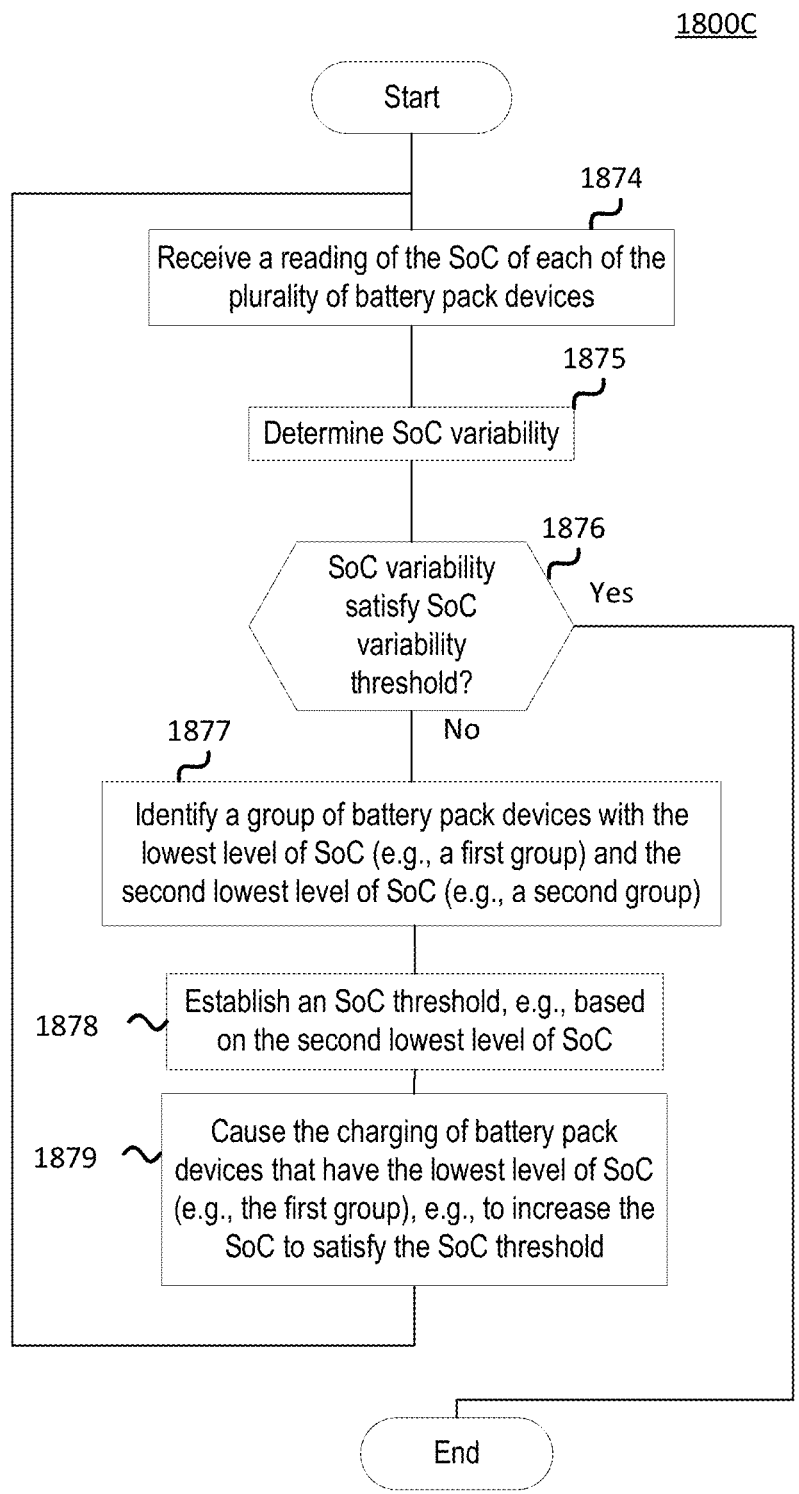
FIG. 18C shows a flowchart of a method for intelligently charging a plurality of battery packs in accordance with an embodiment.

FIG. 18C shows an example flowchart of a method 1800C for intelligently charging a plurality of battery packs, in accordance with a non-limiting embodiment. Method 1800C may be performed by a computing device having one or more processors. The computing device may be a standalone device communicatively linked to one or more of the battery packs and/or to the charger. Also or alternatively, the computing device may comprise one of the battery packs (e.g., a master battery pack) that has the capability of managing one or more functions of the other battery packs of the plurality of battery packs. Also or alternatively, the computing device may comprise the charger.

As discussed previously, each battery pack may have a state of charge (SoC) indicating, e.g., a degree or level of charge relative to its capacity. At step 1874, the computing device may receive a reading (e.g., first reading) of the SoC of each of the plurality of battery packs. The reading may be obtained via a sensor or a monitor at each battery pack. As discussed previously, the SoC's may vary among a plurality of battery packs or may remain relatively constant. An SoC variability (e.g., a first SoC variability) may be computed to indicate a degree of variability of the SoC of the plurality of battery packs (e.g., as in step 1875).

The SoC variability may be based on the SoC's of each of the respective battery packs obtained in step 1874. For example, an SoC variability may be based on one or more of a variance, a standard deviation, a range (e.g., an interquartile range), a mean absolute difference, a median absolute deviation, an average absolute deviation, a distance standard deviation, or a like metric based on the SoC values of each of the plurality of battery packs. For example, in Table 1 discussed above, which comprises a plurality of battery packs (e.g., Pack 1, Pack 2, Pack 3, and Pack 4), there is greater SoC variability at time T0 than there is at time T6. In one aspect, where SoC variability is determined on the basis of a computed range of SoC values, the SoC variability of the battery packs at T0 is 85 (i.e., 100%-15%), whereas the SoC variability at T6 is only 4 (e.g., 45%-41%). If "5" is set as an SoC variability threshold, then the SoC variability at T6 may be said to have satisfied (e.g., fall below) the threshold.

In some aspects, before the computing device can receive the SoC readings, an interlock safety pin may need to allow interaction with the battery packs to occur. For example, the computing device may initially determine that the interlock safety pin allows the receiving the SoC readings from the plurality of battery packs.

The computing device may store, e.g., in memory device 202, a metric indicating an SoC's variability threshold, e.g., to indicate whether variability of the SoC's is insignificant. For example, if an SoC of a battery pack (e.g., first battery pack) is significantly lower than an SoC of another battery pack (e.g., a second battery pack), it is likely that the SoC variability will be significant and therefore not satisfy the SoC variability threshold. At step 1876, the computing device may thus determine whether the SoC variability (e.g., as computed in step 1875) satisfies the SoC variability threshold.

If the SoC variability does not satisfy the SoC variability threshold (e.g., the variation in SoC's among the plurality of battery packs is significant) the computing device may establish an SoC threshold (e.g., as in step 1878) The SoC threshold may be based on the SoC reading of battery pack having the next higher SoC reading (e.g., the second battery pack) after the battery pack with the lowest SoC (e.g., the first battery pack). Thus, the computing device may identify the lowest SoC readings in order to determine the next higher SoC reading (e.g., as in 1877). For example, as discussed in relation to FIG. 16, battery pack 1604*a* had an SoC of 40%, which is the next higher SoC after the lowest SoC of the battery packs of 20% belonging to battery packs 1602*a* and 1603*a*. Thus, based on the example show in relation to FIG. 16, an SoC threshold may be set to 40%.

Furthermore, at step 1879, the computing device may cause the charging of battery packs that have lower SoC's than the established SoC threshold, e.g., by enabling electric charge arrays from the charger to the battery packs. The charging may cause the SoC's of the battery packs to increase, e.g., so that it approaches, matches, and/or satisfies the SoC threshold.

In some aspects, before the computing device can cause the charging of any battery packs, a wake pin, as discussed previously, may need to allow for the charging to occur. For example, the wake pin may need to be set to "on" before a charging can occur. The computing device may initially determine that the wake pin is set to "on" before causing the charging of the battery packs.

This can be detected by the computing device via an additional reading (e.g., a second reading) of the SoC's of each of the plurality of battery packs. Furthermore, the computing device may determine or compute, based on the additional reading, a second SoC variability of the plurality of battery packs. The second SoC variability may be found to satisfy the SOC variability threshold.

If the second SoC variability is not found to satisfy the SoC variability threshold, one or more steps of method 1800C may be repeated until the SoC variability threshold is satisfied. For example, a new SoC threshold may be set based on the next higher SoC after the lowest SoC, and causing the charging of the battery packs with the lowest SoC's.

Thus, one or more iterations of the following can be performed after an updated SOC variability of the plurality of battery packs satisfies the SOC variability threshold: The computing device may identify an Nth group of one or more battery packs within the plurality of battery back devices, wherein the Nth group may have the lowest level of a previous reading of the SOC of the plurality of battery packs; the computing device may also identify an (N+1) group of one or more battery packs of the plurality of battery back devices, wherein the (N+1) group can have the second lowest level of the previous reading of the SOC of the plurality of battery packs; and the computing device may generate a list comprising the n group and the N+1 group. In each iteration, the computing device may determine that the SOC variability of the list in the current iteration does not satisfy the SOC variability threshold. If the SoC variability does satisfy the SoC threshold, the computing device may exit the iterations loop. However, assuming the SoC variability at each iteration does not satisfy the SoC variation threshold, the computing device may an SOC threshold using the previous reading of the SOC of the N+1 group. Subsequently, the computing device may cause, via electric charge arrays, the charging of the N group of battery packs to cause the SOC of the N group to increase and satisfy the SOC threshold. The computing device may receive a subsequent reading of an SOC of each of the plurality of battery packs. An updated SoC variability of the plurality of battery packs may thus be determined based on the subsequent reading of the SoC of each of the plurality of battery packs. As discussed, the above steps may be repeated until the SoC variability (updated at each iteration) satisfies the SoC variability threshold (e.g., the SoCs of the battery packs vary less than a specified range).

Figure 19A:
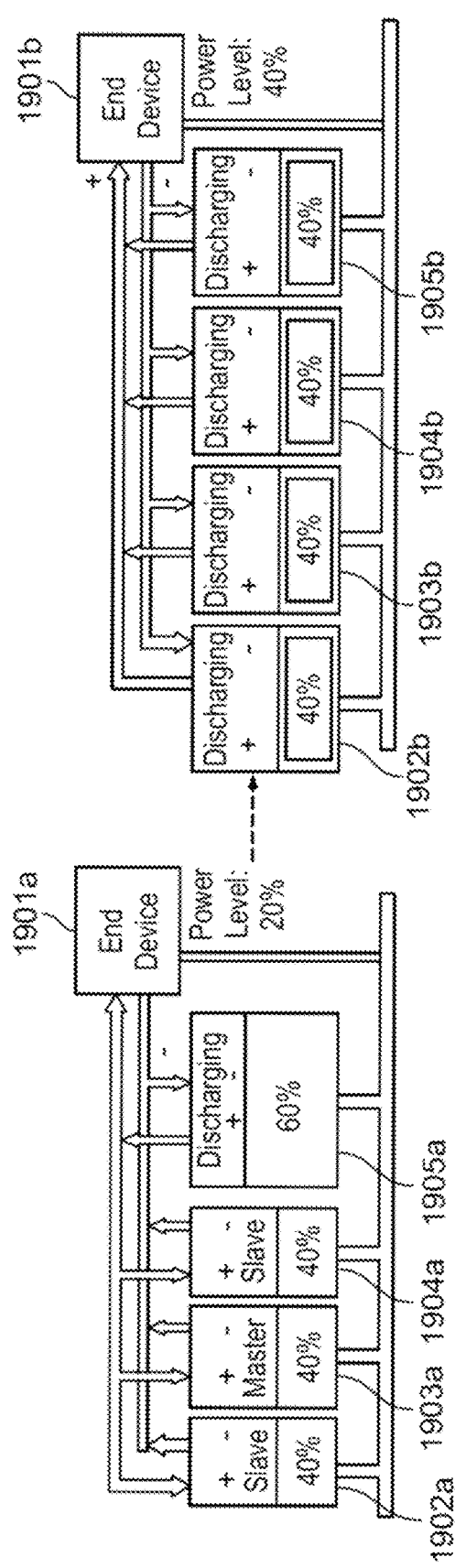
FIG. 19A shows an example of a plurality of battery packs discharging in order to electrically power an end device in accordance with an embodiment.
Figure 19B:
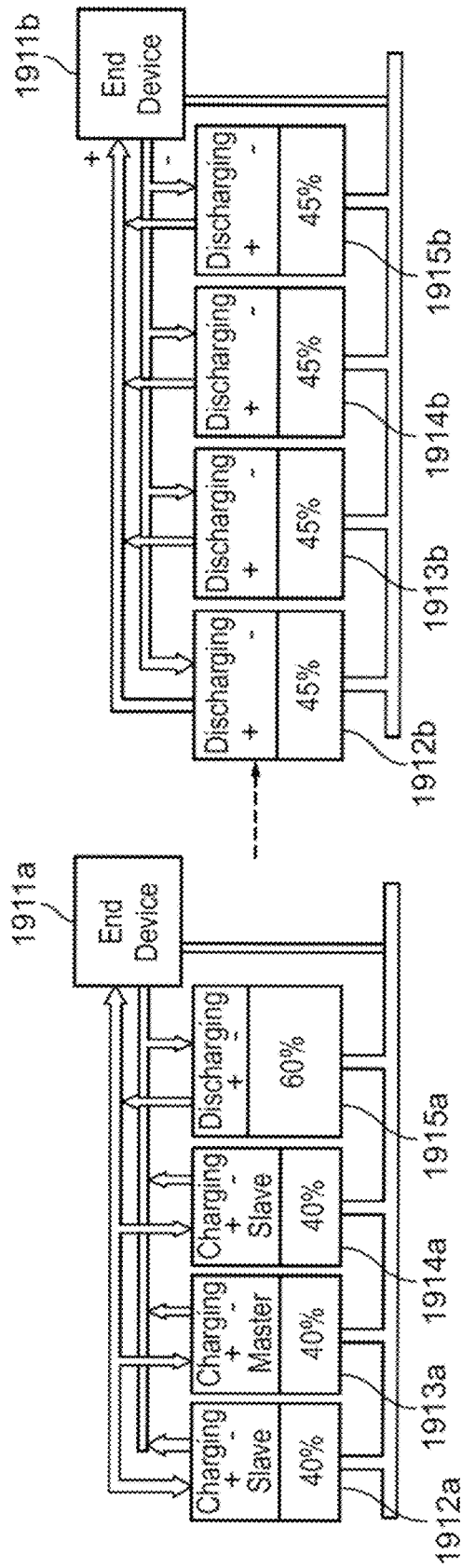
FIG. 19B shows an example of a plurality of battery packs discharging in order to electrically power an end device in accordance with an embodiment.

The following FIG. 19A and FIG. 19B show two examples of a battery system powering an end device based on power requirements of the end device. In FIG. 19A, only one battery pack is needed to power end device 1901*a, b* while in FIG. 19B, more than one battery pack is needed to power end device 1911*a, b*.

FIG. 19A shows an example of a plurality of battery packs discharging in order to electrically power an end device in accordance with an embodiment. The initial SoC values of battery packs 1902*a*-1905*a* are 40%, 40%, 40%, and 60%, respectively. As shown in FIG. 19A, a single battery pack (e.g., battery pack 1905*a* having an SoC of 60%) may initially be used to power end device 1901*a* until the SoC value of the single battery pack reaches 40% (the same SoC values as the other battery packs) (e.g., as in battery pack 1905*b*). Using only a group of one or more battery packs having the highest or higher SoC level (in this case the single battery pack 1905*a*) to initially power an end device, until the SoC values of the group reaches those of the rest of the pack, may be a more efficient and/or safe method of utilizing battery packs to power an end device. As shown in FIG. 19A, after the single battery pack with the initially higher SoC value has been used to initially power the end device, and its SoC readings reach those of the other battery packs (e.g., battery packs 1902*b*-1905*b*), the other battery packs may join in powering the end device 1901*b*.

FIG. 19B shows another example of a plurality of battery packs discharging in order to electrically power an end device in accordance with an embodiment. As shown in FIG. 19B, the initial SoC values of battery packs 1912*a*-1915*a* are 40%, 40%, 40%, and 60%, respectively. In some aspects, more than one battery pack may be needed to power end device 1911*a-b*. In such aspects, various systems and methods presented herein may be used to balance the battery packs before powering end device 1911*a-b*. The balancing of battery packs 1912*a*-1914*a* may be performed, e.g., to safeguard against the risk of an undesired electrical current in-rush from battery pack 1915*a*, which may occur in the absence of the balancing. When balancing is achieved, battery packs 1912*b*-1915*b* can then power end device 1911*b*.

When powering an end device (for example, a machine), connecting battery packs with varying SoC's may be problematic. Consequently, to prevent such problematic situations, a process (often implementing an intelligent method) may be needed to ensure that a required number of battery packs are connected for system discharge and enabled when appropriate.

Typically, when multiple battery packs are needed to power an end device, it may be advisable for battery packs with large SoC variations to not be connected at the same time. Rather, balancing of the battery packs may be performed initially.

Discharging may use one or more battery packs with higher SoC values first until passing a set threshold for lower SoC battery packs, at which point the lower SoC battery packs may be enabled.

Figure 20A:
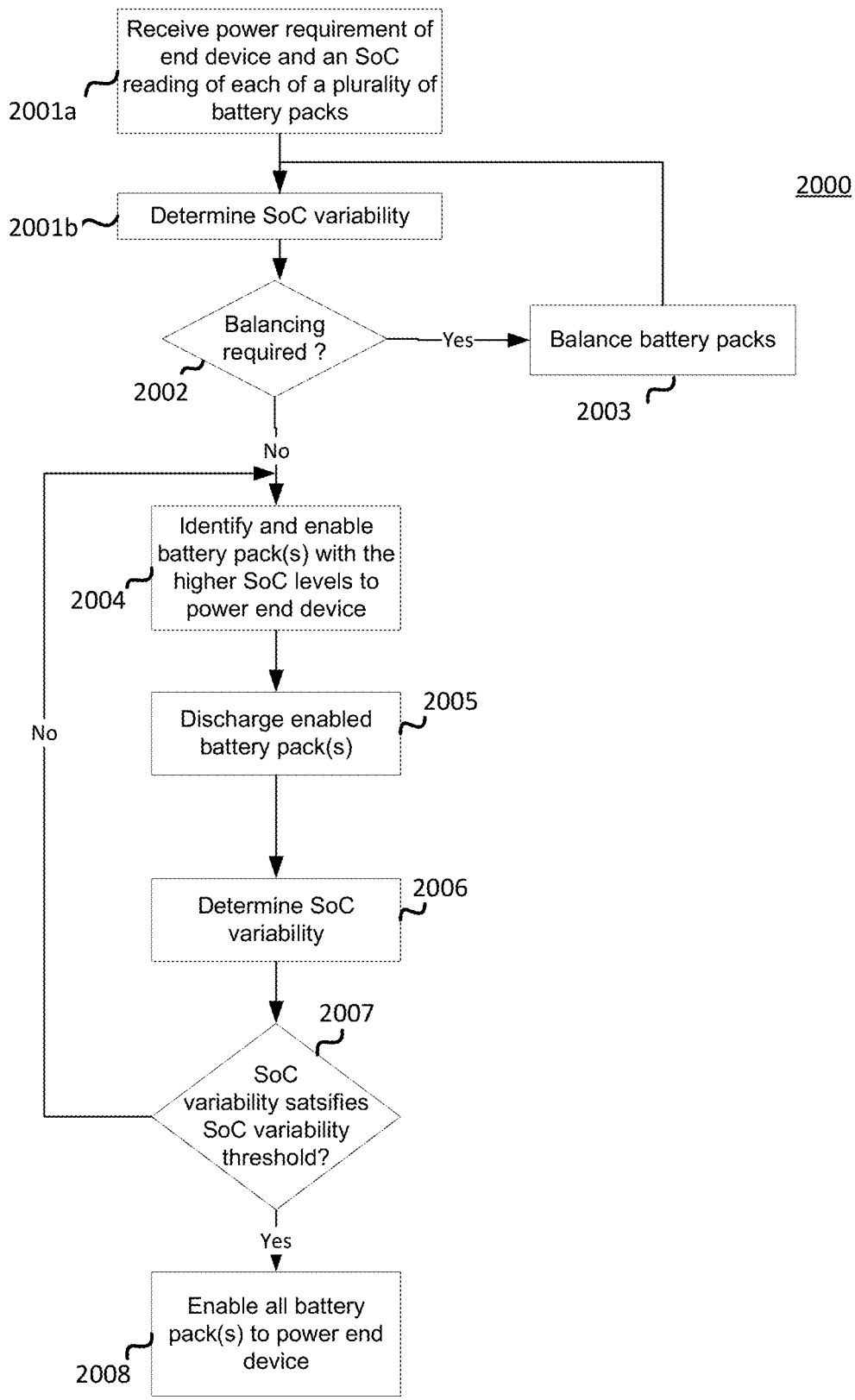
FIG. 20A shows a flowchart for discharging a plurality of battery packs in accordance with an embodiment.
Figure 20B:
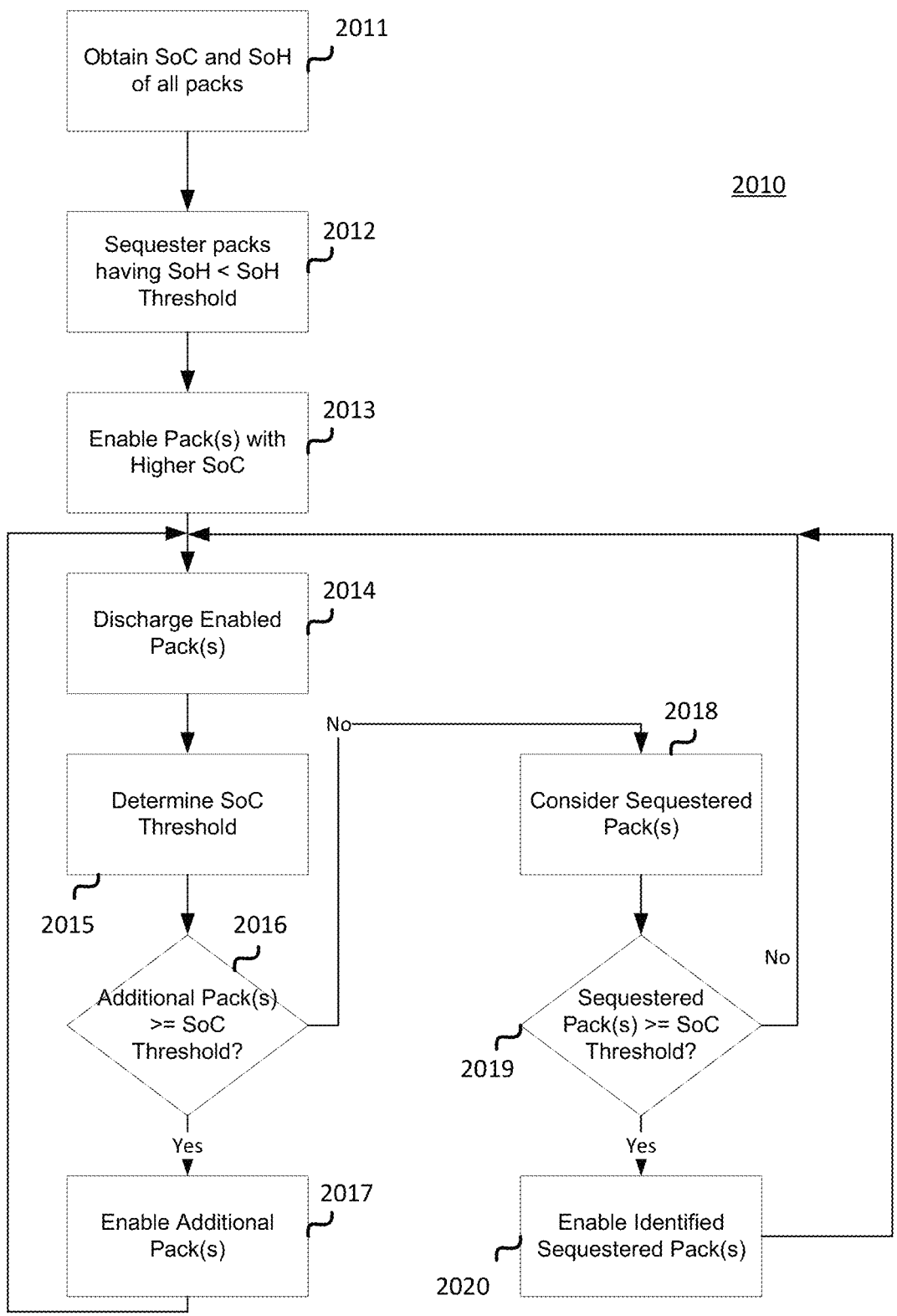
FIG. 20B shows a flowchart for discharging a plurality of battery packs in accordance with an embodiment.

Processes 2000 and 2010 shown in FIGS. 20A and 20B, respectively, are based on the above guidelines.

FIG. 20A shows process 2000 for discharging a plurality of battery packs in order to power an end device. At blocks 2001-2003, initial SoC values of the battery packs are gathered and balancing may be performed based on the SoC variation and the power requirements of the end device. FIG. 19B, as discussed previously, is an example illustration of the process of balancing the battery packs, as described in blocks 2001-2003. However, as will be described in blocks 2004-2008, some aspects of the present disclosure may involve the initial powering of an end device by a single or limited number of battery packs having a higher SoC level, before other battery packs can join in the powering of the end device. FIG. 19a, as discussed previously, is an example illustration of the process of powering an end device by a limited number of battery packs initially and expanding the list of battery backs that can power the end device.

Referring now to block 2001a, a power requirement of the end device may be obtained, and a first reading of a SoC of each of the plurality of battery packs may be obtained. The plurality of battery packs may include various battery packs or groups of battery packs with varying SoC values. At block 2001b, an SOC variability may be calculated to determine a degree to which the SoC values vary among the plurality of battery packs. Also or alternatively, the highest SoC level may be identified, and the computing device may determine that not all of the battery packs have SoC values the highest SoC level.

Depending on the SoC variability, the plurality of battery packs may pose a risk if they are used to concurrently power the end device. As discussed previously in relation to FIG. 19a, if a group of one or more of the plurality of battery packs has SoC values at a level that is significantly greater than the SoC's of the rest of the plurality of battery packs, it may be advisable to initially power the end device only using the group with the significantly greater SoC values (e.g., without the concurrent powering by the other battery packs of the plurality of battery packs). The computing device may allow a group of a single or a restricted number of battery packs to power an end device by only enabling the corresponding discharge arrays of the group. The pathway of allowing the group to power the end device is shown in blocks 2004-2008.

Another way to address the above-described and similar risks may be to balance the battery packs, and thereby reduce the SoC variability of the plurality of battery packs, as discussed previously in relation to FIG. 19b. For example, one group of battery packs (e.g., a first group) may have SoC values that are at a level lower than another group of battery packs (e.g., a second group). An SoC variability of the plurality of devices may be calculated and found to not satisfy an SoC variability threshold (e.g., the range between the highest and lowest SoC values is too high) based on the variation in SoC between the first group and second group. The computing device may thus determine that a balancing is required (e.g., "Yes" at block 2002) based on the SoC variability not satisfying (e.g., falling within) the SoC variability threshold. The battery packs may thus be balanced according to previously discussed methods as shown in FIG. 19B.

The computing device may consequently determine whether or not a balancing is not required (e.g., "No" at block 2002). The decision may be a preference provided (e.g., configured) to the computing device by an operator of the computing device. Also or alternatively, the decision may be based on two or more SoC variability thresholds. For example, if the SoC variability of the plurality of battery packs is higher than a higher SoC variability threshold (e.g., a first SoC variability threshold), the pathway of balancing the battery packs may be triggered. If the SoC variability is not higher than the first SoC variability threshold but is still higher than a second SoC variability threshold (which is not as high as the first SoC variability threshold), the pathway depicted in bocks 2004-2008 may be triggered (e.g., causing battery pack(s) with higher SoCs to initially power the end device).

Referring now to blocks 2004-2005, a group of one or more battery packs may be identified and enabled (e.g., by enabling the corresponding discharge arrays) to power the end device. The group may be identified by identifying the battery packs with SoCs at the highest level, or at least at a higher level than other battery packs. The computing device may thus cause the group to power the end device, thereby beginning the discharging of the group of battery packs (e.g., as in block 2005). The group of discharging battery packs may reach an lower SoC level. The resulting lower SoC level of the group, which initially had a higher SoC level, may result in a lower SoC variability for the plurality of battery packs. The computing device may thus determine the updated SoC variability at block 2006. If the updated SoC variability fails to satisfy the SoC variability threshold (e.g., there are still battery packs with higher SoC levels), the additional battery packs may be similarly identified and enabled to power the end device at blocks 2004-2005. After the SoC variability of the plurality of battery packs satisfies the SoC variability threshold (e.g., there is not much variation in the SoC levels of the plurality of battery packs), the computing device may allow all battery packs to power the end device.

Also or alternatively, both of the above-described pathways (e.g., blocks 2002-2003 and blocks 2004-2008, respectively) may be combined. For example, after balancing has been performed at block 2003, a second reading of the SoC's of each of the plurality of battery packs may be obtained, and a second SoC variability may be calculated. The SoC variability may satisfy the SoC variability threshold, e.g., the SoC's of the plurality of battery packs may vary less and/or have a reduced range. Subsequently, the plurality of battery packs may concurrently power the end device.

FIG. 20B shows process 2010 for discharging a plurality of battery packs in accordance with an exemplary embodiment. Process 2010 is similar to process 2000; however, some of the battery packs may be sequestered based on a state of health (SoH) of the battery packs. Battery packs with a low SoH may be sequestered and used only when needed.

At blocks 2011-2013, the SoC and SoH values of the battery packs may be gathered. The battery packs with SoH values that do not satisfy a predetermined SoH threshold may be sequestered, and in order to enabled after non-sequestered battery packs have been used. Non-sequestered battery packs (e.g., battery packs with SoH levels that satisfy the SoH threshold). may be used to initially power the end device based on the end device requirements and SoC values of the battery packs, as explained herein.

For example, at block 2013, the battery packs with SoC values that satisfy an SoC threshold (e.g., the SoC values are above the next highest level of SoC among the plurality of battery packs) may be enabled to power an end device, thereby resulting in the discharging of these battery packs at block 2014. As shown in blocks 2014-2016, the enabled battery packs can be discharged until a lower SoC value is reached (e.g., the SoC fail to satisfy the SoC threshold). At that time, additional non-sequestered battery packs may be enabled at block 2017. However, when no non-sequestered battery packs are available, the sequestered battery packs may be considered at 2018-2020.

Sequestering low SoH battery packs may be beneficial since usage of older battery packs (often associated with a low SoH value) may be reduced, thus extending the life of those battery packs.

Figure 21:
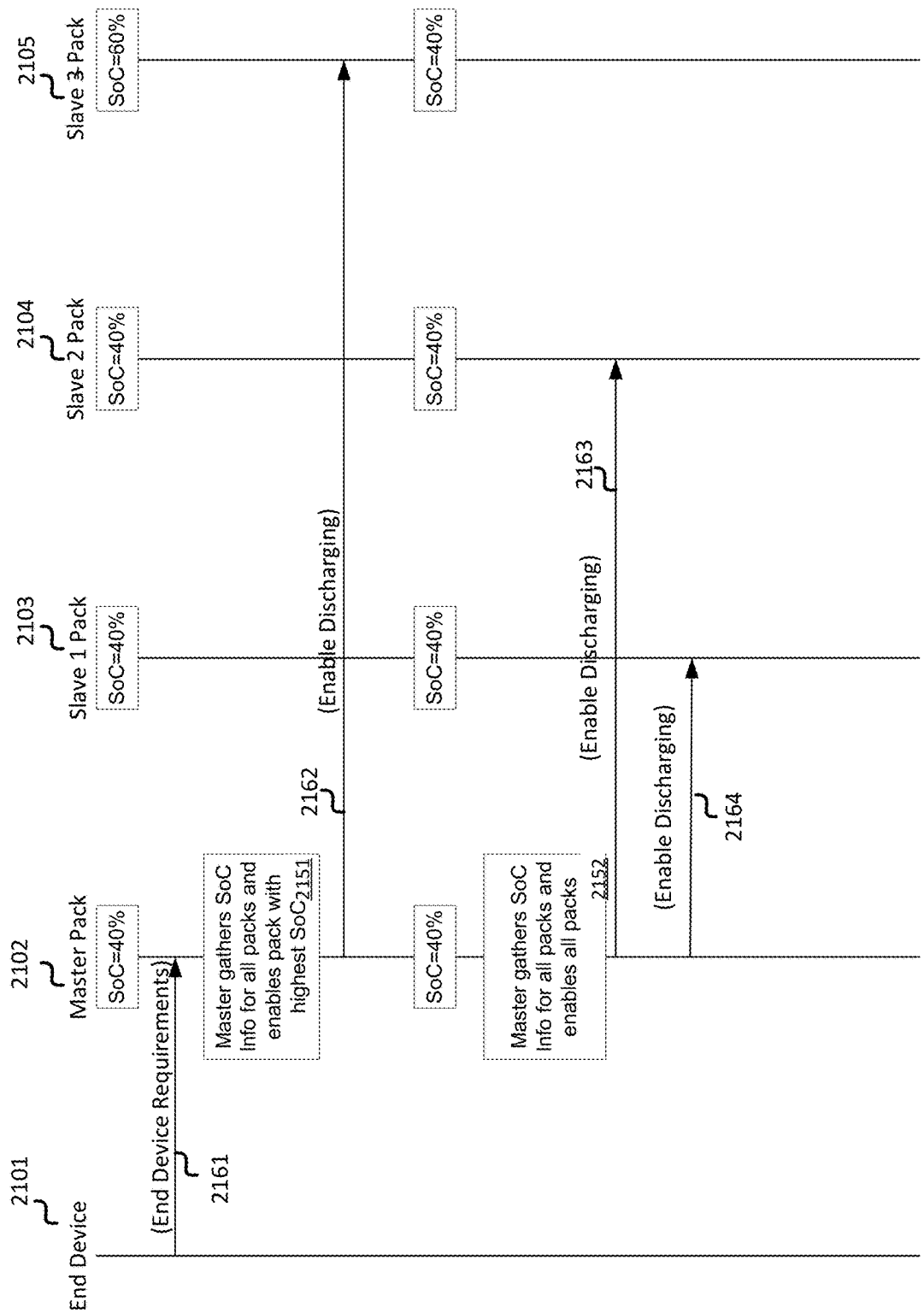
FIG. 21 shows a message flow scenario for discharging a plurality of battery packs in accordance with an embodiment.

FIG. 21 shows a message flow scenario for discharging a plurality of battery packs for the example shown in FIG. 19A. Battery packs 2002-2005 initially have SoC values of 40%, 40%, 40%, and 60%, respectively. Power requirements of end device 2101 may be obtained from master battery pack 2102 via message 2161 over the communication channel (for example, a CAN bus), where only one battery pack is needed to power end device 2101. Consequently, in accordance with process 2100, master battery pack 2102 may enable battery pack 2105 for discharging via message 2162.

When battery pack 2105 reaches the SoC value of the other battery packs, master battery pack 2102 enables battery packs 2103 and 2104 via messages 2163 and 2164 and may enable itself via internal messaging.

In some aspects, a process (for example, process 2200 as will be discussed) may be directed to a "limp home state" operation for a failed Li-ion battery cell in a large-format battery pack system. A "Limp home state" operation can safely mitigate a catastrophic failure in a system. For example, the voltage of a battery cell may become very low (e.g., below a predetermined voltage threshold), indicative of a failing battery cell. With a medium-large battery pack implementation, the internal battery management system may preemptively diagnose a failure and consequently may mitigate the failure by initiating a partial shutdown of the battery pack such that the equipment (end device) being powered by the battery system does not require a total shutdown and can still "limp home."

Figure 22:
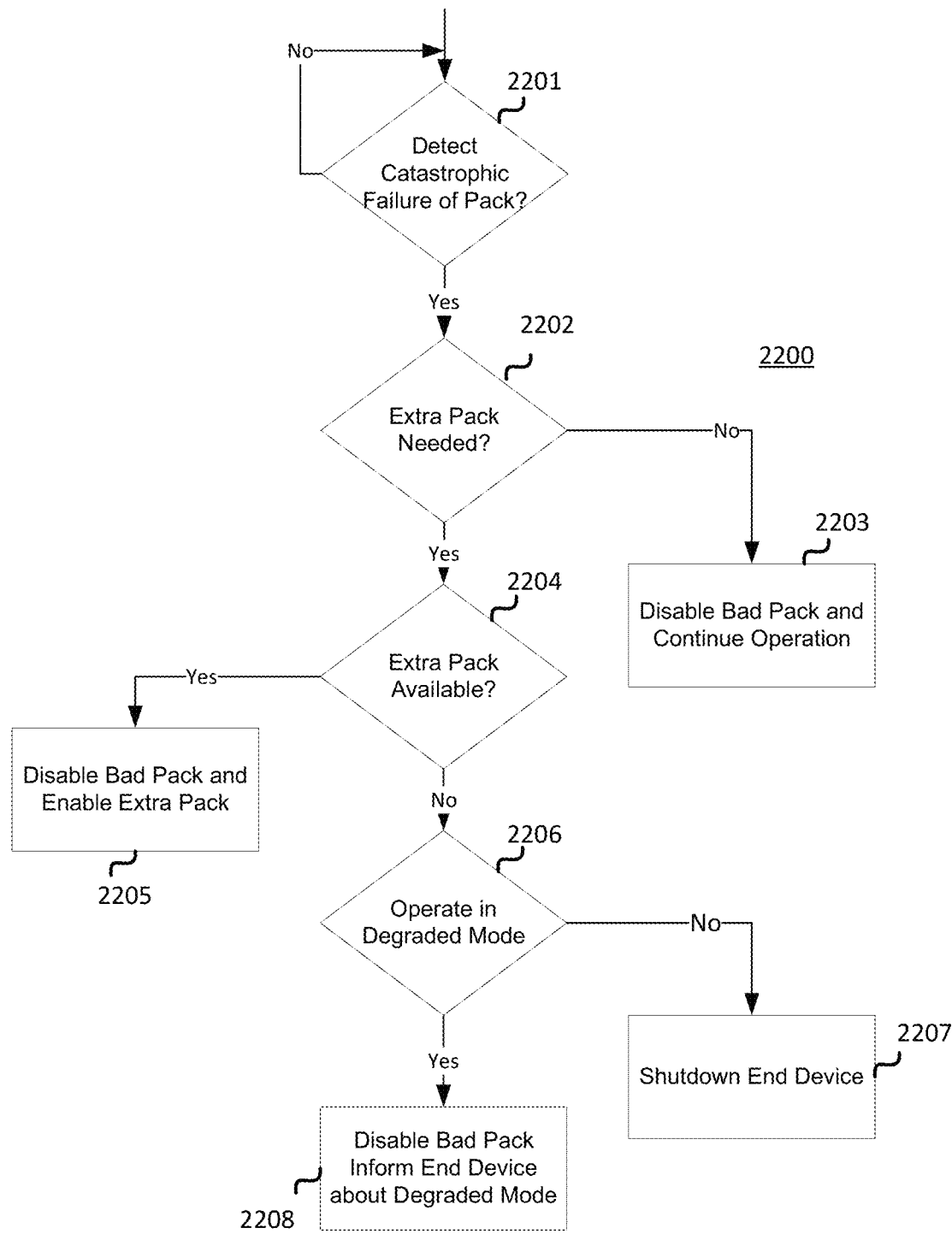
FIG. 22 a flowchart for limp home state operation in accordance with an embodiment.

FIG. 22 is a flowchart for limp home state operation in accordance with an embodiment. At block 2201, the master battery pack detects a catastrophic failure of one or more of the battery cells of one of the battery packs powering the end device. For example, a cell voltage in the battery pack may drop below an acceptable minimum threshold, a maximum current is exceeded, and/or a battery cell temperature is above an allowable range.

When the master battery pack detects the catastrophic failure, the master battery pack determines whether an extra battery pack is needed at block 2202. For example, a battery system may have activated four battery packs when an end device needs only three battery packs with a given SoC level. If so, process 2200 disables the bad battery pack and continues operation at block 2203.

However, if the extra battery pack is needed, the master battery pack determines whether an unused battery pack (which may be the master battery pack itself) in the battery system is available at block 2204. If so, the master battery pack disables the bad battery pack (for example, disabling the discharging array) and enables the extra battery pack (for example, enabling the discharging array) at block 2205. If more than one extra battery pack is available, the master battery pack may select the extra battery pack having the largest SoC value in order to continue service for the largest possible time. However, when no extra battery packs are available and degraded operation of the end device is permitted, as determined at block 2206, the master battery pack disables the bad battery pack and sends a failure alert message to the end device about degraded operation at block 2208. However, if degraded operation is not acceptable for the end device, power is removed from the end device at block 2207 to shut down the end device.

When a fault occurs at a slave battery pack, it is possible that the slave battery pack does not send a message to the master battery pack under various failure states. However, the master battery pack may determine that there is no longer communication from the slave battery pack and adjust a power level (derate) to the end device.

While the bad battery pack may be a slave battery pack, the master battery pack itself may be the bad battery pack.

For example, a fault may occur with one of its battery cells while the processing capabilities of the master battery pack is not compromised. If so, the master battery pack may internally disable its own discharging array, attempt to enable the discharging array of a spare battery pack, and continue operating as the master battery pack.

With some embodiments, when the master battery pack has faulted, a new master battery pack may be assigned even if the faulty master battery pack is still operational. This approach ensures that the faulty master battery pack does not compromise the integrity of the overall handling of the other battery packs.

With some embodiments, when the master battery pack has faulted, a new master battery pack may be assigned to allow continued derated performance when communication to the faulty master battery is lost.

Figure 23A:
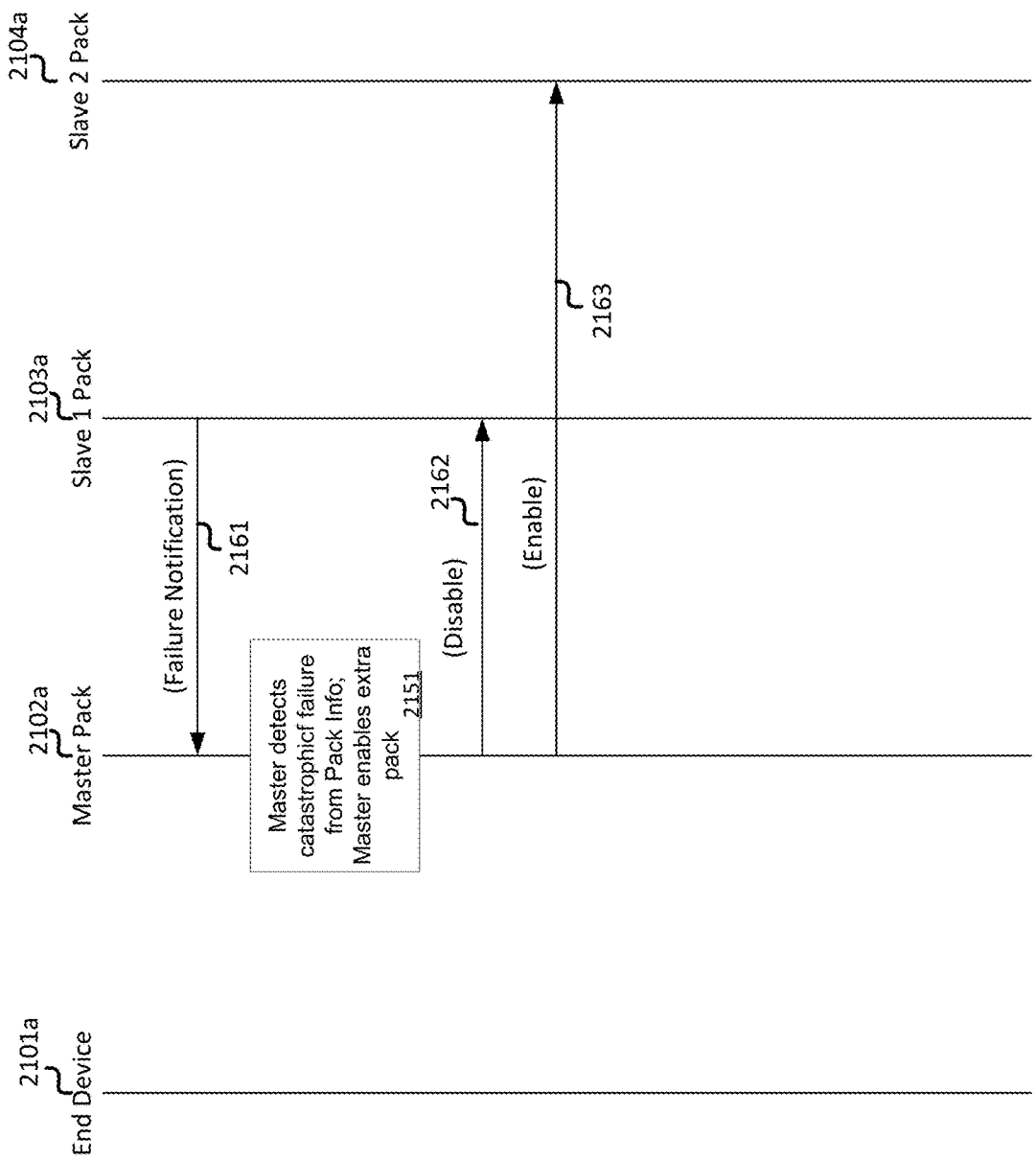
FIG. 23A shows a message flow scenario for limp home state operation in accordance with an embodiment.

FIG. 23A shows a message flow scenario for limp home state operation in accordance with an embodiment. With this scenario, a spare battery pack (pack 2104*a*) is available when a catastrophic failure is detected at battery pack 2103*a*.

At event 2151*a*, master battery pack 2102*a* detects a catastrophic failure at battery pack 2103*a* in response to failure notification message 2161. For example, battery pack 2103*a* may provide battery status information indicative of a low battery cell voltage. The status information may be in response to a query from master battery pack 2102*a* or may be autonomously sent when a catastrophic event occurs. Consequently, master battery pack 2102*a* enables spare battery pack 2104*a* and disables bad battery pack 2103*a* via messages 2163 and 2162, respectively.

FIG. 23A shows a message flow scenario for limp home state operation in accordance with an embodiment. With this scenario, a spare battery pack is not available.

At event 2152, similar to the message scenario in FIG. 23A, master battery pack 2102*b* detects a catastrophic failure at battery pack 2103*b* when receiving failure notification message 2164 from 2103*b*. Because master battery pack 2102*b* determines that no spare battery pack is available, master battery pack 2102*b* disables battery pack 2103*b* via message 2165 and sends degradation message 2166 to end device 2101*b*, where end device 2101*b* is able to operate in a degradation state.

Figure 23B:
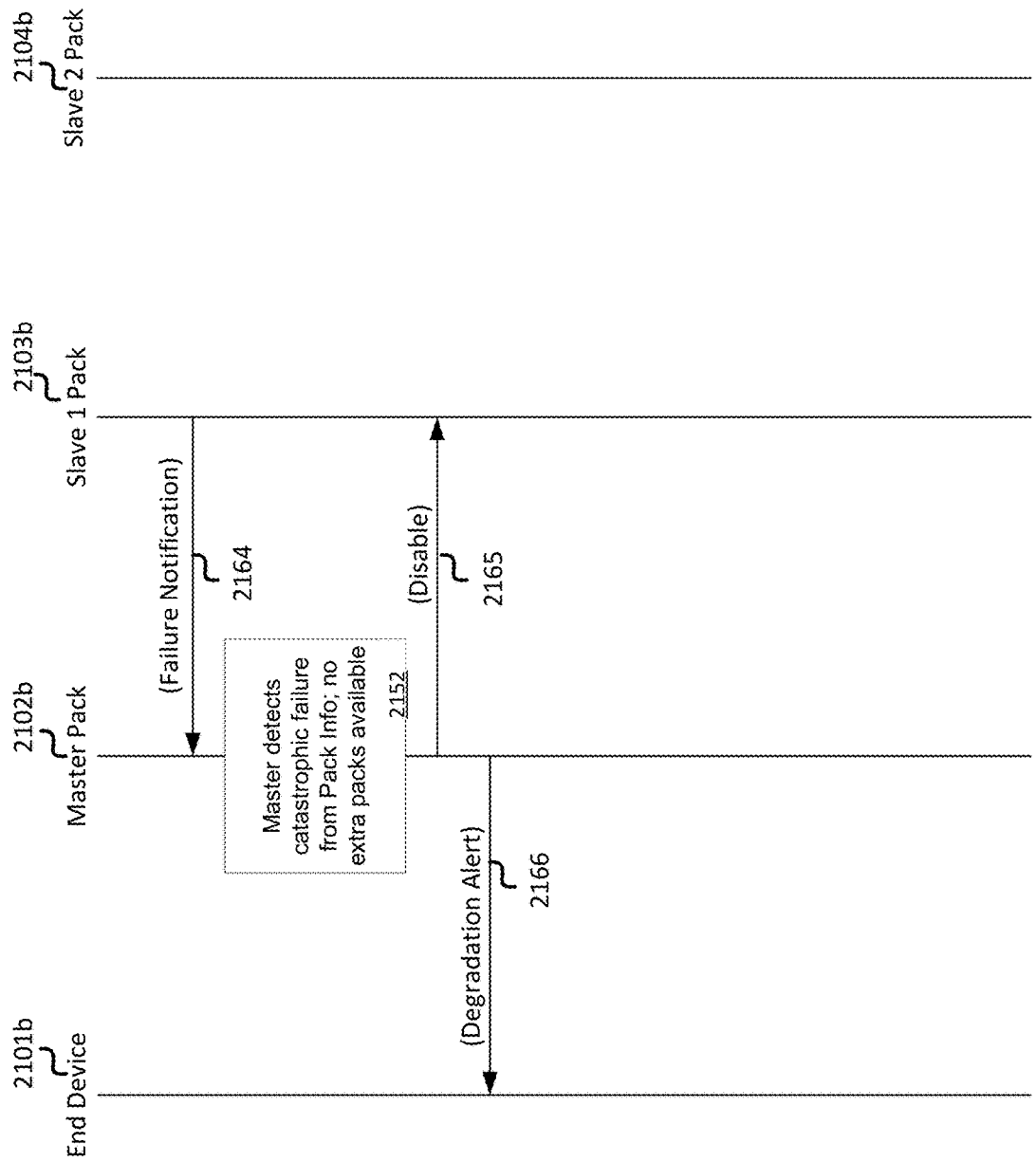
FIG. 23B shows a message flow scenario for limp home state operation in accordance with an embodiment.

Referring to FIGS. 23A-B, failure notification messages 2161 and 2163 may be autonomously sent from the battery pack incurring the catastrophic failure or may be sent in response to a request for battery status information from master battery pack 2102*a,b*. When sent autonomously, the battery pack may detect when a battery parameter (for example, SoH or cell voltage) drops to a predetermined threshold and then sends the failure notification message to master battery pack 2102*a,b*. When sent in response to a status request, master battery pack 2102*a,b*, the status request repetitively (for example, periodically). The battery pack receives the status requests and, in response, provides current battery status information. When one or more of the returned battery parameters drops below a predetermined threshold, master battery pack 2102*a,b* detects a catastrophic failure at the battery pack.

With some embodiments, master battery pack 2102*a,b* may receive periodic battery status information from the other battery packs. When master battery pack 2102*a,b* detects a sudden drop (for example, more than a predetermined difference with respect to the previous value) in one of the battery parameters (for example, cell voltage), master battery pack 2102*a,b* may determine that a catastrophic failure at the corresponding battery pack is predicted or imminent and take preemptive action and/or generate a warning notification.

With some embodiments, battery cells 203 and 210 (shown in FIGS. 2A and 2B, respectively) may have a cell structure (for example, a parallel structure) so that the battery pack may deactivate the failing battery cells while the other battery cells remain enabled. In such a situation, the battery pack may operate in a degraded state and report that the battery pack is operating in the degraded state to master battery pack 2102a,b.

Figure 24:
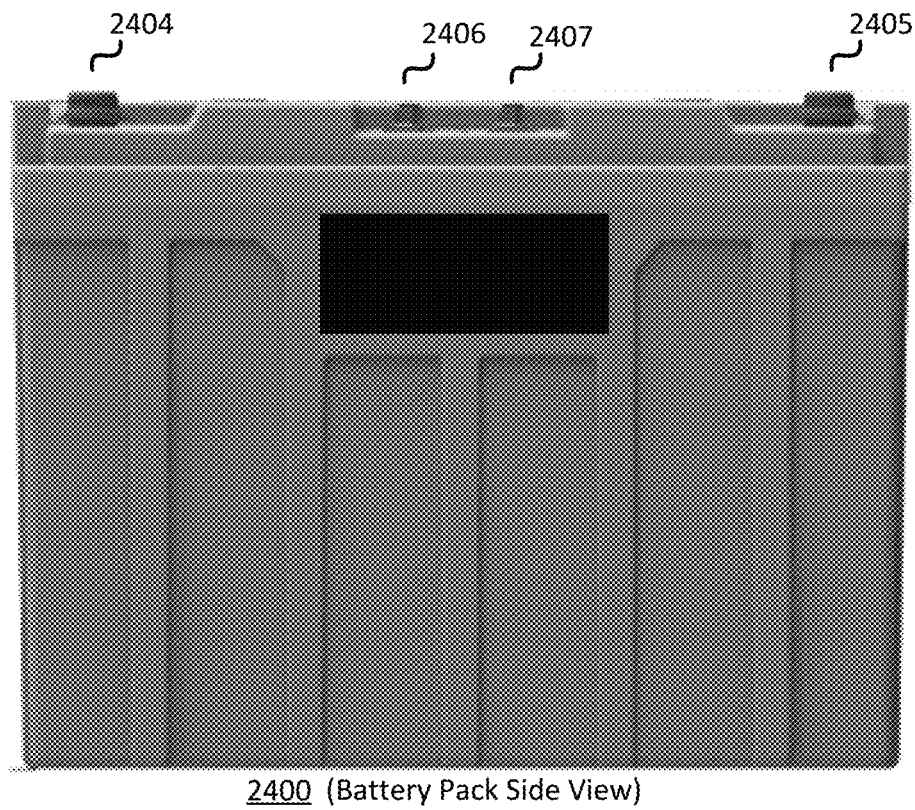
FIG. 24 shows a battery pack capable of electrically powering an end device in accordance with an embodiment.
Figure 24:
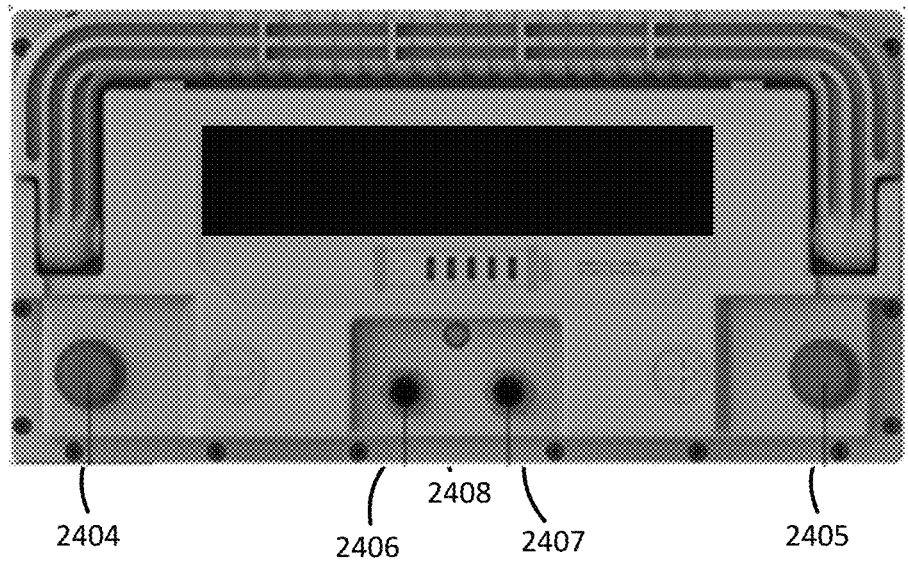

FIG. 24 shows a battery pack capable of electrically powering an end device in accordance with an embodiment. As shown in FIG. 24, two views of a battery pack are depicted. View 2400 is a side view and view 2401 is a top view. The two views depict various components of a battery pack including terminals 2404 and 2405, connector ports 2406 and 2407 for a communication channel, and button 2408. The terminals 2404 and 2405 are where power can be discharged from the battery pack and, as depicted, take the form of posts. The connector ports 2406 and 2407 may accept connector cables for a communication channel. For example, each of the connector ports 2406 and 2407 may be an 8-pin socket for a CAN bus. The 8 pins may include, among other things, four communication pins for the CAN bus; one or more signaling pins to wake up the battery pack or otherwise cause the battery pack to enable the terminals 2404 and 2405 for discharging (e.g., the wake pin, as discussed above in connection with FIGS. 1-23B); a ground pin for a reference ground; an interlock pin for charging the battery pack (e.g., the safety interlock pin, as discussed above in connection with FIGS. 1-23B); and a voltage pin that provides unregulated power. The button 2408 may allow an end user to input one or more commands to the battery pack. For example, the end user, by pushing the button 2408 in a particular pattern, may cause the battery pack to reset itself or change to a particular mode. FIG. 24 shows only a few external components of the battery pack. The battery pack may include additional or alternative components than those depicted in FIG. 24, such as a light emitting diode (LED) board and/or one or more of the components depicted in FIGS. 2A and 2B.

As mentioned above, a battery pack may operate in different modes at different times. Each of the different modes may provide its own set of functionality that affects how the battery pack operates and/or reacts to external input signals. At a given time, the battery pack may be operating according to a first mode. At some point in time, the battery pack may be provided a command to switch modes and, after completing the transition to a second mode, the battery pack may operate according to the second mode. There may be observable differences between how the battery pack operates in the first mode and how the battery pack operates in the second mode.

There may be various ways to switch between modes. For example, the battery pack may send and receive, via one of the connector ports 2406 or 2407, messages with one or more other devices that cause the switch between modes. The button 2408 may also be pushed in a particular pattern to switch between modes.

The various functionalities provided by a mode may depend on battery pack chemistry, battery pack capability, the needs of the end user, and/or design choices of the battery pack provider. The following provides a few examples of how a battery pack's performance may be affected by the battery pack being capable of operating in different modes at different times.

A mode may change how the battery pack discharges power. For example, while the battery pack operates in certain modes, the battery pack may be capable of selectively enabling or disabling the terminals 2404 and 2405. This selection may be based on receiving an appropriate indicator via a signaling pin of the connector port 2406 or 2407 (e.g., the signaling pin that wakes up the battery pack or otherwise causes the battery pack to enable the terminals 2404 and 2405 for discharging). When enabled, the terminals 2404 and 2405 may be capable of discharging electric power from the battery pack. The enabling may occur as a response to the battery pack receiving the appropriate indicator via the signaling pin. When disabled, the terminals 2404 and 2405 may not be capable of discharging electric power from the battery pack. The disabling may occur as a response to the battery pack failing to receive the appropriate indicator via the signaling pin within a threshold period of time (e.g., the disabling occurs based on the indicator not being received within 5 seconds from the last time the indicator was received). While the battery pack operates in other modes, the battery pack may always enable the terminals 2404 and 2405. In this way, the terminals 2404 and 2405 may be always capable of discharging electric power and receipt of an appropriate signal via a signaling pin would not be needed.

A mode may change how the battery pack's hardware operates. For example, while the battery pack operates in certain modes, one or more portions of the battery pack's hardware could be prevented from receiving power or could be otherwise disabled from operation. The same one or more portions could receive power, or be otherwise enabled for operation, while the battery pack operates in other modes.

A mode may change what battery-related services are provided by the battery pack and available to an end user. For example, while the battery pack operates in certain modes, the battery pack may gather battery status information and provide the battery status information to the end user. While the battery pack operates in other modes, the battery pack may not gather battery status information and, accordingly, may not provide the same to the end user. The battery status information may be the same as or similar to the battery status information discussed above in connection with FIGS. 1-23B. The services provided by the battery pack may also affect the battery's performance. For example, based on operating in different modes at different times, the battery pack may operate in such a way that simulates the operation of different battery types (e.g., operate in a way that simulates an always discharge-capable lead acid battery; operate to provide smart algorithms for charge, discharge, and balancing; and the like).

Being capable of simulating the operation of different battery types provides further benefits to a battery system. For example, battery packs may be provided using a common hardware platform while still being capable of meeting diverse needs or desires of end users. Indeed, some end users may desire battery packs implement smart battery algorithms while other end users may desire battery packs that provide functions the same as or similar to an always discharge-capable lead acid battery. By being capable of operating in different modes, battery packs with a common hardware platform could be variously configured to meet the diverse needs or desires of end users.

Battery packs capable of operating in different modes at different times may provide for improved customization of performance. For example, while operating in certain modes, a battery pack may provide the functionality of an always discharge-capable lead acid battery under normal operating conditions (e.g., when charging, discharging, etc.), but may modify the battery pack's functionality when a fault is detected (e.g., by making the battery pack discharge-incapable when a fault is detected). In this way, various aspects, such as battery safety, could be improved or otherwise customized to meet specialized needs or desires.

To further illustrate how a battery pack's performance may be affected by the battery pack being capable of operating in different modes at different times, Table 4 provides examples of differences in functionality between two modes. In particular, Table 4 provides example differences in functionalities for a first mode and a second mode. The first mode may be considered a "dumb" battery mode of operation and/or may cause the battery pack to operate in a way that simulates an always discharge-capable lead acid battery. The second mode may be considered an example of a "smart" battery mode of operation and/or may cause the battery pack to operate in a way that executes smart algorithms for charge, discharge, and balancing. These smart algorithms may be the same as or similar to the smart algorithms for the same that were discussed above in connection with FIGS. 1-23B. The second mode may support additional safety features, such as the safety interlock pin features discussed above in connection with FIGS. 1-23B (e.g., when the safety interlock indicator is not detected via the safety interlock pin, the battery pack may enter the sleep state). The two modes of Table 4 show plural differences in provided functionality. These plural differences are meant to be exemplary. Modes can be differentiated from each other by a single functionality, and even a single functionality that would not be apparent to or observable by an end user. A mode may include different, additional, and/or alternative functionalities than those discussed in the examples of Table 4.

TABLE 4

Example Functionality Differences of Modes

| Example Functionality | First Mode | Second Mode |
|---|---|---|
| Communication channel fully enabled? | No | Yes; data such as battery status information may be sent from the battery pack via the communication channel |
| Terminals enabled for discharge? | Always enabled | Selectively enabled or disabled based on receipt of a signal via a signaling pin |
| Converter balancing supported? | No | Yes |
| Direct balancing supported? | No | Yes |
| Staggered balancing supported? | No | Yes |
| Safety interlock supported? | Yes; required to begin normal charging/discharging operation after a factory initialization or after a factory reset | Yes; enter sleep state if the safety interlock indicator is not detected via an interlock pin |

The manner in which the battery pack operates in a mode further illustrates how a battery pack's performance may be affected. While a battery pack operates in a particular mode, a state machine for the particular mode may guide operation of the battery pack. A state machine may define a number of states and state transitions. These states and state transitions may guide the operation of the battery pack while the battery pack operates in the particular mode. When the battery pack changes modes, the battery pack may also change which state machine guides operation of the battery pack. A battery pack may implement a state machine using computer-executable instructions, circuitry embedded within the hardware of the battery pack, or a combination thereof. For example, a battery pack may implement a state machine by providing a MOSFET state for each state of the state machine. The controller of the battery pack, based on detection of a state transition, may transition to the appropriate MOSFET state. In this way, the battery pack may, based on the MOSFET state, implement the state machine and operate in the particular mode.

Differences in the states and/or state transitions of the state machines for different modes may also illustrate how a battery pack's performance may be affected. Example states were provided above in connection with FIGS. 1-23B (e.g., Off (Sleep), Balancing, and Charging/Discharging, as discussed in connection with Table 3). Table 5 provides examples of state transitions that may differ between modes. In particular, Table 5 provides a listing of state transitions that could be used to transition between states when operating in a mode. A first mode may use a first set of the example state transitions and a second mode may use a second set of the example state transitions.

TABLE 5

Example State Transitions

Expiration of an internal timer
Non-receipt of communication via communication channel
Charge current less than, and/or equal to, a threshold
Discharge current less than, and/or equal to, a threshold
Charge current greater than, and/or equal to, a threshold
Discharge current greater than, and/or equal to, a threshold
Safety interlock indicator received via the safety interlock pin
Wake indicator received via the wake pin
Safety interlock indicator not received via the safety interlock pin
Wake indicator not received via the wake pin
Command received via the communication channel
Command received based on one or more pushes of a battery pack's button
Communication received from a charger device
Voltage applied to terminals
Detection of one or more faults The example state transitions of Table 5 may be viewed in combination with the example modes of Table 4. As one example, the state machine for the first mode of Table 4 may cause a transition to a failure state based on detection of one or more faults (see, e.g., the limp home state and/or the degraded state discussed in connection with FIGS. 23A and 23B). While in the failure state, the terminals may be disabled such that the battery pack is incapable of discharging electric power.

To further illustrate how a battery pack's performance may be affected by the battery pack being capable of operating in different modes at different times, FIG. 25, which shows a circuit diagram of a portion of a battery pack, will be discussed in connection with examples that enable or disable particular portions of a battery pack's hardware. In general, while operating in certain modes, the battery pack may prevent the supply of power to the particular portions of the battery pack's hardware. While operating in other modes, the battery pack may enable the supply of power to the particular portions of the battery pack's hardware. By preventing and enabling the supply of power, the particular portions of the battery pack's hardware can be disabled and enabled.

Figure 25:
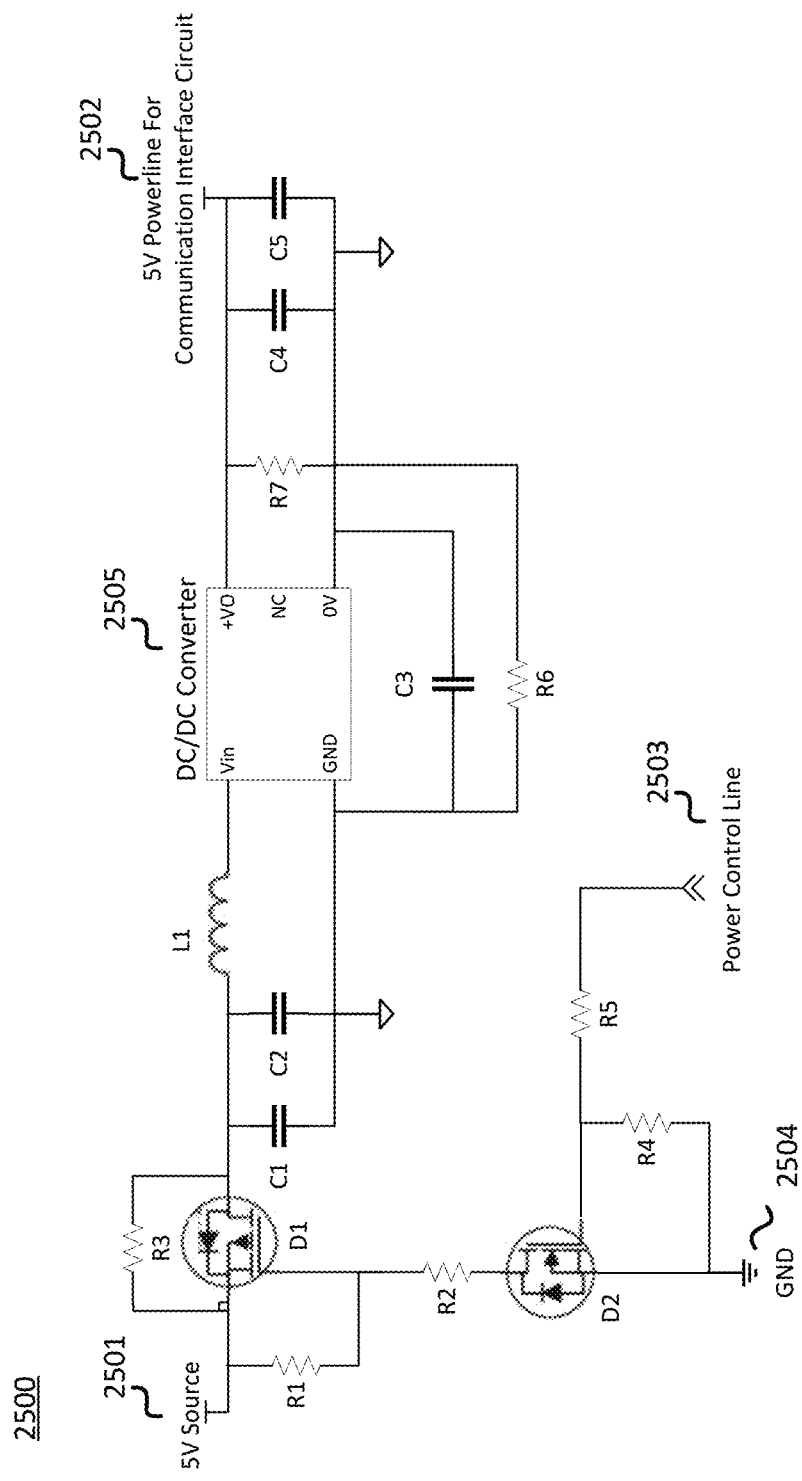
FIG. 25 shows a circuit diagram of a portion of a battery pack in accordance with an embodiment.

FIG. 25 depicts circuitry 2500 that includes an arrangement of resistors R1-R7, capacitors C1-C5, inductor L1, a DC/DC converter 2505, diodes D1-D2, and a reference ground 2504. The circuitry 2500 is configured to provide power from a 5-volt source 2501 (or other voltage level source) to a powerline 2502 for a communication interface circuit. The communication interface circuit may enable communication to and/or from the communication channel. Power from the source 2501 can be prevented from being supplied to the powerline 2502 based on the state of the power control line 2503. When the power control line 2503 is provided a first indicator (e.g., set to high), power may be transferred from the source 2501 to the powerline 2502. In this way, the communication interface circuit may be supplied with power and, thus, may be enabled and capable of sending and receiving communications. When the power control line 2503 is provided a second indicator (e.g., set to low), power may be prevented from being transferred from the source 2501 to the powerline 2502. In this way, the communication interface circuit may not be supplied with power and, thus, may be disabled and incapable of sending and receiving communications. Based on this, while operating in certain modes, the battery pack may provide the power control line with the first indicator and the communication interface circuitry may be supplied with power and, thus, may be enabled and capable of sending and receiving communications. While operating in other modes, the battery pack may provide the power control line with the second indicator and the communication interface circuitry may not be supplied with power and, thus, may be disabled and incapable of sending and receiving communications. Circuitry 2500 provides only one example of the portions of the battery pack's hardware that can be enabled and disabled while the battery pack operates in different modes.

Figure 26A:
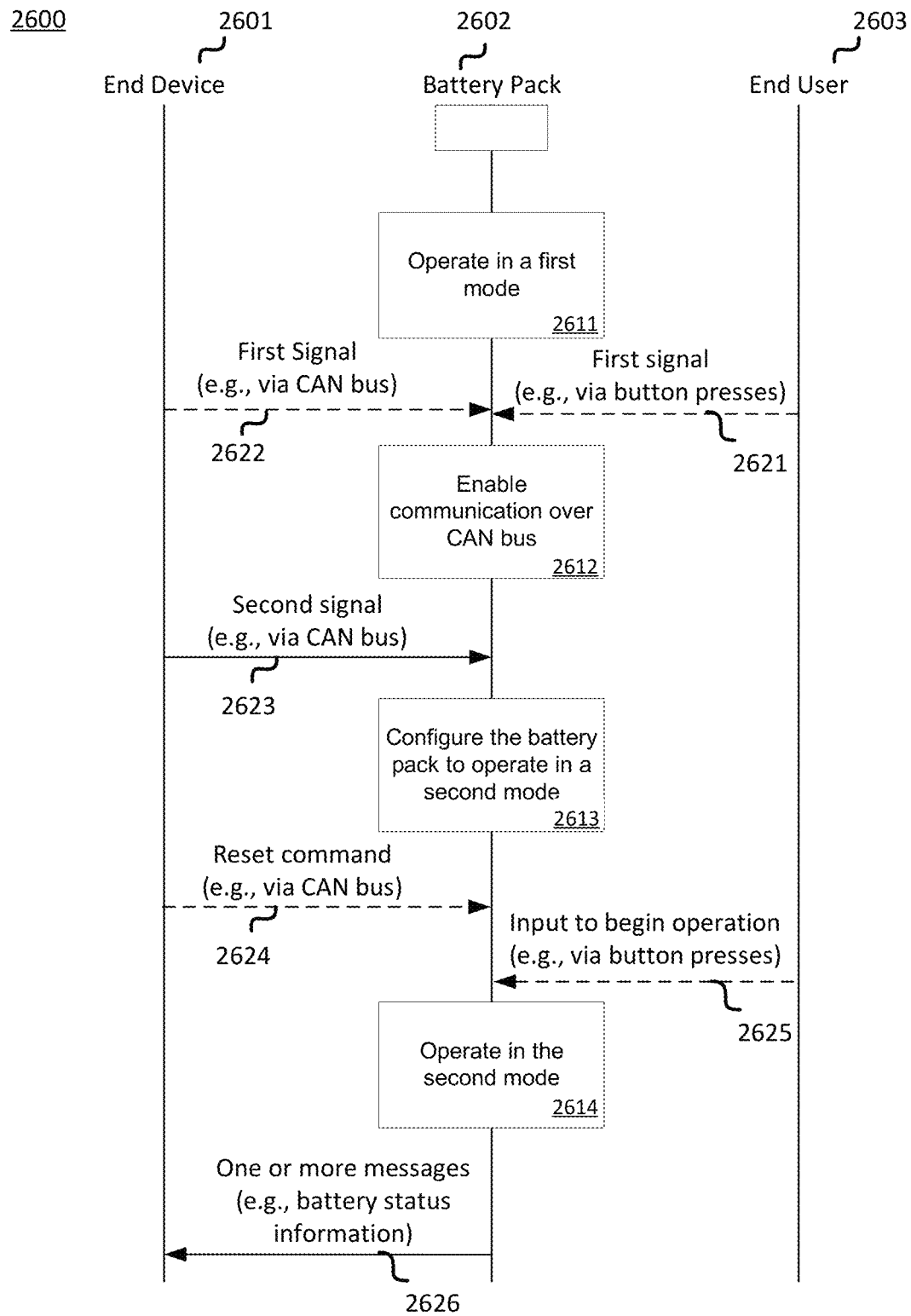
FIG. 26A shows a message flow scenario operating a battery pack in two different modes of operation in accordance with an embodiment.

Changing to different modes may be based on the battery pack receiving input from an end user and/or receiving one or more messages via the communication channel from another device. For example, an end user may press a button on the battery pack in a particular pattern to change (e.g., toggle or switch) from a first mode and to a second mode. As another example, the battery pack may receive an encryption key configured to cause the mode change via the communication channel. FIG. 26A shows a message flow scenario for operating a battery pack in two different modes of operation in accordance with an embodiment. In particular, FIG. 26A depicts a message flow scenario 2600 that involves an end user 2603, a battery pack 2602, and an end device 2601. The message flow scenario 2600 may illustrate an example change from the first mode of Table 4 to the second mode of Table 4. In other words, the message flow scenario 2600 may illustrate a change in modes where communication via the communication channel is disabled while the battery pack is operating in the first mode and where communication via the communication channel is enabled while the battery pack is operating in the second mode. The message flow scenario 2600 is discussed in terms of the communication channel being a CAN bus. The CAN bus was discussed throughout this disclosure including in connection with FIGS. 1-23B.

At event 2611, the battery pack 2602 may be operating in a first mode. While operating in the first mode, a state machine for the first mode may be initialized and implemented by the battery pack 2602. While operating in the first mode, the battery pack 2602 may be prevented from sending messages over the CAN bus. Depending on the implementation of the mode, the battery pack 2602 may be capable of receiving messages over the CAN bus or may be incapable of receiving messages over the CAN bus. As one example implementation, while operating in the first mode, power may be supplied to the communication interface circuit of the CAN bus and the controller of the battery pack may be monitoring messages received via the CAN bus. As another example implementation, while operating in the first mode, power may be prevented from being supplied to the communication interface circuit of the CAN bus (as discussed in connection with FIG. 25) and the battery pack 2602 may be incapable of both sending and receiving messages via the CAN bus.

At some point in time while operating in the first mode, the battery pack 2602 may receive a first signal that is configured to cause the battery pack to enable communication over the CAN bus. As depicted by the dashed lines of events 2621 and 2622, the first signal can be of different types. Only one of the depicted types needs to be received to cause communication over the CAN bus to be enabled. Event 2621 shows the first signal being received based on the end user 2603 pressing a button of the battery pack (e.g., button 2408) in a particular pattern. The particular pattern of button pushes may cause the battery pack to execute a command that enables communication over the CAN bus. This type of first signal may be used if the battery pack, while operating in the first mode, is incapable of both sending and receiving messages via the CAN bus. Event 2622 shows the first signal being received via the CAN bus and from the end device 2601. This message may include an encryption key configured to cause the battery pack to enable communication over the CAN bus. This type of first signal may be used if the battery pack, while operating in the first mode, is capable of receiving messages via the CAN bus. The end device 2601 may be able to send the message via the CAN bus by use of a PCAN adapter (or other type of adapter) that communicatively couples the end device 2601 to the battery pack 2602.

At event 2612, based on the first signal (either via event 2621 or event 2622), the battery pack may enable communication over the CAN bus. Enabling communication over the CAN bus may include enabling the supply of power to the communication interface circuit of the CAN bus. Enabling communication over the CAN bus may include transitioning to a state, as defined by the state machine for the first mode, that allows communication over the CAN bus to be both received and sent. Enabling communication over the CAN bus may include setting an internal status flag that allows communication over the CAN bus to be received and sent.

At event 2623, the battery pack 2602 may receive a second signal via the CAN bus. This second signal may be received by the communication interface circuit of the CAN bus and provided to the controller of the battery pack 2602 for processing. The second signal may be an encryption key configured to cause the battery pack 2602 to operate in a second mode. This configuration may take the form of a correspondence between the encryption key and the second mode. This encryption key may be different from the encryption key received in connection with event 2622. Further, the end device 2601 may send the second signal after expiration of an internal timer (e.g., 10 seconds) that begins once the end device 2601 sends the first signal (e.g., event 2622). Alternatively, the end user 2603 may provide input that causes the end device 2601 to send the second signal. As a further alternative, the battery pack 2602 may, based on enabling communication over the CAN bus at event 2612, send a request for the second signal to the end device 2601 over the CAN bus (not shown).

At event 2613, the battery pack 2602 may configure itself to operate in the second mode. The second mode may allow the battery pack to communicate over the CAN bus. Configuring the battery pack 2602 to operate in the second mode may include initializing a state machine for the second mode, resetting the battery pack 2602, and determining to begin operation in the second mode. Events 2624 and 2625 depict optional input that may be received as part of, or as a result of, the battery pack 2602 configuring itself to operate in the second mode. In particular, event 2623 involves the end device 2601 sending a reset command via the CAN bus to the battery pack 2602. The reset command may cause the battery pack 2602 to reset itself. Event 2624 involves the end user 2603 providing input to begin operation in the second mode. This input may be provided by pressing a button of the battery pack 2602 in a particular pattern, which may be different from the pattern of event 2621. Further details on how the battery pack may configure itself to operate in the second mode are provided in connection with FIG. 26B.

At event 2614, the battery pack 2602 may operate in the second mode. In comparison to how the battery pack operated in the first mode, operating in the second mode may change the functionality of the battery pack (see, e.g., Tables 4 and 5). For example, the battery pack, while operating in the second mode, may perform one or more of converter balancing, direct balancing, and staggered balancing. Event 2625 provides another example of what may be performed by the battery pack when operating in the second mode. Indeed, as depicted at event 2625, due to the operation in the second mode, the battery pack 2625 may send one or more messages to the end device 2601 via the CAN bus. The one or more messages may include battery status information, which may be the same as or similar to the battery status information discussed above in connection with FIGS. 1-23B.

Figure 26B:
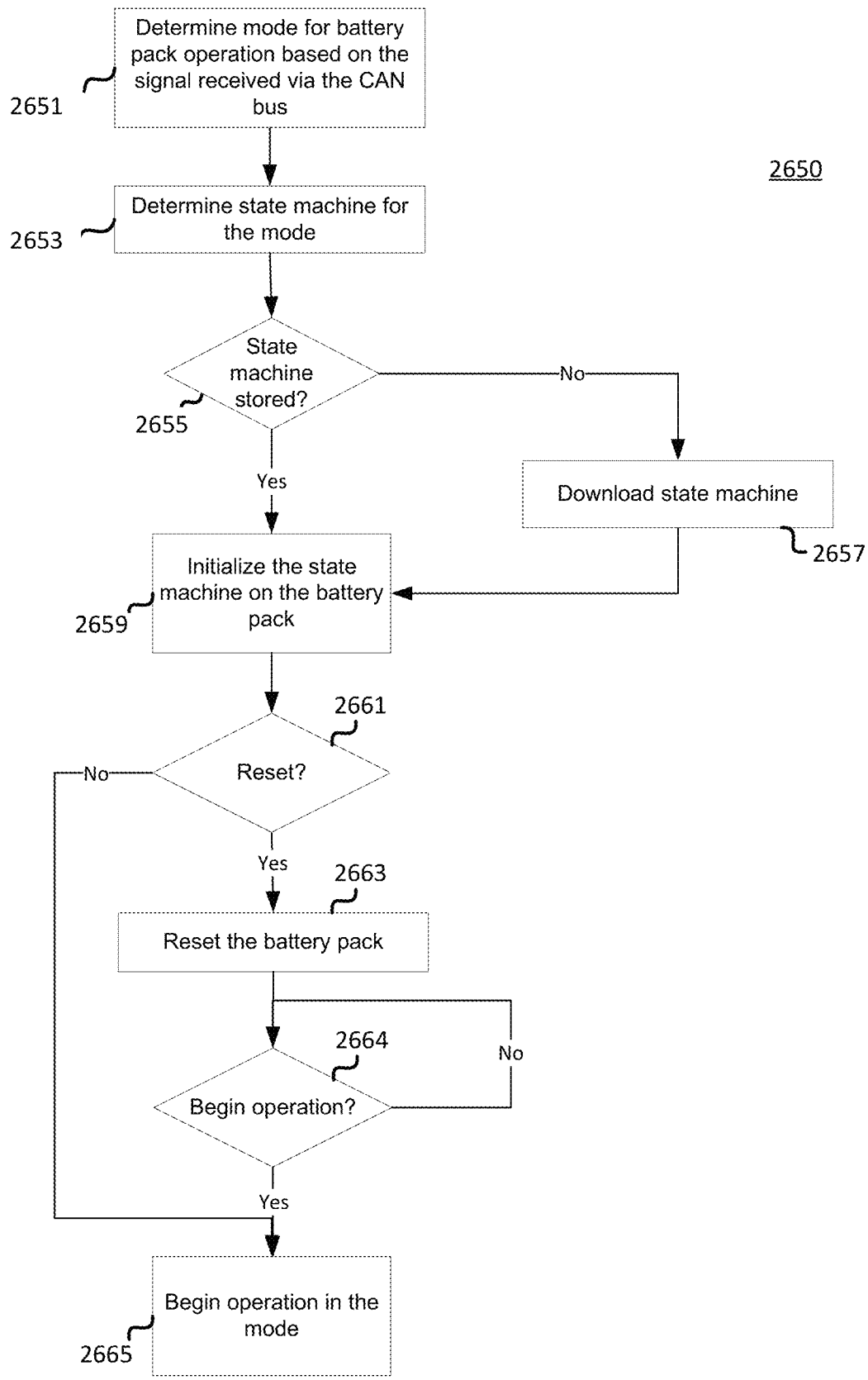
FIG. 26B shows a flowchart for operating a battery pack in two different modes in accordance with an embodiment.

FIG. 26B shows a flowchart for operating a battery pack in two different modes in accordance with an embodiment. In particular, flow 2650 provides a series of steps that may be performed by a battery pack when changing from a first mode to a second mode. Further, flow 2650 may be performed by the battery pack 2602 when configuring itself to operate in the second mode (e.g., event 2613). Similar to the message flow scenario 2600, flow 2650 is discussed in terms a CAN bus.

At step 2651, the battery pack may determine a mode for battery pack operation based on a signal received via the CAN bus. This signal may be the second signal discussed at event 2623 of FIG. 26A. In other words, this signal may be an encryption key that corresponds to the mode for battery pack operation and may differ from an encryption key that is configured to cause the battery pack to enable communication via the CAN bus. The battery pack may determine the mode for battery pack operation based on the encryption key. Indeed, the mode for battery pack operation may be determined based on the correspondence between the encryption key and the mode for battery pack operation. For example, if the encryption key received at step 2651 corresponds to the second mode of Table 4, the battery pack may determine the mode of battery pack operation to be the second mode based on that correspondence.

At step 2653, the battery pack may determine the state machine for the mode. The state machine may define one or more states and one or more state transitions that guide operation of the battery pack while the battery pack operates in the mode.

At step 2655, the battery pack may determine whether the state machine is stored by the battery pack. The state machine may be stored in memory of the battery pack as computer-executable instructions, stored by being embedded in hardware of the battery pack, or a combination thereof. If the state machine is stored by the battery pack, the flow 2650 may proceed to step 2659. If the state machine is not stored by the battery pack, the flow 2650 may proceed to step 2657.

At step 2657, the battery back may download the state machine. Downloading the state machine may include communication with another device (e.g., end device 2601 or some other device capable of sending the state machine to the battery pack). Such communication may include the battery pack both requesting the state machine, receiving the state machine as a response to the request, and storing the state machine in the battery pack.

At step 2629, the battery pack may initialize the state machine. Initializing the state machine may include loading the computer-executable instructions that implement the state machine and executing the computer-executable instructions until an initial state of the state machine. Initializing the state machine may include configuring hardware of the battery pack that embeds the state machine to an initial state of the state machine (e.g., MOSFETs of the battery pack may be initialized to the initial state of the state machine).

At step 2661, the battery pack may determine whether to reset the battery pack. Some changes between modes may require a reset of the battery pack. In this way, the battery pack may determine whether a reset is required based on the mode of battery pack operation. If the battery pack is to be reset, the flow 2650 proceed to step 2663. If the battery pack does not need to be reset, the flow 2650 may proceed to step 2665.

At step 2663, the battery pack may reset itself. The reset may cause internal power to cycle and a boot state to be executed upon completion of the cycle. Upon completing the reset, the flow 2650 may proceed to step 2664. Additionally, in some implementations, the flow 2650 may perform the reset and proceed to step 2664 only after receiving a reset command. The reset command may be received via the CAN bus (e.g., as depicted at event 2623 of FIG. 26A).

At step 2664, the battery pack may determine whether to begin operation in the mode. After a reset, the battery pack may be placed in a state that requires end user input to begin operation. Accordingly, this determination may be performed based on input received from an end user (e.g., as depicted at event 2624 of FIG. 26A). This input may be received based on the end user pressing a button of the battery pack in a particular pattern.

At step 2665, the battery pack may begin operation in the mode. Accordingly, the battery pack may operate, based on the initialized state machine, in the mode. In comparison to a previous mode, this may change how the battery pack operates (see, e.g., Tables 4 and 5).

Many illustrative embodiments are listed below in accordance with one or more aspects disclosed herein. Although many of the embodiments listed below are described as depending from other embodiments, the dependencies are not so limited. For example, embodiment #5 (below) is expressly described as incorporating the features of embodiment #1 (below), however, the disclosure is not so limited. For example, embodiment #5 may depend any one or more of the preceding embodiments (i.e., embodiment #1, embodiment #2, embodiment #3, and/or embodiment #4). Moreover, that any one or more of embodiments #2-#12 may be incorporated into embodiment #1 is contemplated by this disclosure. Likewise, any of embodiments #1, 14, 17, 22 may be combined with one or more of the features recited in embodiments #2-13, 15-16, 18-21, and/or 23-26. Further likewise, any of embodiments #27, 39, 43 may be combined with one or more of the features recited in embodiments #28-38, 40-42, 44-46. Further likewise, any of embodiments #47, 59, 64 may be combined with one or more of the features recited in embodiments #48-58, 60-63, 65-69. Further likewise, any of embodiments #70, 87, 92 may be combined with one or more of the features recited in embodiments #71-86, 88-91, 93-94. Further likewise, any of embodiments #95, 105, 109 may be combined with one or more of the features recited in embodiments #96-104, 106-108, 110-114. Further likewise, any of embodiments #115, 124, and 133 may be combined with one or more features recited in embodiments #116-123, 125-132, and 134. In addition, that any one or more of the features in embodiments #1, 14, 17, 22, 27, 39, 43, 47, 59, 64, 70, 87, 92, 95, 105, 109, 115, 124, and 133 may be combined is contemplated by this disclosure. Moreover, that any one or more of the features in embodiments #1-134 can be combined is contemplated by this disclosure.

Embodiment #1. A first battery pack configured for installation in a battery system for electrically powering an end device, wherein all installed battery packs installed in the battery system have substantially identical electrical and electronic components, the first battery pack comprising:
  a communication interface circuit configured to interface to a communication channel;
  a power bus interface circuit configured to interface with a power bus and to provide electrical power to the end device;
  a controller comprising at least one processor; and
  a memory storing controller instructions that, when executed by the at least one processor, cause the controller to:
    obtain a configuration list of installed battery packs in the battery system, wherein a first entry corresponds to the first battery pack;
    when the first entry of the configuration list has a top priority position in the configuration list, configure the first battery pack to serve as a master battery pack of the battery system, wherein the top priority position is indicative that the first battery pack was installed before any other active battery packs in the battery system;
    revise the configuration list when a second battery pack is installed or removed from the battery system; and
    repetitively broadcast the configuration list to all said installed battery packs over the communication channel via the communication interface circuit.

Embodiment #2. The first battery pack of Embodiment #1, wherein the controller instructions, when executed by the at least one processor, further cause the controller to:
  when a third battery pack is added to the battery system, detect an insertion of the third battery pack; and
  create a third entry for the third battery pack in the configuration list, wherein the third entry is at a bottom position of the configuration list.

Embodiment #3. The first battery pack of Embodiment #2, wherein the controller instructions, when executed by the at least one processor, further cause the controller to:
  when the second battery pack is removed from the battery system, detect removal of the second battery pack; and
  delete a second entry for the second battery pack in the configuration list.

Embodiment #4. The first battery pack of Embodiment #3, wherein the controller instructions, when executed by the at least one processor, further cause the controller to:
  advance a list position of the third entry for the third battery pack in the configuration list.

Embodiment #5. The first battery pack of Embodiment #1, wherein the controller instructions, when executed by the at least one processor, further cause the controller to:
  when the first entry for the first battery pack is not at the top priority position in the configuration list, configure the first battery pack to serve as a first slave battery pack.

Embodiment #6. The first battery pack of Embodiment #5, wherein the controller instructions, when executed by the at least one processor, further cause the controller to:
  when another battery pack is removed from the battery system and the first entry moves to the top priority position of the configuration list, configure the first battery pack to serve as the master battery pack.

Embodiment #7. The first battery pack of Embodiment #1, wherein the communication channel comprises a controller area network (CAN) bus and wherein the controller instructions, when executed by the at least one processor, further cause the controller to:
  utilize a SAE J1939 Address Claim Procedure to obtain an identification (ID) for the first battery pack, wherein the ID is included in the first entry.

Embodiment #8. The first battery pack of Embodiment #5, wherein the controller instructions, when executed by the at least one processor, further cause the controller to:
  when the first battery pack serves as the first slave battery pack:
    receive a first request from the master battery pack; and
    in response to the receiving the first request, respond to the first request from the master battery pack.

Embodiment #9. The first battery pack of Embodiment #1, wherein the controller instructions, when executed by the at least one processor, further cause the controller to:
  when the first battery pack serves as the master battery pack:
    send a second request to a second slave battery pack; and
    in response to the sending, receive a response message from the second slave battery pack.

Embodiment #10. The first battery pack of Embodiment #1, wherein the controller instructions, when executed by the at least one processor, further cause the controller to:
  when the first battery pack is removed from the battery system and reinserted into the battery system, send a join request over the communication channel; and
  receive the configuration list with a fourth entry at a bottom position in the configuration list, wherein the fourth entry is associated with the first battery pack.

Embodiment #11. The first battery pack of Embodiment #1, the first battery pack comprising non-volatile memory and wherein the controller instructions, when executed by the at least one processor, further cause the controller to:
  store battery pack information in the non-volatile memory; and
  when the first battery pack is removed from the battery system and reinserted tin to the battery system, retain the battery pack information.

Embodiment #12. The first battery pack of Embodiment #2, wherein the controller instructions, when executed by the at least one processor, further cause the controller to:
  when the first battery pack serves as the master battery pack:
    send a repetitive broadcast message to all said installed battery packs over the communication channel via the communication interface circuit; and when a repetitive broadcast message is not received from the third battery pack, remove the third entry from the configuration list.

Embodiment #13. The first battery pack of Embodiment #12, wherein the repetitive broadcast message is sent periodically and wherein the controller instructions, when executed by the at least one processor, further cause the controller to:
when a timer set to a predetermined time expires without receiving the repetitive broadcast message, remove the third entry from the configuration list.

Embodiment #14. A battery system configured for electrically powering an end device and comprising a plurality of battery packs, the battery system comprising:
a first battery pack including:
a first communication interface circuit configured to interface to a controller area network (CAN) bus;
a first controller comprising at least one processor; and
a first memory storing controller instructions that, when executed by the at least one processor, cause the first controller to:
obtain a configuration list of installed battery packs in the battery system, wherein a first entry corresponds to the first battery pack;
when the first entry of the configuration list has a top priority position in the configuration list, configure first battery pack to serve as a master battery pack of the battery system, wherein the top priority position is indicative that the first battery pack was installed before any other active battery packs in the battery system;
when the first battery pack serves as the master battery pack, revise the configuration list when a third battery pack is installed or removed from the battery system; and
repetitively broadcast the configuration list to all installed battery packs over the CAN bus via the first communication interface circuit; and
a second battery pack, wherein the second battery pack has electrical and electronics components identical to the first battery pack.

Embodiment #15. The battery system of Embodiment #14, wherein the second battery pack comprises:
a second communication interface circuit configured to interface to the controller area network (CAN) bus;
a second controller comprising one or more processors; and
a second memory storing controller instructions that, when executed by the one or more processors, cause the second controller to:
obtain the configuration list of the installed battery packs in the battery system, wherein a second entry corresponds to the second battery pack;
when the second entry of the configuration list has the top priority position in the configuration list, configure the second battery pack to serve as the master battery pack of the battery system, wherein the top priority position is indicative that the second battery pack was installed before said any other active battery packs in the battery system;
revise the configuration list when the third battery pack is installed or removed from the battery system; and
repetitively broadcast the configuration list to all said installed battery packs over the CAN bus via the second communication interface circuit.

Embodiment #16. The battery system of Embodiment #15, wherein the first controller instructions, when executed by the one or more processors, further cause the first controller to:
when the second battery pack previously served as the master battery pack when the first entry is in a second position from the top priority position in the configuration list, configure the first battery pack to serve as the master battery pack.

Embodiment #17. A method of powering an end device by a battery system, the method comprising:
obtaining a configuration list of installed battery packs in the battery system, wherein a first entry corresponds to a first battery pack;
when the first entry of the configuration list has a top priority position in the configuration list, configuring the first battery pack to serve as a master battery pack of the battery system, wherein the top priority position is indicative that the first battery pack was installed before any other active battery packs in the battery system;
revising the configuration list when a second battery pack is installed or removed from the battery system; and
repetitively broadcasting the configuration list to all installed battery packs over a communication channel via a communication interface circuit.

Embodiment #18. The method of Embodiment #17 further comprising:
when a third battery pack is added to the battery system, detecting an insertion of the third battery pack;
creating a third entry for the third battery pack in the configuration list, wherein the third entry is at a bottom position of the configuration list; and
in response to the creating, broadcasting the configuration list to said all installed battery packs configured in the battery system via the communication channel.

Embodiment #19. The method of Embodiment #18 further comprising:
when the second battery pack is removed from the battery system, detecting removal of the second battery pack; and
deleting a second entry for the second battery pack in the configuration list.

Embodiment #20. The method of Embodiment #17 further comprising:
when the first entry for the first battery pack is not at the top priority position in the configuration list, configure the first battery pack to serve as a slave battery pack.

Embodiment #21. The method of Embodiment #20 further comprising:
when another battery pack is removed from the battery system and the first entry moves to the top priority position of the configuration list, configuring the first battery pack to serve as the master battery pack.

Embodiment #22. A battery system configured for electrically powering an end device and comprising a plurality of battery packs, the battery system comprising:
a power bus coupled to the end device to provide electrical power to the end device;
a communication channel coupled to the plurality of battery packs;
a first battery pack including:
a first communication interface circuit configured to interface to the communication channel;
a first discharging array;
a first processor; and a first memory storing computer-executable instructions that, when executed by the first processor, cause the first battery pack to:
  disable the first discharging array to prevent discharging onto the power bus from the first battery pack;
  obtain a first open circuit voltage measurement of the first battery pack; and
  share the first open circuit voltage measurement with the plurality of battery packs via the communication channel;
  maintain a first copy of a configuration list based on the first open circuit voltage measurement and shared open circuit voltage measurements from the plurality of battery packs; and
  enable the first discharging array to allow discharging onto the power bus; and a second battery pack including:
a second communication interface circuit configured to interface to the communication channel;
a second discharging array electrically connected to the power bus of the battery system;
a second processor; and
a second memory storing computer-executable instructions that, when executed by the second processor, cause the second battery pack to:
  disable the second discharging array to prevent discharging onto the power bus from the second battery pack;
  obtain a second open circuit voltage measurement of the second battery pack; and
  share the second open circuit voltage measurement with the plurality of battery packs via the communication channel;
  maintain a second copy of the configuration list based the second open circuit voltage measurement and the shared open circuit voltage measurements from the plurality of battery packs, wherein the configuration list is ordered based on decreasing open circuit voltage measurements and wherein the a top member of the configuration list is designated as a master battery pack of the battery system; and
  enable the second discharging array to allow discharging onto the power bus.

Embodiment #23. The battery system of Embodiment #22 comprising:
a third battery pack, wherein the third battery pack is installed in the battery system when the first and second battery packs are discharging onto the power bus, the third battery pack including:
  a third communication interface circuit configured to interface to the communication channel;
  a third discharging array;
  a third processor; and
  a third memory storing computer-executable instructions that, when executed by the third processor, cause the third battery pack to:
    disable the third discharging array to prevent discharging onto the power bus from the third battery pack;
    obtain a third open circuit voltage measurement of the third battery pack; and
    share the third open circuit voltage measurement with the plurality of battery packs via the communication channel.

Embodiment #24. The battery system of Embodiment #23, wherein the third memory storing computer-executable instructions that, when executed by the third processor, cause the third battery pack to:
  update a third copy of the configuration list based the third open circuit voltage measurement and the shared open circuit voltage measurements from the plurality of battery packs.

Embodiment #25. The battery system of Embodiment #24, wherein the updating occurs after the first and second battery packs are disconnected from the battery system.

Embodiment #26. The battery system of Embodiment #24, wherein the updating occurs while the first and second battery packs are discharging onto the power bus.

Embodiment #27. A method of powering an end device by a battery system, the battery system comprising a plurality of previously installed battery packs, wherein the plurality of previously installed battery packs include a master battery pack, the method comprising:
  inserting an additional battery pack into the battery system establishing a first connection to a power bus and a second connection to a communication bus;
  interacting, by the additional battery pack, with the master battery pack; and
  in response to the interacting, preventing an in-rush current from the additional battery pack to one of the plurality of previously installed battery packs.

Embodiment #28. The method of Embodiment #27, wherein the preventing comprises:
  receiving, by the additional battery pack from the master battery pack, a first disable message via the communication bus, wherein the first disable message instructs the additional battery pack to disable charging and discharging through the power bus.

Embodiment #29. The method of Embodiment #27, further comprising:
  in response to the inserting, providing an insertion indication by the additional battery pack via the communication bus, wherein the insertion indication includes an identification (ID) of the additional battery pack.

Embodiment #30. The method of Embodiment #29, further comprising:
  in response to the providing, receiving a configuration message, wherein the configuration message includes a configuration list indicative of a battery system configuration, wherein an entry in the configuration list for the additional battery pack is located at a bottom position of the configuration list, and wherein the additional battery pack serves as a slave battery pack in the battery system.

Embodiment #31. The method of Embodiment #30, further comprising:
  obtaining, by the additional battery pack, first battery status information about battery cells located at the additional battery pack, wherein the first battery status information includes a first state of charge (SoC) value for the battery cells;
  receiving, by the additional battery pack from the master battery pack over the communication bus, a first status request for the first battery status information; and
  in response to the receiving the first status request, sending the first SoC value to the master battery pack over the communication bus.

Embodiment #32. The method of Embodiment #31, further comprising:
  receiving, from the additional battery pack, the first SoC value;
  determining, by the master battery pack, whether to initiate charge balancing that includes the additional battery pack based on the first SoC value; and in response to the determining, sending, by the master battery pack to the additional battery pack an enable message to configure the additional battery pack with the power bus.

Embodiment #33. The method of Embodiment #32, further comprising:

receiving, by the additional battery pack from the master battery pack, the enable message via the communication bus; and configuring the additional battery pack to interact with the power bus in accordance with the enable message.

Embodiment #34. The method of Embodiment #32, wherein the determining whether to initiate charge balancing comprises:

when the first SoC value is a high SoC value relative to the plurality of previously installed battery packs, sending, by the master battery pack, the enable message instructing the additional battery pack to enable discharging of the battery cells onto the power bus; and when the first SoC value is a low SoC value relative to the plurality of previously installed battery packs, sending, by the master battery pack, the enable message instructing the additional battery pack to enable charging of the battery cells from the power bus.

Embodiment #35. The method of Embodiment #34, wherein the determining whether to initiate charge balancing further comprises:

when the first SoC value equals the low SoC value and a difference between the high SoC value and the low SoC value is greater than a predetermined amount, sending the enable message instructing the additional battery pack to enable the charging of the battery cells from the power bus through a converter located at the additional battery pack.

Embodiment #36. The method of Embodiment #34, further comprising:

after receiving the enable message by the additional battery pack from the master battery pack, obtaining a second SoC value of the battery cells;

receiving, by the additional battery pack from the master battery pack over the communication bus, a second status request for second battery status information; and in response to the receiving the second status request, sending the second SoC value to the master battery pack over the communication bus.

Embodiment #37. The method of Embodiment #36, further comprising:

receiving, from the additional battery pack, the second SoC value;

when the first SoC value equals the high SoC value and the second SoC value is below a first threshold, sending, by the master battery pack, a second disable message instructing the additional battery pack to terminate discharging of the battery cells onto the power bus; and when the first SoC value equals the low SoC value and the second SoC value is greater than a second threshold, sending, by the master battery pack, the second disable message instructing the additional battery pack to terminate charging of the battery cells from the power bus.

Embodiment #38. The method of Embodiment #27, wherein the communication bus comprises a controller area network (CAN) bus.

Embodiment #39. A first battery pack configured for installation in a battery system for electrically powering an end device, wherein all installed battery packs installed in the battery system have identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

when the first battery pack is inserted into the battery system, generate an insertion indication via the communication channel, wherein the insertion indication includes an identification (ID) of the first battery pack.

in response to the generating the insertion indication, receive from a master battery pack of the battery system, a disable message over the communication channel via the communication interface circuit; and in response to the receiving the disable message, disable charging and discharging through the power bus.

Embodiment #40. The first battery pack of Embodiment #39, wherein the controller instructions, when executed by the at least one processor, further cause the controller to:

in response to the generating the insertion indication, receive a configuration message, wherein the configuration message includes a configuration list indicative of a battery system configuration, wherein an entry in the configuration list for the first battery pack is located at a bottom position of the configuration list, and wherein the first battery pack serves as a slave battery pack in the battery system.

Embodiment #41. The first battery pack of Embodiment #40, wherein the controller instructions, when executed by the at least one processor, further cause the controller to:

obtain battery status information about battery cells located at the first battery pack, wherein the battery status information includes a state of charge (SoC) value for the battery cells;

receive, from the master battery pack over the communication channel, a status request for the battery status information; and in response to the receiving the status request, send the SoC value to the master battery pack over the communication channel.

Embodiment #42. The first battery pack of Embodiment #41, wherein the controller instructions, when executed by the at least one processor, further cause the controller to:

in response to the sending the SoC value, receive, from the master battery pack, an enable message via the communication channel; and configure the power bus interface circuit to interact with the power bus in accordance with the enable message.

Embodiment #43. A battery system configured for electrically powering an end device and comprising a plurality of battery packs, the battery system comprising:

a first battery pack including:

a power bus interface circuit configured to interface with a power bus and to provide electrical power to the end device;

a first communication interface circuit configured to interface to a controller area network (CAN) bus;

a first controller comprising at least one processor; and a first memory storing controller instructions that, when executed by the at least one processor, cause the first controller to:

when the first battery pack is inserted into the battery system, provide an insertion indication via the CAN bus, wherein the insertion indication includes an identification (ID) of the first battery pack;

in response to the providing, receive from a master battery pack of the battery system a first disable message over the CAN bus via the first communication interface circuit; and in response to the receiving, disable charging and discharging through the power bus; and a second battery pack serving as the master battery pack of the battery system.

Embodiment #44. The battery system of Embodiment #43, wherein the first memory storing controller instructions that, when executed by the at least one processor, cause the first controller to:

obtain battery status information about battery cells located at the first battery pack, wherein the battery status information includes a state of charge (SoC) value for the battery cells;

receive, from the master battery pack over the CAN bus, a status request for the battery status information; and in response to the receiving the status request, send the SoC value to the master battery pack over the CAN bus.

Embodiment #45. The battery system of Embodiment #44, wherein the second battery pack includes:

a second communication interface circuit configured to interface to the CAN bus;

a second controller comprising one or more processors; and a second memory storing controller instructions that, when executed by the one or more processors, cause the second controller to:

receive, from the first battery pack, the SoC value;

determine, by the master battery pack, whether to initiate charge balancing that includes the first battery pack based on the SoC value; and in response to the determining whether to initiate charge balancing, send, by the master battery to the first battery pack an enable message to configure the first battery pack with the power bus.

Embodiment #46. The battery system of Embodiment #45, wherein the second memory storing controller instructions that, when executed by the one or more processors, further cause the second controller to:

when the SoC value is a high SoC value relative to a plurality of previously installed battery packs, send, by the master battery pack, the enable message instructing the first battery pack to enable discharging of the battery cells onto the power bus; and when the SoC value is a low SoC value relative to the plurality of previously installed battery packs, send, by the master battery pack, the enable message instructing the first battery pack to enable charging of the battery cells from the power bus.

Embodiment #47. A first battery pack configured for installation in a battery system for electrically powering an end device, wherein all installed battery packs installed in the battery system have identical electrical and electronic components, the first battery pack comprising:

one or more battery cells;

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

determining that the first battery pack is a master battery pack of the battery system;

when the first battery pack receives a first failure notification message from a second battery pack over the communication channel via the communication interface circuit and when an extra battery pack is needed, determine whether a first spare battery pack is available, wherein the first failure notification message is indicative of a first catastrophic failure at the second battery pack;

when the first spare battery pack is an only spare battery pack and when the extra battery pack is needed, send a first enable message to the first spare battery pack over the communication channel, wherein the first enable message instructs the first spare battery pack to discharge onto the power bus; and when the first battery pack receives the first failure notification message from the second battery pack, send a first disable message to the second battery pack over the communication channel, wherein the first disable message instructs the second battery pack to terminate discharging onto the power bus.

Embodiment #48. The first battery pack of Embodiment #47, wherein the controller instructions, when executed by the at least one processor, further cause the controller to:

when the first battery pack is the master battery pack of the battery system:

when no spare battery packs are available, send a degradation alert message to the end device.

Embodiment #49. The first battery pack of Embodiment #48, wherein the controller instructions, when executed by the at least one processor, further cause the controller to:

when the first battery pack is the master battery pack of the battery system:

when degraded operation is not acceptable to the end device, initiate shutdown of the battery system.

Embodiment #50. The first battery pack of Embodiment #49, wherein the controller instructions, when executed by the at least one processor, further cause the controller to:

when the first battery pack is the master battery pack of the battery system:

instructing all battery packs of the battery system from discharging onto the power bus.

Embodiment #51. The first battery pack of Embodiment #47, wherein the controller instructions, when executed by the at least one processor, further cause the controller to:

when the first battery pack is the master battery pack of the battery system:

when a plurality of spare battery packs are available, select a highest SoC spare battery pack from the plurality of spare battery packs, wherein the highest SoC spare battery pack is characterized by a highest state of charge (SoC) value of all of the plurality of spare battery packs; and send a second enable message to the highest SoC spare battery pack, wherein the second enable message instructs the highest SoC spare battery pack to discharge onto the power bus.

Embodiment #52. The first battery pack of Embodiment #47, wherein the communication channel comprises a controller area network (CAN) bus.

Embodiment #53. The first battery pack of Embodiment #47, wherein the controller instructions, when executed by the at least one processor, further cause the controller to:

when the first battery pack is the master battery pack of the battery system:

monitor the one or more battery cells;

based on the monitoring, determine whether a second catastrophic failure has occurred;

when the second catastrophic failure has occurred, determine whether the first spare battery pack is available;

when the first battery pack is available, send the first enable message to the first spare battery pack, wherein the first enable message instructs the first spare battery pack to discharge onto the power bus; and disable itself from discharging onto the power bus.

Embodiment #54. The first battery pack of Embodiment #47, wherein the controller instructions, when executed by the at least one processor, further cause the controller to:

when the first battery pack is a slave battery pack of the battery system:

monitor the one or more battery cells;

based on the monitoring, determine whether a third catastrophic failure has occurred; and when the third catastrophic failure has occurred, send a second failure notification message to the master battery pack of the battery system.

Embodiment #55. The first battery pack of Embodiment #54, wherein the controller instructions, when executed by the at least one processor, further cause the controller to:

in response to the sending, receive a second disable message from the master battery pack; and in response to the receiving, terminate discharging onto the power bus.

Embodiment #56. The first battery pack of Embodiment #47, wherein the controller instructions, when executed by the at least one processor, further cause the controller to:

when the first battery pack detects an internal catastrophic failure, internally terminate discharging onto the power bus;

when at least one spare battery pack is available, enable one of the at least one spare battery packs;

when no spare battery packs is available, send a degradation alert message to the end device; and continue to operate as the master battery pack of the battery system.

Embodiment #57. The first battery pack of Embodiment #47, wherein the controller instructions, when executed by the at least one processor, further cause the controller to:

when the first battery pack detects an internal catastrophic failure, internally terminate discharging onto the power bus; and reassign one of the slave battery packs as a new master battery pack.

Embodiment #58. The first battery pack of Embodiment #47, wherein the controller instructions, when executed by the at least one processor, further cause the controller to:

when the first battery pack fails to receive any messages from the second battery pack over the communications channel, attempt to disable the second battery pack from discharging onto the power bus; and adjust a power level over the power bus to the end device.

Embodiment #59. A method of powering an end device by a battery system, the method comprising:

when a master battery pack receives a failure notification message from a slave battery pack over a communication channel and when an extra battery pack is needed, determining whether a first spare battery pack is available, wherein the failure notification message is indicative of a catastrophic failure at the slave battery pack;

when the first spare battery pack is an only spare battery pack and when the extra battery pack is needed, sending, by the master battery pack, an enable message to the first spare battery pack, wherein the enable message instructs the first spare battery pack to discharge onto a power bus; and when the master battery pack receives the failure notification message from the slave battery pack, sending, by the master battery pack, a disable message to the slave battery pack, wherein the disable message instructs the slave battery pack to terminate discharging onto the power bus.

Embodiment #60. The method of Embodiment #59, comprising:

when degraded operation is not acceptable to the end device, initiating shutdown of the battery system.

Embodiment #61. The method of Embodiment #59, comprising:

when a plurality of spare battery packs are available, selecting a highest SoC spare battery pack from the plurality of spare battery packs, wherein the highest SoC spare battery pack is characterized by a highest state of charge (SoC) value of all of the plurality of spare battery packs; and sending the enable message to the highest SoC spare battery pack, wherein the enable message instructs the highest SoC spare battery pack to discharge onto the power bus.

Embodiment #62. The method of Embodiment #59, comprising:

monitoring, by the slave battery pack, one or more battery cells;

based on the monitoring, determining whether the catastrophic failure has occurred; and when the catastrophic failure has occurred, sending the failure notification message to the master battery pack of the battery system.

Embodiment #63. The method of Embodiment #62, comprising:

in response to the sending, receiving, by the slave battery pack, the disable message from the master battery pack; and in response to the receiving the disable message, terminating discharging onto the power bus.

Embodiment #64. A battery system configured for electrically powering an end device and comprising a plurality of battery packs, the battery system comprising:

a slave battery pack; and a master battery pack including:

a first communication interface circuit configured to interface to a controller area network (CAN) bus;

a first controller comprising at least one processor; and a first memory storing controller instructions that, when executed by the at least one processor, cause the first controller to:

when the master battery pack receives a failure notification message from the slave battery pack over the CAN bus via the first communication interface circuit and when an extra battery pack is needed, determine whether a first spare battery pack is available, wherein the failure notification message is indicative of a catastrophic failure at the slave battery pack;

when the first spare battery pack is an only spare battery pack and when the extra battery pack is needed, send an enable message to the first spare battery pack, wherein the enable message instructs the first spare battery pack to discharge onto a power bus; and when the master battery pack receives the failure notification message from the slave battery pack, send a disable message to the slave battery pack, wherein the disable message instructs the slave battery pack to terminate discharging onto the power bus.

Embodiment #65. The battery system of Embodiment #64, wherein the first memory storing controller instructions that, when executed by the at least one processor, cause the first controller to:
when degraded operation is not acceptable to the end device, initiate shutdown of the battery system.

Embodiment #66. The battery system of Embodiment #65, wherein the first memory storing controller instructions that, when executed by the at least one processor, cause the first controller to:
instruct all battery packs of the battery system from discharging onto the power bus.

Embodiment #67. The battery system of Embodiment #64, wherein the first memory storing controller instructions that, when executed by the at least one processor, cause the first controller to:
when a plurality of spare battery packs is available, select a highest SoC spare battery pack from the plurality of spare battery packs, wherein the highest SoC spare battery pack is characterized by a highest state of charge (SoC) value of all of the plurality of spare battery packs; and
send the enable message to the highest SoC spare battery pack, wherein the enable message instructs the highest SoC spare battery pack to discharge onto the power bus.

Embodiment #68. The battery system of Embodiment #64, wherein the slave battery pack includes:
a second communication interface circuit configured to interface to a controller area network (CAN) bus;
a second controller comprising one or more processors;
one or more battery cells; and
a second memory storing controller instructions that, when executed by the one or more processors, cause the first controller to:
monitor the one or more battery cells;
based on the monitoring, determine whether the catastrophic failure has occurred; and
when the catastrophic failure has occurred, send the failure notification message to the master battery pack of the battery system.

Embodiment #69. The battery system of Embodiment #68, wherein the second memory storing controller instructions that, when executed by the one or more processors, cause the second controller to
in response to the sending the failure notification message, receive the disable message from the master battery pack; and
in response to the receiving the disable message, terminate discharging onto the power bus.

Embodiment #70. A method of powering an end device by a battery system, the battery system comprising a plurality of battery packs, the method comprising:
gathering, by a master battery pack of the battery system, battery status information from the plurality of battery packs, wherein the plurality of battery pack comprises the master battery packs and all slave battery packs and wherein the battery status information includes a state of charge (SoC) data;
determining, by the master battery pack and based on the battery status information, whether a first subset of the plurality of battery packs needs to be balanced in charge;
selecting, by the master battery pack, a first type of balancing from a plurality of balancing types appropriate for the first subset of the plurality of battery packs; and
applying, by the master battery pack, the selected first type of balancing via a power bus until desired SoC values are obtained for the first subset of the plurality of battery packs.

Embodiment #71. The method of Embodiment #70, wherein the plurality of balancing types comprise a converter balancing technique, a direct balancing technique, and a staggered balancing technique.

Embodiment #72. The method of Embodiment #71, comprising:
identifying, by the master battery pack, a first battery pack having a high SoC value from the gathered battery status information; and
comparing, by the master battery pack, the high SoC value with SoC values of all remaining battery packs.

Embodiment #73. The method of Embodiment #72, comprising:
in response to the comparing, when a first SoC difference between the first battery pack and a second battery pack is greater than a first predetermined amount, initiating, by the master battery pack, the converter balancing technique for the first and second battery packs.

Embodiment #74. The method of Embodiment #73, comprising:
sending, by the master battery pack, to the first battery pack a first enable message over a communication channel, wherein the first enable message instructs the first battery pack to discharge over the power bus; and
sending, by the master battery pack, to the second battery pack a second enable message over the communication channel, wherein the second enable message instructs the second battery pack to enable its converter and to charge from the power bus.

Embodiment #75. The method of Embodiment #73, comprising:
in response to the comparing, when a second SoC difference between the first battery pack and a third battery pack is greater than the first predetermined amount, initiating, by the master battery pack, the converter balancing technique for the first, second, and third battery packs.

Embodiment #76. The method of Embodiment #75, wherein one of the first, second, and third battery packs serves as the master battery pack of the battery system.

Embodiment #77. The method of Embodiment #72, comprising:
in response to the comparing, when a third SoC difference between the first battery pack and a fourth battery pack is less than a second predetermined amount, initiating, by the master battery pack, the direct balancing technique for the first battery pack and the fourth battery pack.

Embodiment #78. The method of Embodiment #77, comprising:
sending, by the master battery pack, to the first battery pack a third enable message over a communication channel, wherein the third enable message instructs the first battery pack to discharge over the power bus; and
sending, by the master battery pack, to the fourth battery pack a fourth enable message over the communication channel, wherein the fourth enable message instructs the fourth battery pack to charge from the power bus.

Embodiment #79. The method of Embodiment #77, wherein one of the first and fourth battery packs serves as the master battery pack.

Embodiment #80. The method of Embodiment #72, comprising:

in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiating the staggered balancing technique to the first battery pack, the fifth battery pack, and the sixth battery pack.

Embodiment #81. The method of Embodiment #80, comprising:

sending, by the master battery pack, to the first battery pack a fifth enable message over a communication channel, wherein the fifth enable message instructs the first battery pack to discharge over the power bus;

sending, by the master battery pack, to the fifth battery pack a sixth enable message over the communication channel, wherein the sixth enable message instructs the fifth battery pack to charge from the power bus, wherein the direct balancing technique is applied for the first battery pack and the fifth battery pack; and sending, by the master battery pack, to the sixth battery pack a seventh enable message over the communication channel, wherein the seventh enable message instructs the sixth battery pack to enable its converter and to charge from the power bus, wherein the converter balancing technique is applied for the first battery pack and the sixth battery pack.

Embodiment #82. The method of Embodiment #81, comprising:

obtaining current SoC values for the fifth and sixth battery packs; and in response to the obtaining, when an eighth difference between a first current SoC value of the fifth battery pack and a second current SoC value of the sixth battery pack is greater than a fifth predetermined value, switching the direct balancing technique to the first battery pack and the seventh battery pack from the first battery pack and the sixth battery pack.

Embodiment #83. The method of Embodiment #82, comprising:

sending, by the master battery pack, to the fifth battery pack an eighth enable message over the communication channel, wherein the eighth enable message instructs the fifth battery pack to enable its converter and charge from the power bus, wherein the converter balancing technique is applied for the first battery pack and the fifth battery pack; and sending, by the master battery pack, to the sixth battery pack a ninth enable message over the communication channel, wherein the ninth enable message instructs the sixth battery pack to disable its converter and to charge from the power bus, wherein the direct balancing technique is applied for the first battery pack and the sixth battery pack.

Embodiment #84. The method of Embodiment #75, wherein one of the first, fifth, and sixth battery packs serves as the master battery pack of the battery system.

Embodiment #85. The method Embodiment #70, further comprising:

obtaining, by the master battery pack, current SoC values from the plurality of battery packs;

determining, by the master battery pack and based the current SoC values, whether a second subset of the plurality of battery packs needs to be balanced in charge;

selecting, by the master battery pack, a second type of balancing from the plurality of balancing types appropriate for the second subset of the plurality of battery packs, wherein the first type and second type of balancing are different; and applying, by the master battery pack, the selected second type of balancing for the second subset of the plurality of battery packs.

Embodiment #86. The method Embodiment #70, wherein the applying comprises:

obtaining a safety interlock indicator and a wake indicator; and only when the safety interlock indicator is indicative of being on and the wake indicator is indicative of being off, enabling the applying.

Embodiment #87. A first battery pack configured for installation in a battery system for electrically powering an end device, wherein all installed battery packs installed in the battery system have identical electrical and electronic components, the first battery pack comprising:

a communication interface circuit configured to interface to a communication channel;

a power bus interface circuit configured to interface with a power bus and to provide electrical power to the end device;

a controller comprising at least one processor; and a memory storing controller instructions that, when executed by the at least one processor, cause the controller to:

when the first battery pack serves as a master battery pack of the battery system:

gather battery status information from a plurality of battery packs, wherein the plurality of battery pack comprises the master battery packs and all slave battery packs and wherein the battery status information includes a state of charge (SoC) data;

determine, based the battery status information, whether a first subset of the plurality of battery packs needs to be balanced in charge;

select a first type of balancing from a plurality of balancing types appropriate for the first subset of the plurality of battery packs; and apply the selected first type of balancing until desired SoC values are obtained for the first subset of the plurality of battery packs.

Embodiment #88. The first battery pack of Embodiment #87, wherein the memory storing controller instructions that, when executed by the at least one processor, cause the controller to:

identify a first battery pack having a high SoC value from the gathered battery status information; and compare the high SoC value with SoC values of all remaining battery packs.

Embodiment #89. The first battery pack of Embodiment #88, wherein the memory storing controller instructions that, when executed by the at least one processor, cause the controller to:

in response to the comparing, when a first SoC difference between the first battery pack and a second battery pack is greater than a first predetermined amount, initiate, by the master battery pack, a converter balancing technique for the first and second battery packs.

Embodiment #90. The first battery pack of Embodiment #88, wherein the memory storing controller instructions that, when executed by the at least one processor, cause the controller to:

in response to the comparing, when a third SoC difference between the first battery pack and a fourth battery pack is less than a second predetermined amount, initiate, by the master battery pack, a direct balancing technique for the first battery pack and the fourth battery pack.

Embodiment #91. The first battery pack of Embodiment #88, wherein the memory storing controller instructions that, when executed by the at least one processor, cause the controller to:
  in response to the comparing, when a fourth SoC difference between the first battery pack and a fifth battery pack is less than a third predetermined amount, a fifth SoC difference between the first battery pack and a sixth battery pack is greater than a fourth predetermined amount, and a sixth SoC difference between the first battery pack and a seventh battery pack is greater than the fourth predetermined amount, initiate a staggered balancing technique to the first battery pack, the fifth battery pack, and the sixth battery pack.

Embodiment #92. A battery system configured for electrically powering an end device and comprising a plurality of battery packs, the battery system comprising:
  a plurality of slave battery packs; and
  a master battery pack including:
    a first communication interface circuit configured to interface to a controller area network (CAN) bus;
    a controller comprising at least one processor; and
    a memory storing controller instructions that, when executed by the at least one processor, cause the controller to:
    gather battery status information from all battery packs of the battery system, wherein said all battery packs comprises the master battery packs and the plurality of slave battery packs and wherein the battery status information includes a state of charge (SoC) data;
    determine, based the battery status information, whether a first subset of said all battery packs needs to be balanced in charge;
    select a first type of balancing from a plurality of balancing types appropriate for the first subset of said all battery packs; and
    apply the selected first type of balancing until desired SoC values are obtained for the first subset of said all battery packs.

Embodiment #93. The battery system of Embodiment #92, wherein the memory storing controller instructions that, when executed by the at least one processor, cause the controller to:
  identify a first battery pack having a high SoC value from the gathered battery status information, wherein the plurality of; and
  compare the high SoC value with SoC values of all remaining battery packs.

Embodiment #94. The battery system of Embodiment #93, wherein the memory storing controller instructions that, when executed by the at least one processor, cause the controller to:
  in response to the comparing:
    when a first SoC difference between the first battery pack and a second battery pack is greater than a first predetermined amount, initiate a converter balancing technique for the first and second battery packs;
    when the first SoC difference between the first battery pack and the second battery pack is less than a second predetermined amount, initiate a direct balancing technique for the first battery pack and the second battery pack; and
    when the first SoC difference between the first battery pack and the second battery pack is less than the second predetermined amount, a second SoC difference between the first battery pack and a third battery pack is greater than the first predetermined amount, and a third SoC difference between the first battery pack and a fourth battery pack is greater than the first predetermined amount, initiate a staggered balancing technique to the first, second, third, and fourth battery packs.

Embodiment #95. A method comprising:
  receiving, by a computing device having one or more processors, a first reading of a state of charge (SOC) of each of a plurality of battery packs, wherein the plurality of battery packs comprises at least a first group of one or more battery packs and a second group of one or more battery packs;
  identifying, by the computing device, based on the received first reading of the SOC of each of the plurality of battery packs, and based on an identification of a lowest level for a first reading of an SOC and a second lowest level for a first reading of an SOC,
    the first group as having the lowest level for the first reading of the SOC, and
    the second group as having the second lowest level for the first reading of the SOC;
  generating, by the computing device and based on the identification of the lowest level and the second lowest level, a first list comprising of the first group and the second group;
  determining, by the computing device, based on the first reading of the SOC of the first group, and based on the first reading of the SOC of the second group, a first SOC variability of the first list;
  determining, by the computing device and based on the first SOC variability, that the first SOC variability does not satisfy a SOC variability threshold;
  establishing, by the computing device, a first SOC threshold using the first reading of the SOC of the second group;
  causing, by the computing device and via electric charge arrays, the charging of the first group to cause the SOC of the first group to increase;
  receiving, by the computing device, a second reading of the SOC of each of the plurality of battery packs;
  determining, by the computing device and based on a second reading of the SOC of the first group, that the second reading of the SOC of the first group satisfies the first SOC threshold.

Embodiment #96. The method of Embodiment #95, further comprising:
  determining, by the computing device and based on the received second reading of the SOC of each of the plurality of battery packs, an updated first SOC variability of the first list;
  determining, by the computing device, that the updated first SOC variability satisfies the SOC variability threshold.

Embodiment #97. The method of Embodiment #95, wherein the receiving the first reading of the SOC of each of the plurality of battery packs further comprises:
  identifying, by the computing device, a master battery pack as one of the plurality of battery packs; and
  receiving, by the computing device and from the master battery pack, the first reading of the SOC of each of the plurality of battery packs.

Embodiment #98. The method of Embodiment #95, wherein the causing the charging further comprises enabling an electric discharge array from a charger to the one or more battery packs of the first group of one or more battery packs via a converter.

Embodiment #99. The method of Embodiment #95, wherein the plurality of battery packs further comprises at least a third group of one or more battery packs, and wherein the method further comprises:

identifying, by the computing device, based on the received second reading of the SOC of each of the plurality of battery packs, and based on an identification of a lowest level for a second reading of an SOC and a second lowest level for a second reading of an SOC,
  the first group and the second group as having the lowest level for the second reading of the SOC, and
  the third group as having the second lowest level for the second reading of the SOC;
generating, by the computing device and based on the lowest level for the second reading of the SOC and the second lowest level for the second reading of the SOC, a second list comprising the first group, the second group, and the third group;
determining, by the computing device, based on the second reading of the SOC of the first group, based on the second reading of the SOC of the second group, and based on the second reading of the SOC of the third group, a second SOC variability of the second list.

Embodiment #100. The method of Embodiment #99, wherein the generating the second list comprises expanding the first list to include battery packs having the second lowest level for the second reading of the SOC.

Embodiment #101. The method of Embodiment #99, further comprising:

determining, by the computing device, that the second SOC variability does not satisfy the SOC variability threshold;
establishing, by the computing device, a second SOC threshold based on a second reading of the SOC of the third group;
causing, by the computing device and via electric charge arrays,
  the charging of the first group to cause the SOC of the first group to increase, and
  the charging of the second group to cause the SOC of the second group to increase;
receiving, by the computing device, a third reading of the SOC of each of the plurality of battery packs;
determining, by the computing device, that a third reading of the SOC of the first group and a third reading of the SOC of the second group each satisfy the second SOC threshold.

Embodiment #102. The method of Embodiment #101, further comprising:

performing one or more iterations of the following until a determined updated SOC variability of the plurality of battery packs satisfies the SOC variability threshold:
  identifying, by the computing device,
    an Nth group of one or more battery packs of the plurality of battery back devices, wherein the nth group has a lowest level of a previous reading of the SOC of the plurality of battery packs, and
    an (N+1) group of one or more battery packs of the plurality of battery back devices, wherein the (N+1) group has the second lowest level of the previous reading of the SOC of the plurality of battery packs, and
  generating, by the computing device, a list comprising the n group and the N+1 group;
  determining, by the computing device, that an SOC variability of the list does not satisfy the SOC variability threshold;
  establishing, by the computing device, an SOC threshold using the previous reading of the SOC of the N+1 group;
  causing, by the computing device and via electric charge arrays, the charging of the n group to cause the SOC of the n group to increase and satisfy the SOC threshold;
receiving, by the computing device, a subsequent reading of an SOC of each of the plurality of battery packs; and
determining, by the computing device and based on the subsequent reading of the SOC of each of the plurality of battery packs, the updated SOC variability of the plurality of battery packs.

Embodiment #103. The method of Embodiment #95, further comprising:

prior to the receiving the first reading of the SOC of each of the plurality of battery packs, determining that an interlock safety pin associated with the plurality of battery packs is set to on, wherein the interlock safety pin allows the receiving the first reading of the SOC of each of the plurality of battery pack to occur.

Embodiment #104. The method of Embodiment #95, further comprising:

prior to the causing the charging, determining that a wake pin associated with the plurality of battery packs is set to on, wherein the wake pin allows the charging to occur.

Embodiment #105. A method comprising:

receiving, by a computing device having one or more processors and communicatively linked to an end device, a power requirement of the end device;
receiving, by the computing device, a first reading of a state of charge (SOC) of each of a plurality of battery packs,
  wherein the plurality of battery packs comprises at least a first group of one or more battery packs and a second group of one or more battery packs, and
  wherein a first reading of an SOC of the second group is greater than a first reading of an SOC of the first group;
determining, by the computing device and based on the received first reading of the SOC of each of the plurality of battery packs, a first SOC variability of the plurality of battery packs;
determining, by the computing device and based on the first SOC variability not satisfying an SOC variability threshold, to enable the second group to initially power the end device without a concurrent powering of the end device by other battery packs of the plurality of battery packs; and
causing, by the computing device and via an electric charge array, the second group to power the end device to a first power level, wherein the powering the end device causes the SOC of the second group to decrease.

Embodiment #106. The method of Embodiment #105, further comprising:

receiving, by the computing device, a second reading of an SOC of each of the plurality of battery packs; and
determining, by the computing device and based on the received second reading of the SOC of each of the plurality of battery packs, a second SOC variability of the plurality of battery packs;
determining, by the computing device, that the second SOC variability satisfies the SOC variability threshold; and
causing, by the computing device and via one or more electric charge arrays, the first group and the second group to power the end device to a second power level, wherein the powering the end device causes the second reading of the SOC of the first group and the second reading of the SOC of the second group to decrease.

Embodiment #107. The method of Embodiment #105, further comprising:

receiving, by the computing device, a second reading of the SOC of each of the plurality of battery packs,
  wherein the plurality of battery packs further comprises a third group of one or more battery packs,
  wherein the second reading of the SOC of the second group and the second reading of the SOC of the third group are within a predetermined reading of each other, and
  wherein the second reading of the SOC of the second group and the second reading of the SOC of the third group are each greater than the second reading of the SOC of the first group,
determining, by the computing device and based on the received second reading of the SOC of each of the plurality of battery packs, a second SOC variability of the plurality of battery packs;
determining, by the computing device, that the second SOC variability does not satisfy the SOC variability threshold; and
causing, by the computing device and via one or more electric charge arrays, the second group and the third group to concurrently power the end device to a second power level, wherein the powering the end device causes the SOC of the second group and the SOC of the third group to decrease.

Embodiment #108. The method of Embodiment #105, wherein the receiving the first reading of the SOC of each of the plurality of battery packs further comprises:
  identifying, by the computing device, a master battery pack as one of the plurality of battery packs; and
  receiving, by the computing device and from the master battery pack, the first reading of the SOC of each of the plurality of battery packs.

Embodiment #109. A method comprising:
  receiving, by a computing device having one or more processors and communicatively linked to an end device, a power requirement of the end device;
  receiving, by the computing device, a first reading of a state of charge (SOC) of each of a plurality of battery packs,
    wherein the plurality of battery packs comprises at least a first group of one or more battery packs and a second group of one or more battery packs,
    wherein a first reading of an SOC of the second group is greater than a first reading of an SOC of the first group, and
  determining, by the computing device and based on the received first reading of the SOC of each of the plurality of battery packs, a first SOC variability of the plurality of battery packs;
  determining, by the computing device, that the first SOC variability does not satisfy an SOC variability threshold; and
  causing, by the computing device, and via one or more electric charge arrays, the second group to charge the first group, wherein the charging the first group decreases the SOC of the second group and increases the SOC of the first group.

Embodiment #110. The method of Embodiment #109, further comprising:
  receiving, by the computing device, a second reading of the SOC of each of the plurality of battery packs;
  determining, by the computing device and based on the received second reading of the SOC of each of the plurality of battery packs, a second SOC variability of the plurality of battery packs; and
  determining, by the computing device, that the second SOC variability satisfies the SOC variability threshold.

Embodiment #111. The method of Embodiment #110, further comprising:
  causing, by the computing device and via one or more electric charge arrays, the plurality of battery packs to power the end device, wherein the powering causes the SOC of the plurality of battery packs to decrease.

Embodiment #112. The method of Embodiment #109, further comprising:
  receiving, by the computing device, a first reading of a state of health (SOH) of each of the plurality of battery packs, wherein the plurality of battery packs further comprises a third group of one or more battery packs;
  determining, by the computing device, that the first reading of the SOH of the third group does not satisfy a SOH threshold; and
  sequestering, by the computing device, the third group from powering the end device until a subsequent reading of an SOC of each of the plurality of battery packs other than the one or more battery packs of the third group do not satisfy an SOC threshold.

Embodiment #113. The method of Embodiment #109, wherein the receiving the first reading of the SOC of each of the plurality of battery packs further comprises:
  identifying, by the computing device, a master battery pack as one of the plurality of battery packs; and
  receiving, by the computing device and from the master battery pack, the first reading of the SOC of each of the plurality of battery packs.

Embodiment #114. The method of Embodiment #109, wherein the causing the second group to charge the first battery pack occurs via one or more of a converter balancing, a direct connect balancing, or a staggered balancing.

Embodiment #115. A battery pack configured to electrically power an end device, the battery pack comprising:
  a communication interface circuit configured to interface to a controller area network (CAN) bus;
  a controller comprising at least one processor; and
  memory storing controller instructions that, when executed by the at least one processor, cause the controller to:
    operate the battery pack in a first mode, wherein communication from the battery pack and over the CAN bus is disabled while the battery pack operates in the first mode;
    while the battery pack is operating in the first mode, receive a first signal configured to cause the battery pack to enable communication over the CAN bus;
    based on the first signal, enable communication from the battery pack and over the CAN bus;
    receive, via the communication interface circuit and over the CAN bus, a second signal configured to cause the battery pack to operate in a second mode;
    configure the battery pack to operate in the second mode;
    operate the battery pack in the second mode, wherein communication from the battery pack and over the CAN bus is enabled while the battery pack operates in the second mode; and
    while the battery pack is operating in the second mode, send, via the communication interface circuit and over the CAN bus, one or more messages that include data associated with the battery pack.

Embodiment #116. The battery pack of embodiment #115, wherein the battery pack comprises one or more terminals that are configured to, when enabled, transfer electric power from the battery pack to the end device; and
  wherein the controller instructions, when executed by the at least one processor, cause the controller to cause, while the battery pack is operating in the first mode, the one or more terminals to be always enabled and always capable of transferring the electric power from the battery pack to the end device.

Embodiment #117. The battery pack of embodiment #115, wherein the battery pack comprises one or more terminals that are configured to, when enabled, discharge electric power from the battery pack to the end device;

wherein the battery pack comprises one or more signaling pins that are configured to receive an indicator that indicates the one or more terminals are to be enabled; and wherein the controller instructions, when executed by the at least one processor, cause the controller to cause, based on receiving the indicator via the one or more signaling pins and while the battery pack is operating in the second mode, the one or more terminals to be enabled and capable of transferring the electric power from the battery pack to the end device.

Embodiment #118. The battery pack of embodiment #117, wherein the second mode causes, based on not having received the indicator within a threshold time period, the one or more terminals to be disabled and incapable of transferring the electric power from the battery pack to the end device.

Embodiment #119. The battery pack of embodiment #115, wherein the battery pack comprises a power line configured to supply power to the communication interface circuit;

wherein communication from the battery pack and over the CAN bus is enabled if the power line supplies the power to the communication interface circuit; and wherein the controller instructions, when executed by the at least one processor, cause the controller to prevent, while the battery pack is operating in the first mode, the power line from supplying the power to the communication interface circuit.

Embodiment #120. The battery pack of embodiment #115, wherein the first signal comprises a first encryption key received via the communication interface circuit and over the CAN bus;

wherein the second signal comprises a second encryption key received via the communication interface circuit and over the CAN bus; and wherein the first encryption key is different from the second encryption key.

Embodiment #121. The battery pack of embodiment #115, wherein the battery pack comprises a button configured to be pressed by an end user; and wherein the first signal is received based on the button being pressed.

Embodiment #122. The battery pack of embodiment #115, wherein the second mode causes the battery pack to perform one or more of converter balancing, direct balancing, and staggered balancing.

Embodiment #123. The battery pack of embodiment #115, wherein the first mode causes the battery pack to implement a first state machine for the first mode;

wherein the second mode causes the battery pack to implement a second state machine for the second mode; and wherein the controller instructions, when executed by the at least one processor, cause the controller to configure the battery pack to operate in the second mode by initializing the second state machine and causing the battery pack to reset.

Embodiment #124. A method comprising:

configuring a battery pack to operate in a first mode, wherein the battery pack is to electrically power an end device, wherein the battery pack comprises a communication interface circuit configured to interface to a controller area network (CAN) bus, and wherein communication from the battery pack and over the CAN bus is disabled while the battery pack is operating in the first mode;

while the battery pack is operating in the first mode, receiving, by the battery pack, a first signal configured to cause the battery pack to enable communication from the battery pack and over the CAN bus;

based on the first signal, enabling, by the battery pack, communication from the battery pack and over the CAN bus;

receiving, by the battery pack, via the communication interface circuit and over the CAN bus, a second signal configured to cause the battery pack to operate in a second mode;

configuring the battery pack to operate in the second mode;

operating the battery pack in the second mode, wherein communication from the battery pack and over the CAN bus is enabled while the battery pack operates in the second mode; and while the battery pack is operating in the second mode, sending, by the battery pack, via the communication interface circuit and over the CAN bus, one or more messages that include data associated with the battery pack.

Embodiment #125. The method of embodiment #124, wherein the battery pack comprises one or more terminals that are configured to, when enabled, transfer electric power from the battery pack to the end device; and wherein the method further comprises causing, while the battery pack is operating in the first mode, the one or more terminals to be always enabled and always capable of transferring the electric power from the battery pack to the end device.

Embodiment #126. The method of embodiment #124, wherein the battery pack comprises one or more terminals that are configured to, when enabled, transfer electric power from the battery pack to the end device;

wherein the battery pack comprises one or more signaling pins that are configured to receive an indicator that indicates the one or more terminals are to be enabled;

wherein the method further comprises causing, based on receiving the indicator via the one or more signaling pins and while the battery pack is operating in the second mode, the one or more terminals to be enabled and capable of transferring the electric power from the battery pack to the end device.

Embodiment #127. The method of embodiment #126, further comprising causing, based on not having received the indicator within a threshold time period and while the battery pack is operating in the second mode, the one or more terminals to be disabled and incapable of transferring the electric power from the battery pack to the end device.

Embodiment #128. The method of embodiment #124, wherein the battery pack comprises a power line configured to supply power to the communication interface circuit;

wherein communication from the battery pack and over the CAN bus is enabled if the power line supplies the power to the communication interface circuit; and wherein the method further comprises preventing, while operating in the first mode, the power line from supplying the power to the communication interface circuitry.

Embodiment #129. The method of embodiment #124, wherein the first signal comprises a first encryption key received via the communication interface circuitry and over the CAN bus;

wherein the second signal comprises a second encryption key received via the communication interface circuit and over the CAN bus; and wherein the first encryption key is different from the second encryption key.

Embodiment #130. The method of embodiment #124, wherein the battery pack comprises a button configured to be pressed by an end user; and wherein receiving the first signal is performed based on the button being pressed.

Embodiment #131. The method of embodiment #124, wherein the second signal comprises an encryption key.

Embodiment #132. The method of embodiment #124, wherein the first mode causes the battery pack to implement a first state machine for the first mode;

wherein the second mode causes the battery pack to implement a second state machine for the second mode; and wherein configuring the battery pack to operate in the second mode is performed by initializing the second state machine and causing the battery pack to reset.

Embodiment #133. A method comprising:

while a battery pack is operating in the first mode, sending, by a computing device and to the battery pack, a first signal configured to cause the battery pack to enable communication from the battery pack and over a controller area network (CAN) bus, wherein communication from the battery pack and over the CAN bus is disabled while the battery pack is operating in the first mode;

sending, by the computing device and to the battery pack over the CAN bus, a second signal configured to cause the battery pack to operate in a second mode, wherein communication from the battery pack and over the CAN bus is enabled while the battery pack operates in the second mode; and while the battery pack is operating in the second mode, receiving, by the computing device and from battery pack over the CAN bus, one or more messages that include data associated with the battery pack.

Embodiment #134 The method of embodiment #133, wherein the first signal comprises a first encryption key;

wherein the second signal comprises a second encryption key received via the communication interface circuit and over the CAN bus; and wherein the first encryption key is different from the second encryption key.

With some embodiments, the term "large-format" encompasses medium-format battery embodiments and use cases. For example, medium-scale and large-scale applications are embodied by the numerous descriptions herein.

Although many of the systems and methods described herein reference Lithium ion battery storage chemistry, the disclosure is not so limited. In many instances, a person of ordinary skill in the art will appreciate that other major chemistries for rechargeable batteries may be appropriated substituted without substantially departing from the spirit of the solution: Lithium-ion (Li-ion), Nickel Cadmium (Ni—Cd), Nickel-Metal Hydride (Ni-MH), Lead-Acid, and other chemistries. With some embodiments, the battery management system disclosed herein may be included with these technology batteries to provide battery protection, provide improved efficiency, and provide a better user experience than previous battery technologies. Variants of the lithium cobalt cathode, such as nickel cobalt aluminum (NCA) and nickel manganese cobalt (NMC), may be desirable in electric vehicles and other applications. Other new cathode chemistries, such as lithium manganese spinel (LMO) and lithium iron phosphate (LFP), may be used where appropriate. Moreover, large-format battery packs offer lower system integration costs because, inter alia, it enables a reduced number of battery interconnections, further improving the reliability of the battery pack and providing for a much higher value proposition.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

We claim:

1. A system comprising two or more battery packs, wherein the two or more battery packs are configured to electrically power one or more end devices, and wherein each battery pack of the two or more battery packs comprises:
    a communication interface circuit configured to interface to a communication channel;
    a controller comprising at least one processor; and
    memory storing controller instructions that, when executed by the at least one processor, cause the controller to:
        operate the battery pack in a first mode, wherein communication from the battery pack and over the communication channel is disabled while the battery pack operates in the first mode;
        while the battery pack is operating in the first mode, receive a first signal configured to cause the battery pack to enable communication over the communication channel;
        based on the first signal, enable communication from the battery pack and over the communication channel;
        receive, via the communication interface circuit and over the communication channel, a second signal configured to cause the battery pack to operate in a second mode;
        configure the battery pack to operate in the second mode;
        operate the battery pack in the second mode, wherein communication from the battery pack and over the communication channel is enabled while the battery pack operates in the second mode; and
        while the battery pack is operating in the second mode, send, via the communication interface circuit and over the communication channel, one or more messages that include data associated with the battery pack.

2. The system of claim 1, wherein each battery pack of the two or more battery packs comprises one or more terminals that are configured to, when enabled, transfer electric power from the battery pack to at least one of the one or more end devices; and
    wherein, for each battery pack of the two or more battery packs, the controller instructions, when executed by the at least one processor, cause the controller to cause, while the battery pack is operating in the first mode, the one or more terminals to be always enabled and always capable of transferring the electric power from the battery pack to the at least one of the one or more end devices.

3. The system of claim 1, wherein each battery pack of the two or more battery packs comprises one or more terminals that are configured to, when enabled, discharge electric power from the battery pack to at least one of the one or more end devices;

wherein each battery pack of the two or more battery packs comprises one or more signaling pins that are configured to receive an indicator that indicates the one or more terminals are to be enabled; and wherein, for each battery pack of the two or more battery packs, the controller instructions, when executed by the at least one processor, cause the controller to cause, based on receiving the indicator via the one or more signaling pins and while the battery pack is operating in the second mode, the one or more terminals to be enabled and capable of transferring the electric power from the battery pack to the at least one of the one or more end devices.

4. The system of claim 3, wherein, for each battery pack of the two or more battery packs, the second mode causes, based on not having received the indicator within a threshold time period, the one or more terminals to be disabled and incapable of transferring the electric power from the battery pack to the at least one of the one or more end devices.

5. The system of claim 1, wherein each battery pack of the two or more battery packs comprises a power line configured to supply power to the communication interface circuit;

wherein, for each battery pack of the two or more battery packs, communication from the battery pack and over the communication channel is enabled if the power line supplies the power to the communication interface circuit; and wherein, for each battery pack of the two or more battery packs, the controller instructions, when executed by the at least one processor, cause the controller to prevent, while the battery pack is operating in the first mode, the power line from supplying the power to the communication interface circuit.

6. The system of claim 1, wherein, for each battery pack of the two or more battery packs, the first signal comprises a first encryption key received via the communication interface circuit and over the communication channel;

wherein, for each battery pack of the two or more battery packs, the second signal comprises a second encryption key received via the communication interface circuit and over the communication channel; and wherein, for each battery pack of the two or more battery packs, the first encryption key is different from the second encryption key.

7. The system of claim 1, wherein each battery pack of the two or more battery packs comprises a button configured to be pressed by an end user; and wherein, for each battery pack of the two or more battery packs, the first signal is received based on the button being pressed.

8. The system of claim 1, wherein, for each battery pack of the two or more battery packs, the second mode causes the battery pack to perform one or more of converter balancing, direct balancing, and staggered balancing.

9. The system of claim 1, wherein, for each battery pack of the two or more battery packs, the first mode causes the battery pack to implement a first state machine for the first mode;

wherein, for each battery pack of the two or more battery packs, the second mode causes the battery pack to implement a second state machine for the second mode; and wherein, for each battery pack of the two or more battery packs, the controller instructions, when executed by the at least one processor, cause the controller to configure the battery pack to operate in the second mode by initializing the second state machine and causing the battery pack to reset.

10. One or more non-transitory computer-readable media storing instructions that, when executed, cause a battery pack to:

operate in a first mode, wherein the battery pack is to electrically power an end device, wherein the battery pack comprises a communication interface circuit configured to interface to a communication channel, and wherein communication from the battery pack and over the communication channel is disabled while the battery pack is operating in the first mode;

while the battery pack is operating in the first mode, receive a first signal configured to cause the battery pack to enable communication from the battery pack and over the communication channel;

based on the first signal, enable communication from the battery pack and over the communication channel;

receive, via the communication interface circuit and over the communication channel, a second signal configured to cause the battery pack to operate in a second mode;

operate in the second mode, wherein communication from the battery pack and over the communication channel is enabled while the battery pack operates in the second mode; and while the battery pack is operating in the second mode, send, via the communication interface circuit and over the communication channel, one or more messages that include data associated with the battery pack.

11. The one or more non-transitory computer-readable media of claim 10, wherein the battery pack comprises one or more terminals that are configured to, when enabled, transfer electric power from the battery pack to the end device; and wherein the instructions, when executed, cause the battery pack to cause, while the battery pack is operating in the first mode, the one or more terminals to be always enabled and always capable of transferring the electric power from the battery pack to the end device.

12. The one or more non-transitory computer-readable media of claim 10, wherein the battery pack comprises one or more terminals that are configured to, when enabled, transfer electric power from the battery pack to the end device;

wherein the battery pack comprises one or more signaling pins that are configured to receive an indicator that indicates the one or more terminals are to be enabled;

wherein the instructions, when executed, cause the battery pack to cause, based on receiving the indicator via the one or more signaling pins and while the battery pack is operating in the second mode, the one or more terminals to be enabled and capable of transferring the electric power from the battery pack to the end device.

13. The one or more non-transitory computer-readable media of claim 12, wherein the instructions, when executed, cause the battery pack to cause, based on not having received the indicator within a threshold time period and while the battery pack is operating in the second mode, the one or more terminals to be disabled and incapable of transferring the electric power from the battery pack to the end device.

14. The one or more non-transitory computer-readable media of claim 10, wherein the battery pack comprises a power line configured to supply power to the communication interface circuit;

wherein communication from the battery pack and over the communication channel is enabled if the power line supplies the power to the communication interface circuit; and wherein the instructions, when executed, cause the battery pack to prevent, while operating in the first mode, the power line from supplying the power to the communication interface circuit.

15. The one or more non-transitory computer-readable media of claim 10, wherein the first signal comprises a first encryption key received via the communication interface circuit and over the communication channel;

wherein the second signal comprises a second encryption key received via the communication interface circuit and over the communication channel; and wherein the first encryption key is different from the second encryption key.

16. The one or more non-transitory computer-readable media of claim 10, wherein the battery pack comprises a button configured to be pressed by an end user; and wherein the instructions that, when executed, cause the battery pack to receive the first signal based on the button being pressed.

17. The one or more non-transitory computer-readable media of claim 10, wherein the second signal comprises an encryption key.

18. The one or more non-transitory computer-readable media of claim 10, wherein the first mode causes the battery pack to implement a first state machine for the first mode;

wherein the second mode causes the battery pack to implement a second state machine for the second mode; and wherein the instructions, when executed, cause the battery pack to configure itself to operate in the second mode by initializing the second state machine and causing the battery pack to reset.

19. One or more non-transitory computer-readable media storing instructions that, when executed, cause an apparatus to:

send, to a battery pack that is operating in a first mode, a first signal configured to cause the battery pack to enable communication from the battery pack and over a communication channel, wherein communication from the battery pack and over the communication channel is disabled while the battery pack is operating in the first mode;

send, to the battery pack over the communication channel, a second signal configured to cause the battery pack to operate in a second mode, wherein communication from the battery pack and over the communication channel is enabled while the battery pack operates in the second mode; and receive, over the communication channel and from the battery pack that is operating in the second mode, one or more messages that include data associated with the battery pack.

20. The one or more non-transitory computer-readable media of claim 19, wherein the first signal comprises a first encryption key;

wherein the second signal comprises a second encryption key; and wherein the first encryption key is different from the second encryption key.

\* \* \* \* \*